(12) United States Patent
Hyde

(10) Patent No.: US 6,795,780 B1
(45) Date of Patent: Sep. 21, 2004

(54) FLUID ENERGY PULSE TEST SYSTEM—TRANSIENT, RAMP, STEADY STATE TESTS

(76) Inventor: Thomas Allen Hyde, 1607 N. H St., Midland, TX (US) 79701-4031

( * ) Notice: Subject to any disclaimer, the term of this patent is extended or adjusted under 35 U.S.C. 154(b) by 0 days.

(21) Appl. No.: 10/259,970

(22) Filed: Sep. 27, 2002

Related U.S. Application Data
(60) Provisional application No. 60/325,531, filed on Sep. 27, 2001.

(51) Int. Cl.$^7$ .............................................. G06F 19/00
(52) U.S. Cl. ............................ 702/45; 702/46; 702/47; 702/50; 702/51; 700/281; 73/61.56
(58) Field of Search ............................. 702/45, 46, 47, 702/50, 51; 700/281, 282, 301; 73/61.56, 53.01, 168

(56) References Cited

U.S. PATENT DOCUMENTS
6,591,201 B1 * 7/2003 Hyde .......................... 702/45

OTHER PUBLICATIONS
American Petroleum Institute DRAFT API11V2 Recommended Practice Gas–Lift Valve Performance Testing, Jan. 13, 1993.
University of Tulsa Artificial Lift Projects (Tulap), Appendix C—Tulap Model (part of the API11V2 Recommended Practice Gas–Lift Valve Performance Testing—but not so labeled.
Verification of Constant Injection Pressure Test Procedures in Gas–Lift Valve Performance Testing, American Petroleum Institute Washington, D. C., Authored by Thomas A. Hyde, Aug. 24, 1993.
Pulse Pressure to Identify Gas–Lift Valve Specifications, presented at the American Production Engineering Association meeting, Houston, Texas, Oct. 7, 1993, Authored by Thomas A. Hyde.
Flow Conditioning Technology Optimizes Gas Measurement Gallagher, J. E., American Oil and Gas Reporter, Oct. 1995.

* cited by examiner

*Primary Examiner*—John Barlow
*Assistant Examiner*—Stephen J. Cherry

(57) ABSTRACT

In improvements to the Fluid Energy Pulse Test System, apparatus and methods regulate high-pressure, high-fluid-flow-rate energy pulses to generate temperature-controlled transient, ramp, constant-steady-state, and periodic-steady-state fluid-pressure and fluid-flow-rate test data and sound data for evaluating fluid control devices. Transient, ramp, and constant-steady-state performance curves describe dynamic operating characteristics of tested devices. Transient and constant-steady-state pressures and flow rates are precisely defined and compared. Constant fluid conductance is represented by transverse lines on performance graphs. Constant- and periodic-steady-state pressures and flow rates are achieved in less than two seconds. Temperature sensitivity of fluid control devices is determined. Fluid-pressure and fluid-flow-rate data correlated with sound data create audio-visual representations. Three-dimensional amplitude-frequency-time sound signatures are displayed graphically.

30 Claims, 17 Drawing Sheets

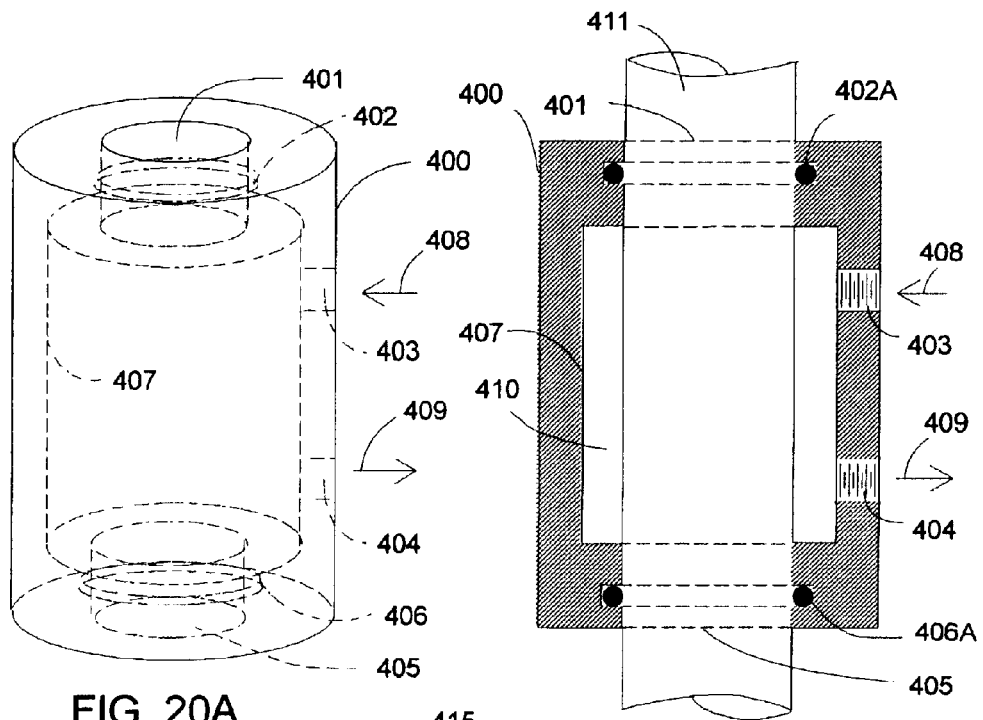
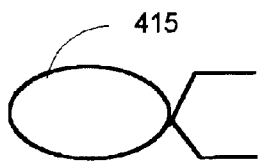
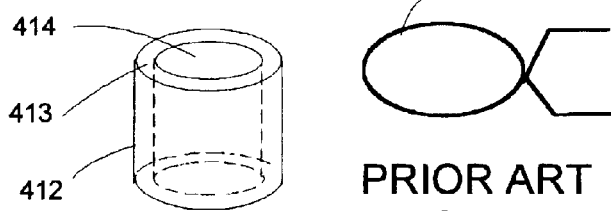
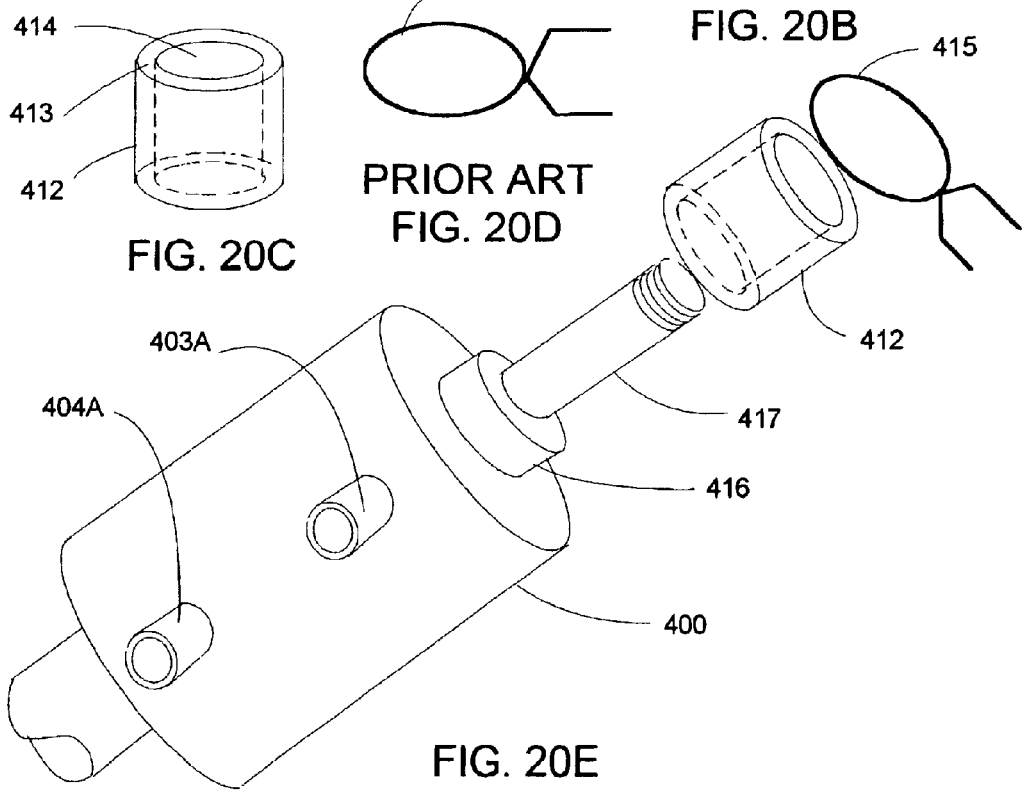
FIG. 20A
FIG. 20B
FIG. 20C
PRIOR ART
FIG. 20D
FIG. 20E

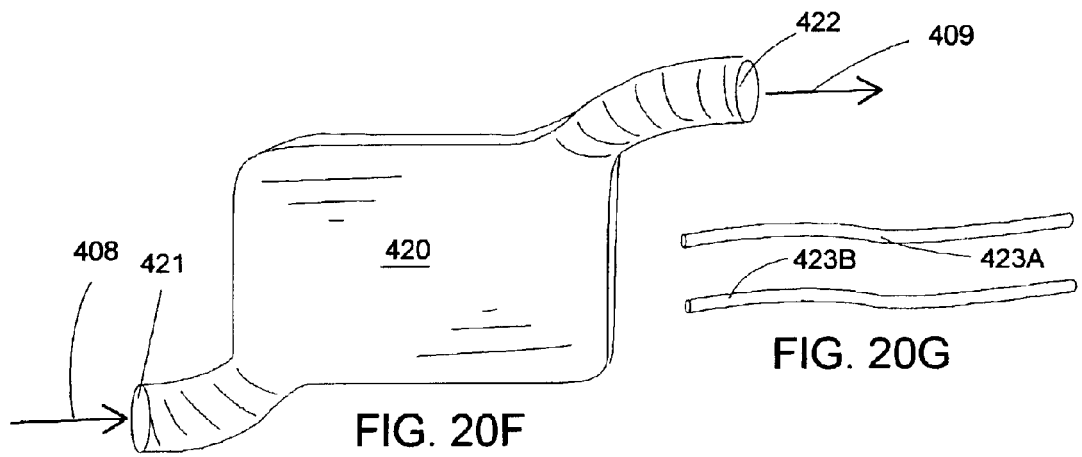
FIG. 20F
FIG. 20G
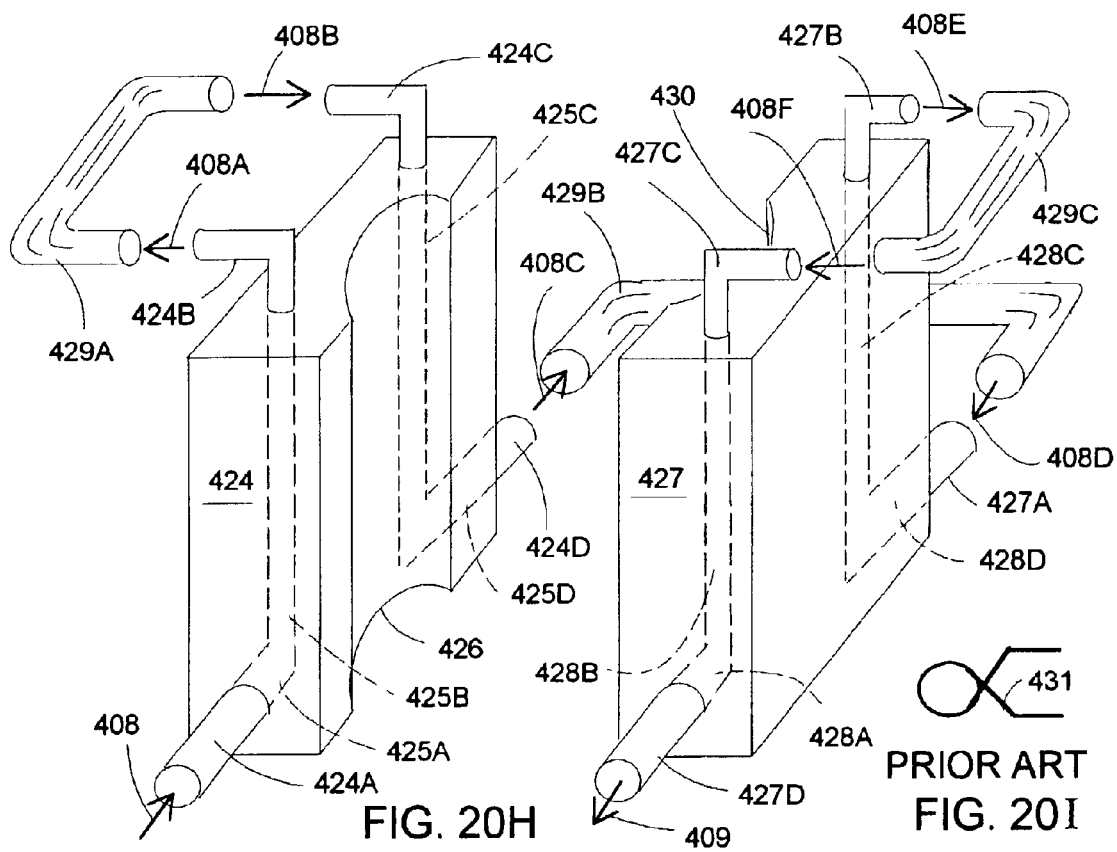
FIG. 20H
PRIOR ART
FIG. 20I
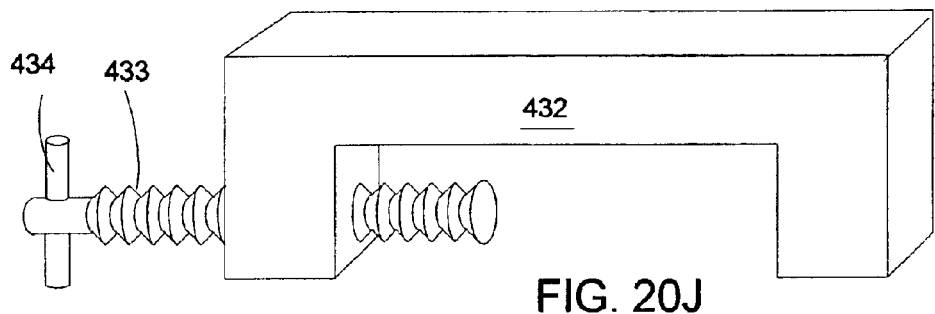
FIG. 20J Production Fluid Sound track Injection Fluid 3D Time-Frequency Graph Production Fluid 3D Time-Frequency Graph

FLUID ENERGY PULSE TEST SYSTEM—TRANSIENT, RAMP, STEADY STATE TESTS

CROSS REFERENCE TO RELATED APPLICATIONS

U.S. Provisional Patent Application Title: Fluid Energy Pulse Test System—Transient, Ramp, Steady State, Application No. 60/325,531, Filing date Sep. 27, 2001.

U.S. Pat. No. 6,591,201, dated Jul. 8, 2003; U.S. Patent Application Title: Fluid Energy Pulse Test System, application Ser. No. 09/963,608, Filing date Sep. 25, 2001.

REFERENCE TO FEDERALLY SPONSORED RESEARCH

Not applicable

REFERENCE TO A COMPUTER PROGRAM LISTING APPENDIX

U.S. Pat. No. 6,591,201

FIELD OF INVENTION

This invention teaches apparatus and methods to generate temperature-controlled and acoustically monitored, transient, ramp, and constant and periodic-steady-state pressure and fluid flow rate conditions from short duration fluid energy pulses to acquire fluid pressure and fluid flow rate test data for fluid control devices in order to create operating points and dynamic fluid flow rate performance curves for a tested fluid control device, such as those that describe the performance of gas-lift valves used in the production of hydrocarbons.

BACKGROUND OF THE INVENTION

Apparatus and methods to generate high-pressure, high-fluid-flow-rate [HPHFFR] energy pulses to test and evaluate the dynamic operation of fluid control devices and systems are presented in U.S. Pat. No. 6,591,201: Fluid Energy Pulse Test System [FEPTS] by Hyde. U.S. Pat. No. 6,591,201, incorporated herein in its entirety by reference, teaches how to generate short-duration fluid energy pulses and how to use these pulses to identify, record, and evaluate some modes of operation of a fluid control device under test. However, this Patent does not teach how to generate precise transient, ramp, and constant-steady-state fluid pressure and fluid flow rate conditions by short-duration energy pulses so that test data can be used to define the performance of a fluid control device under test. For example, U.S. Pat. No. 6,591,201 does not include transient, ramp, or steady-state performance curves and does not teach how to obtain these curves for tested gas-lift valves. Further, U.S. Pat. No. 6,591,201 does not teach how to control temperature in a test of a temperature-sensitive fluid control device or how to generate periodic-steady-state fluid pressure and fluid flow rate test data. As a result, U.S. Pat. No. 6,591,201 requires improvement by extension and augmentation to demonstrate how to create precise transient, ramp, constant-steady-state, and periodic-steady-state conditions with short-duration energy pulses and how to create transient, ramp and constant steady-state graphs from test data generated by short-duration energy pulses that last seconds or less. Improvements of U.S. Pat. No. 6,591,201 permit transient and ramp fluid pressure and fluid flow rate data acquired by new energy pulse tests to be correlated with, and related to, constant-steady-state data.

The present invention of Fluid Energy Pulse Test System—Transient, Ramp, Steady State Tests [FEPTS-TRST] advances the teachings of U.S. Pat. No. 6,591,201 in a number of ways, including apparatus and methods to generate, process, and evaluate transient, ramp, constant-steady-state, and periodic-steady-state test data to establish operating points for fluid control devices, such as gas-lift valves. Operating points are defined by an upstream pressure, a downstream pressure, and a flow rate. The FEPTS-TRST includes: (1) apparatus and methods to regulate and control fluid pressure and fluid flow rate and to create performance curves by defining and subsequently identifying fluid conductance characteristics for a fluid control device under test; (2) apparatus and methods to regulate fluid pressure and fluid flow rate explosively, with pressures ranging from 1480 kPa (200 psig) to 16649 kPa (2400 psig), and fluid flow rates ranging from 2832 SCM/D (100 MSCF/D) to 56,634 SCM/D (2,000 MSCF/D); and with pressure rates varying from 13.890 MegaPa/second to 275.891 MegaPa/second (2,000 to 40,000 psig/second); (3) apparatus and methods to control the temperature of a fluid control device with temperature ranging from 10.0 to 65.55 degrees Celsius (50 to 150 degrees Fahrenheit), or more; and (4) apparatus and methods to acquire sound test data for fluid that is flowing through a fluid control device under test.

The art of regulating fluid pressure and fluid flow rate is documented by patents describing equipment and methods to control fluid pressure and fluid flow rate, including U.S. Pat. No. 4,086,804 to Ruby, J. H. (1978); U.S. Pat. No. 4,777,383 to Waller et. al. (1988); U.S. Pat. No. 4,798,512 to Schmidt et. al. (1989); U.S. Pat. No. 5,020,564 to Thoman et. al. (1991); U.S. Pat. No. 5,142,483 to Basham et. al. (1992); and U.S. Pat. No. 5,357,996 to Ioannides et. al. (1994). While these patents, and others, teach many aspects of regulation, none address equipment and methods to generate and to control fluid pressure and fluid flow rate by explosive HPHFFR energy pulses. Further, references that address the acquisition of sound test data for HPHFFR fluid control devices, such as gas-lift valves, are not widely known. As a result, sound test data and sound-frequency analyses are not available to assist in the evaluation of the dynamic operation of fluid control devices. There appear to be no audio-visual apparatuses and methods in prior art to support the design, testing, maintenance, operation, and evaluation of HPHFFR fluid control devices.

To establish a reference point for the FEPTS-TRST invention, the FEPTS apparatus and methods of U.S. Pat. No. 6,591,201 are discussed below and explained further in FIG. 1 and FIG. 2.

The FEPTS apparatus is fabricated as three connected systems: a compressor system, a valve control system, and a data acquisition system. A compressor system includes compressors operated by remote control to produce high-pressure, high-fluid-flow-rate for driving functions that are generated by the valve control system. Impulse, step, ramp, and frequency driving functions, and combinations thereof, are used to test the dynamic operation of fluid control devices, such as gas-lift valves.

The valve control system activates and deactivates bang-bang and variable-fluid-flow-rate control valves to initiate, control, and end a test. The valve control system includes a large main fluid reservoir; smaller upstream and downstream fluid reservoirs, a test chamber assembly; pipes; electromagnetic and electro-pneumatic bang-bang control valves and variable-fluid-flow-rate control valves; a high current, electric power source for control of the electromagnetic and electro-pneumatic control valves; a low-pressure, fluid power source for control of electro-pneumatic control valves, a valve control computer to generate digital-toanalog signals; and, software to activate the data graph computer, to control test duration, to acquire time-line information about the on/off condition of control valves, and to generate energy pulses. The energy pulses are defined by pulse initiation, delay, duration, amplitude, periodicity, and duty cycle, properties that are associated with impulse, step, ramp, or frequency driving functions.

When initiating a test of a fluid control device, the FEPTS valve control computer activates a data acquisition system. The data acquisition system includes a data graph computer; fluid pressure, fluid temperature, and flow rate transducers; signal conditioners; analog-to-digital converters; and software to acquire temperature, pressure, and flow rate data and to prepare graphs of these data. Analog pressure gauges provide safety-validation of digital data displays. A means to shift control between the data graph computer and the valve control computer before, during, and after a test is also provided The FEPTS methods acquire test data on a fluid control device installed in a closed-to-the-atmosphere, partly-open-to-the-atmosphere, or open-to-the atmosphere test environment. Each test environment depends upon how fluid conduits in the FEPTS are connected, the type of energy pulse protocol chosen, and how supply fluid and exhaust fluid are stored and controlled.

FEPTS methods include the following procedures: select pipe configurations for a test environment; install a fluid control device; set upstream and downstream initial fluid pressure and fluid flow rate conditions; select test duration, sampling rate, and automatic or manual control; choose an energy pulse test protocol from a computer-based library of test protocols or design a new energy pulse test protocol; start a test; collect test data; end a test; and, construct graphic presentations of test data. Graphs are constructed in time-dependent fluid pressure, fluid flow rate, and fluid-power formats, and in parametric presentations, to illustrate the dynamic characteristics of a tested device, such as a pressure-sensitive gas-lift valve or a safety valve.

In FEPTS tests, HPHFFR energy pulses deplete stored energy explosively. The FEPTS apparatus does not provide adequate means to control and to replace fluid and fluid pressure loss during the generation and expenditure of the energy pulses. As a result, the FEPTS methods do not show how to produce constant-steady-state or periodic-steady-state fluid dynamic data when testing fluid control devices.

World-wide industrial standards for steady state fluid systems incorporate constant-steady-state conditions for the measurement of fluid pressure and fluid flow rate. Industrial concentration upon constant-steady-state conditions is a result of historical precedent and technological development. In practice, measurement of constant-steady-state fluid flow rate is assisted by flow conditioners, entry and exit pipe runs, and by-pass meter runs. A preferred industrial practice is to attenuate transient, alternating, and periodic fluid pressure and fluid flow rate regimes. This practice is costly. This practice limits the development of tools and methods to generate and to measure fluid pressure and fluid flow rate variations. This practice also restricts the design of fluid control equipment and components that function accurately under variable fluid pressure and fluid flow rate conditions.

Conventional flow-loop test methods that characterize the performance of gas-lift valves are described in the references, American Petroleum Institute [API] Recommend Practice for Testing Gas-Lift Valves, December, 1995; and Gas-Lift Valve Performance Testing, API Recommended Practice 11V2, Second Edition, March 2001.

There are two basic types of gas-lift valves: Injection Pressure Operated [IPO] valves, opened by upstream pressure, defined as injection pressure, and Production Pressure Operated [PPO] valves, opened by downstream pressure, defined as production pressure. After each type of valve opens, fluid flows from upstream to downstream through the valve. All IPO and PPO gas-lift valves are sensitive, in varying degrees, to injection pressure and to production pressure and thus are classified as pressure-sensitive fluid control devices. Nitrogen-charged valves are also sensitive to the temperature of the nitrogen gas.

There are two types of conventional steady state flow-loop tests to establish gas-lift valve performance curves: Constant Injection Pressure Test [CIPT] and Constant Production Pressure Test [CPPT]. Injection pressure is associated with upstream valve, or casing pressure. Production pressure is associated with downstream valve, or tubing pressure. In each conventional test, one of the pressures is held constant while the other is changed in steps or ramps to evaluate the sensitivity of a gas-lift valve to one type of pressure change. In both types of tests, fluid flow rate is monitored continuously. Flow-loop tests require long test times and large quantities of fluid energy. Each test generates one set of fluid pressure and fluid flow rate data that are converted into a performance curve. Multiple curves are combined to create a performance graph for a benchmark gas-lift valve to represent all gas-lift valves manufactured to the same specifications. These curves are used to design hydrocarbon-lifting systems. The shortcomings of flow-loop tests of gas-lift valves coupled with the design of hydrocarbon-lifting systems may cause errors as high as 200% in control-variable set points for hydrocarbon-lifting systems.

The high cost in time, equipment, and personnel of conventional flow-loop testing is discussed in detail in the FEPTS U.S. Pat. No. 6,591,201. Conventional flow-loop testing suffers additional disadvantages, including those listed herein below.

(1) The API Recommended Practice is the only method available to establish gas-lift valve performance curves, thereby limiting the ability of valve manufacturers and hydrocarbon production companies to characterize gas-lift valves and other HPHFFR fluid control devices. Except for the FEPTS-TRST invention described herein, there are no other ways to establish constant-steady-state performance curves for gas-lift valves or to acquire constant-steady-state dynamic performance characteristics for other HPHFFR fluid control devices.

(2) Conventional flow-loop testing demands large and costly facilities, and requires a minimum of three operators to conduct tests. As a result, only a few performance curves are acquired during a test. If a fluid flow rate characterization is needed, but was not acquired during a test, the data must be interpolated.

(3) In conventional flow-loop testing to establish performance curves, one trace is acquired for a given set of test parameters. When a test is initiated, the test continues until completed or aborted. There are no economical ways to test repeatedly one or more operating points of a fluid control device, to evaluate a small region of the performance graph, or to investigate and characterize device nonlinearities and/or anomalies.

(4) Conventional flow-loop testing technology for gas-lift valves does not provide a measure of accuracy and precision for the data acquired when characterizing the performance of a valve. It is too costly to repeat tests a number of times to determine the accuracy and reproducibility of the data.

(5) Conventional flow-loop tests of gas-lift valves are conducted without addressing the sensitivity of test parameters. If a known error is made in setting a test parameter, the test is continued with the error uncorrected. To correct the error, a complete retest is required to reach the operating point at which the error occurred. Re-testing significantly increases testing costs.

(6) The conventional standard for evaluating the steady-state performance of a gas-lift valve requires either the CIPT or the CPPT to determine how a valve responds to either upstream or downstream pressure changes. Conventional flow-loop testing is not structured to establish a way to combine the principles of, or the results from, the CIPT and the CPPT.

(7) Except in specialized systems, such as fluidized-bed reactors, fuel injection systems, and packaging systems, there are limited applications of periodic fluid pressure and fluid flow rate. In most industrial applications, unwanted periodic fluid pressure is removed by surge tanks. The absence of efficient and cost-effective periodic, fluid pressure and fluid flow rate energy sources limits design, fabrication, and application of devices utilizing periodic fluid pressure and fluid flow rate.

(8) Conventional flow-loop tests of fluid control devices, such as gas-lift valves, are conducted at ambient temperatures and do not provide a precise way to evaluate performance at industry-standard temperatures, such as 15.55 degrees Celsius (60 degrees Fahrenheit), or at other temperatures that may reach 65.55 degrees Celsius (150 degrees Fahrenheit) or more. In a flow-loop test, the temperature of the flowing fluid is assumed to represent the temperature of nitrogen in a nitrogen-charged gas-lift valve, which assumption can be shown to cause sizeable errors. Flow-loop test fluid pressures and fluid flow rates must be corrected for temperature dependence by table-lookup, in order to back-reference data to the industry standard for a tested device.

With an objective to generate constant-steady-state conditions from short-duration energy pulses, regulating fluid pressure and fluid flow rate requires special attention. Conventional regulators need a finite time to sense change, transmit information, activate control, and recycle. Several cycles may be required to reach a regulated set point. This process is defined by first-order behavior so that as fluid pressure and fluid flow rate approach a desired set point, a proportionally longer time is needed to reach the set point. In energy pulse generation, the response time of a regulator becomes a critical parameter. Conventional regulators, in conventional applications, do not provide adequate fluid pressure and fluid flow rate recovery. Additional problems in restoring explosive fluid pressure and fluid flow rate loss involve the compressibility of the fluid and the quantity of fluid needed for processing. The compressibility of air prevents achieving a state of thermodynamic equilibrium with small quantities of air in short times at high fluid pressures and high fluid flow rates. The properties of air dictate that air temperature increases with compression and decreases with expansion. A constant-steady-state condition assumes thermal equilibrium at a given fluid pressure and fluid flow rate. True thermal equilibrium cannot always be achieved with energy pulses at high fluid pressures and high fluid flow rates when pulse duration is very short. However, when explosive regulation is tempered by the operation of a pressure-sensitive device, a "compressible equilibrium" can be achieved. Thermal conditions reach a near constant state. For constant-steady-state paths, a compressible equilibrium can be extended by lengthening an energy pulse. As a pulse lengthens, it assumes the character of constant-steady-state conditions and long-pulse test results can be compared to short-pulse test results to establish error criteria for fluid pressure and fluid flow rate test data.

There is a general lack of information about testing and measuring sound properties in HPHFFR systems, especially systems that use explosive energy pulses. There is limited technical information about the intensity, duration, frequency range, and robustness of sound waves in HPHFFR systems. Sonic time traces and spectral properties do not seem to have been used for evaluating various dynamic operating characteristics of HPHFFR fluid control devices. For example, information that explains how to measure sound frequencies and how to correlate sound data with conventional fluid pressure and fluid flow rate measurements for HPHFFR fluid devices and systems is not widely known.

SUMMARY OF THE INVENTION

In accordance with the principles of the presently disclosed invention Fluid Energy Pulse Test System—Transient, Ramp, Steady State Tests [FEPTS-TRST], the FEPTS-TRST invention uses HPHFFR energy pulses to generate transient, ramp, constant-steady-state, or periodic-steady-state conditions by appropriate regulation and control of fluid pressure and fluid flow rate in tests of fluid control devices and systems. When the FEPTS-TRST invention generates an explosive change of energy, measured fluid pressures and fluid flow rates follow transient, ramp, constant-steady-state, or periodic-steady-state paths.

To improve the FEPTS apparatus and methods that characterize the performance of fluid control devices, U.S. Pat. No. 6,591,201 is augmented and extended by sets of components that are integrated with FEPTS equipment, by new methods to control these components, and by new methods to interpret acquired test data. Improvements to FEPTS equipment include a directional switch array; an explosive regulation assembly; a temperature control assembly; a test chamber assembly; and an audio assembly. New methods include procedures to establish transient, ramp, constant-steady-state, and periodic-steady-state operating points to create performance curves for a tested device; to construct transverse lines that establish measures of fluid conductivity of a tested device; to construct regulator lines that exhibit multiple levels of fluid conductivity of the tested device; and procedures to correlate dynamic performance characteristics with sound signatures of a tested device.

A plurality of control signals that were dedicated in the FEPTS to specific control valves and set valves, but which control valves and set valves are not required for a given test protocol, are directed to integrated control valves, set valves, and regulators. These directed control signals allow the integrated control of FEPTS-TRST components. The FEPTS-TRST teaches how to direct and to adapt these control signals to integrated components for testing, thus providing a significantly greater range of testing capability for fluid control devices.

FEPTS-TRST tests are conducted in three to five seconds with energy pulses in a range of 0.020 seconds to four seconds. Longer test times and pulse durations may be required, depending upon the test requirements and the performance of a tested fluid control device. FEPTS-TRST regulation of fluid pressure and fluid flow rate is based upon the fluid pressure and fluid flow rate demands of a test protocol. Regulation is accomplished either by fluid pressure and fluid flow rate regulators under bang-bang control or by pre-set set valves under bang-bang control, either of which meter, under a planned fluid pressure profile, a quantity of fluid to flow into upstream or downstream fluid reservoirs from a high-pressure reservoir. Explosive regulation of fluid pressure and fluid flow rate uses simultaneous control signals to activate bang-bang control valves upstream and downstream of a fluid control device under test. Bang-bang control generates explosive, high-pressure fluid pulses to enter fluid reservoirs, pass through a fluid control device under test, and exhaust to a downstream reservoir or to the atmosphere. Sound waves generated by flowing fluid are measured by sound transducer means upstream and downstream of a fluid control device under test.

In the FEPTS-TRST apparatus, transient fluid pressure and fluid flow rate test data are generated explosively, without regulation, using a negative energy pulse that is created by bang-bang control to activate only a downstream regulator. Ramp and constant-steady-state fluid pressure and fluid flow rate test data are generated explosively, with regulation, using a positive energy pulse that is created by bang-bang control to activate an upstream regulator and using a negative energy pulse that is created by bang-bang control to activate simultaneously a downstream regulator. Periodic-steady-state fluid pressure and fluid flow rate test data are generated explosively, with regulation, using either a series of positive energy pulses created by bang-bang control of an upstream regulator while downstream set valve conditions are held constant, or by variable control of a downstream regulator or set valve while upstream regulator conditions are held constant.

FEPTS-TRST upstream pressure, downstream pressure, and flow rate test data acquired at specific times establish operating points that are used to create performance curves and transverse lines for a fluid control device under test. Performance curves provide information about how a tested fluid control device functions at specific operating points. Transverse lines provide new information about how a fluid control device functions under conditions of constant fluid conductivity, while also providing information about how the device functions at specific operating points. Transverse lines are created as a result of a constant setting of a downstream set valve regulator during energy pulse tests. These lines focus to the origin of coordinates of a graph of fluid flow rate with respect to fluid pressure and cross, diagonally, the set of performance curves constructed from fluid control device operating points. In addition to providing new information about fluid conductivity associated with a fluid control device under test, transverse lines also establish a continuum of upstream pressure, downstream pressure, and flow rate operating points. Performance curves and transverse lines are created for transient, ramp, and constant-steady-state fluid pressure and fluid flow rate conditions. These performance curves and transverse lines are identified and distinguished appropriately as transient performance curves and transient transverse lines, ramp performance curves and ramp transverse lines, and constant-steady-state performance curves and constant-steady-state transverse lines. Sound waves generated by flowing fluid, with or without regulation, reflect the characteristics of transient, ramp, constant-steady-state, and periodic-steady-state operation of a fluid control device under test. Sound test data correlate with both time and amplitude characteristics of fluid pressure and fluid flow rate test data, while providing sound frequency separation and frequency spectral properties. Sound frequency information is analyzed by Digital Signal Processing methods.

FEPTS-TRST periodic-steady-state test data provide new information about hidden and difficult to measure dynamic operating properties of fluid control devices including reaction time, pressure delay, and fluid flow rate delay, all of which may be frequency dependent.

Explosive energy is regulated in the FEPTS-TRST apparatus by Method A, a bang-bang, pre-set variable regulation with pressure feedback; or by Method B, a bang-bang, pre-set constant regulation without pressure feedback.

Method A is a forgiving fluid pressure and fluid flow rate regulating process that requires an explosive regulation assembly comprising a regulator in series with a bang-bang control valve and a pre-set pressure-regulating set point. The regulator utilizes pressure feedback from a target-regulated fluid reservoir. Pressure feedback, coupled with bang-bang control of regulation of a target reservoir from a high-pressure reservoir, generates explosive regulation of fluid pressure and fluid flow rate to the target reservoir. A bang-bang actuator causes the regulator orifice opening to increase or decrease rapidly when regulation is initiated. With this bang-bang control, the regulator over-corrects, then corrects for an increase or decrease in feedback pressure, thereby permitting regulation either from very high initial pressures to a lower regulated set point or from very low initial pressures to a higher regulated set point. An increase in the speed of regulation occurs when the initial pressure within the target reservoir is at, or close to, the desired regulated set point for the target reservoir. This method is forgiving. If the initial condition of the target reservoir is above or below the set point of the explosive regulation assembly, the set-point regulation of the target reservoir is still achieved quickly. The effect of regulating fluid pressure and fluid flow rate by an explosive regulation assembly is to reduce the time constant of regulation.

Method B is an unforgiving fluid pressure and fluid flow rate regulating process that requires an explosive regulation assembly comprising a set valve in series with a bang-bang control valve and a pre-set pressure-regulating set point. This method does not utilize pressure feedback from a target-regulated pressure chamber. Regulation is controlled by the bang-bang actuator, which permits more or less fluid to be restored to the target reservoir. The amount of energy restored depends upon the upstream drive pressure and the set-valve orifice open-state. The method is unforgiving because, once a setting is fixed in the explosive regulation assembly, no change in regulation parameters are generated by the bang-bang actuator or the set-valve.

Accordingly, with the invention of FEPTS-TRST, there are provided:

(1) apparatus and method to conduct constant-steady-state tests of fluid control devices or fluid systems using HPHFFR energy pulses of short duration, wherein constant-steady-state fluid pressures and fluid flow rate are achieved and maintained for short periods of time by an explosive burst of controlled fluid energy that regulates fluid pressures and fluid flow rate;

(2) apparatus and method to conduct periodic-steady-state tests of fluid control devices or fluid systems using HHFFR energy pulses of short duration, wherein periodic-steady-state fluid pressures and fluid flow rate are achieved and maintained for short periods of time by periodic explosive bursts of controlled fluid energy that regulate periodic fluid pressures and fluid flow rate;

(3) apparatus and method to create transient performance curves and transient transverse lines for a fluid control device under test;

(4) apparatus and method to create ramp performance curves and ramp transverse lines for a fluid control device under test;

(5) apparatus and method to create constant-steady-state performance curves and constant-steady-state transverse lines for a fluid control device under test;

(6) apparatus and method to create transient, ramp, or constant-steady-state operating points with a downstream back pressure regulator;

(7) apparatus and method to direct control signals for control valves and set valves to integrated control valves, set valves, and regulators;

(8) apparatus and method to hold the temperature of a fluid control device under test constant at a temperature in the range from 10.0 to 65.55 degrees Celsius (50 to 150 degrees Fahrenheit) or more;

(9) apparatus and method for a test chamber assembly, comprising an upper retaining plate, an upper test chamber unit, a second-device heat exchanger, a first-device heat exchanger, a lower test chamber unit, a lower retaining plate, "O" rings, supporting members, and temperature and pressure transducers;

(10) apparatus and method for an explosive regulation assembly comprising a regulator and a bang-bang control valve to regulate fluid pressure and fluid flow rate from an upstream high-pressure reservoir to a downstream target reservoir in order to generate explosive energy pulses for ramp, constant-steady-state, or periodic-steady-state fluid pressure and fluid flow rate conditions;

(11) apparatus and method to improve the accuracy in testing gas-lift valves so that test data error levels are nominally ±2 percent or less for orifice flow regions and ±15 percent or less for throttling flow regions, or less, which nominal errors are significantly less than industry accepted standard error levels of ±5 percent for orifice flow regions and ±30 percent for throttling flow regions;

(12) apparatus and methods to record and play sound frequency data derived from a fluid flowing through a fluid control device under test with data acquired by HPHFFR microphones upstream and downstream, of said device, that are part of an audio assembly;

(13) a method to create constant-steady-state performance curves from constant-steady-state operating points without constructing constant-steady-state transverse lines;

(14) a method to test and retest transient, ramp, constant-steady-state, or periodic-steady-state fluid pressure and fluid flow rate operating points of a fluid control device in specific regions of a performance graph in order to establish accuracy, precision, sensitivity, and reproducibility of test data;

(15) a method to construct a single transverse line that is sufficient to demonstrate that a tested device is operating according to design specifications; and,

(16) a method to correlate upstream and downstream sound information acquired by HPHFFR microphones with fluid pressure and fluid flow rate data for a fluid control device under test.

In the FEPTS-TRST apparatus and methods, operating points and transverse lines for a fluid control device installed in a test chamber assembly are acquired in at least four ways.

(1) Downstream pressure of a fluid control device is controlled by a set valve. Upstream pressure and fluid flow rate are not regulated. A transient decrease in upstream pressure and fluid flow rate is generated by exhausting downstream fluid. Transient operating points are produced at each downstream set valve open state. Transient operating points establish a transient transverse line for each downstream set valve open state.

(2) Downstream pressure of a fluid control device is controlled by a set valve. Upstream pressure and fluid flow rate are regulated for either increasing or decreasing linear fluid pressure and fluid flow rate. For either regulation protocol, ramp operating points are produced at each downstream set-valve open state. Ramp operating points establish a ramp transverse line for each downstream set-valve open state.

(3) Downstream pressure of the fluid control device is controlled by a set valve. Upstream pressure and fluid flow rate are regulated at a constant-steady-state condition. One constant-steady-state operating point is produced at each downstream set-valve open state for each upstream constant-steady-state condition. Multiple constant-steady-state operating points that are produced by a constant downstream set-valve open state establish a constant-steady-state transverse line.

(4) Downstream pressure of a fluid control device is controlled by a back pressure regulator. Upstream pressure and fluid flow rate may or may not be regulated. Depending upon the type of upstream regulation, at least one transient, ramp, or constant-steady-state operating point is produced for each back pressure setting. A constant back pressure regulator setting and multiple upstream regulator settings produce multiple operating points. These operating points establish a regulator line that is displaced from the origin.

The identification of gas-lift valve operating points permits re-testing fluid pressure and fluid flow rate performance to evaluate closely the effect of variations in upstream and downstream pressures. The slope of a transverse line has dimensions of fluid flow rate with respect to downstream fluid control device pressure SCM/D/kPa (MSCF/D/pound downstream device pressure), which is a dimension of fluid conductivity. Fluid conductivity and operating points are not available with conventional flow-loop test systems. The FEPTS-TRST invention produces operating points, transverse lines, and measures of conductivity that can be evaluated repeatedly at any location on a performance graph of fluid pressure and fluid flow rate. Fluid conductance is a measure of the sensitivity of pressure-sensitive fluid control devices to simultaneous changes in upstream pressure, downstream pressure, and fluid flow rate. This FEPTS-TRST new result couples upstream and downstream test data, which cannot be coupled by conventional industry standard CIPT and CPPT flow-loop tests. The transverse lines constructed from FEPTS-TRST test data represent a continuum of flow rates for a continuum of downstream pressure control settings at a continuum of upstream device pressures. The slope of a transverse line shows how a pressure-sensitive fluid control device responds to changes in upstream pressure and downstream pressure when the conductance of fluid flow is constant. For example, on a FEPTS-TRST graph, conductance may vary from 29.41 SCM/D/MegaPa (0.1124 MSCF/D/#) with 6307 kPa (900 psig) upstream device pressure, 6238 kPa (890 psig) downstream pressure, and 2.817 MSCM/D (100 MSCF/D) fluid flow rate, to 842.3 SCM/D/MegaPa (3.219 MSCF/D/#) with 6307 kPa (900 psig) upstream device pressure, 1205 kPa (160 psig) downstream pressure, and 14.583 MSCM/D (515 MSCF/D) fluid flow rate. These conductances also exist at 5962 kPa (850 psig) upstream device pressure, 5927 kPa (845 psig) downstream pressure, and 2.690 SCM/D (95 MSCF/D) fluid flow rate, and at 5962 kPa (850 psig) upstream device pressure, 929 kPa (120 psig) downstream pressure, and 10.9 MSCM/D (385 MSCF/D) fluid flow rate, respectively. The slope of a transient, ramp, or constant-steady-state transverse line, and therefore the fluid conductivity of a fluid control device under evaluation at a series of related operating points, can be determined by one point within the fluid control device operating region. Each transient, ramp, or constant-steady-state transverse line is focused on the origin of coordinates.

Under periodic-steady-state testing conditions, the amplitude, frequency, and duty cycle associated with energy pulses generated by the FEPTS-TRST invention can be increased or decreased, depending upon reservoir reserve capacity and the demands of a test protocol. This control of energy pulses produces a wide range of fluid driving functions that can be used to test a fluid control device. For example, periodic-steady-state energy pulses can be generated for periods that may last a fraction of a second or that may last several seconds or minutes.

Periodic-steady-state fluid pressure and fluid flow rate operating conditions are generated in two ways.

(1) Upstream device reservoir fluid pressure and fluid flow rate are regulated explosively at a specific set point. Downstream fluid pressure and fluid flow rate are controlled at a specific set-valve open state. Periodicity in regulation is achieved by either bang-bang operation of an upstream control valve at a specific upstream regulating set point or by analog control of the regulator set point. Bang-bang control is a preferred embodiment. Upstream reservoir periodic fluid pressure and fluid flow rate are controlled by adjusting the bang-bang duty cycle, which permits the target reservoir to lose fluid pressure and fluid and to recharge with periodic consistency. Various pulsating steady-state conditions can be generated by shifting the set point of the upstream regulator (2) Upstream device reservoir fluid pressure and fluid flow rate are regulated explosively at a specific set point. Downstream fluid pressure and fluid flow rate are controlled by adjusting a downstream set-valve open state. The downstream set point can be changed to reflect a level of fluid conductivity. Shifting the downstream set point is accomplished by either analog control or bang-bang control with variable duty cycle. Various pulsating steady state conditions are generated by shifting the set point of a downstream set valve.

Sounds generated by fluid flowing through a fluid control device are recorded by one microphone with a dedicated channel placed upstream of the device under test and a second microphone with a dedicated channel placed downstream of the device under test. Dual channel sound data show that upstream sound data correlate well with upstream and downstream fluid pressure and flow rate test data while downstream sound data do not have a similar property.

Accordingly, objects and advantages of the FEPTS-TRST invention are:

(1) to provide apparatus and methods to generate, from short duration energy pulses, fluid pressure and fluid flow rate test data that describe transient, ramp, constant-steady-state, or periodic-steady-state fluid pressure and fluid flow rate profiles for pressure-sensitive fluid control devices;

(2) to provide apparatus and methods to improve the FEPTS apparatus and methods taught by U.S. Pat. No. 6,591,201, in order to generate transient, ramp, constant-steady-state, and periodic-steady-state fluid pressure and fluid flow rate test data for pressure-sensitive fluid control devices from short duration energy pulses.

(3) to provide apparatus and methods to direct computer-generated signals to a plurality of integrated control valves, set valves, and regulators in order to extend the capabilities of the FEPTS apparatus;

(4) to provide apparatus and methods for an explosive fluid pressure regulation assembly for HPHFFR energy pulse generation so that explosive fluid pressure and fluid loss from fluid reservoirs can be restored;

(5) to provide test methods to generate data for evaluating different operating regions of a fluid control device in order to determine the sensitivity of the device to changes in fluid pressure;

(6) to establish transient performance curves as useful tools for describing the dynamic operation of pressure sensitive fluid control devices;

(7) to provide a method to correlate HPHFFR transient and ramp performance curves to constant-steady-state performance curves for a given fluid control device, (8) to show how the dual sensitivities of a pressure-sensitive device to upstream and downstream fluid pressure can be captured on a performance graph;

(9) to show that transverse performance lines can be constructed by identifying a single operating point on a graph of test data;

(10) to provide apparatus and methods that demonstrate procedures to test and retest HPHFFR fluid control devices with a large reduction in time, facilities, personnel, and cost compared to conventional flow-loop testing;

(11) to provide apparatus and methods to control the temperature of a temperature sensitive fluid control device when the device is subjected to transient, ramp, constant-steady-state, and periodic-steady-state fluid pressure and fluid flow rate test protocols.

(12) to provide apparatus and method to generate sound data for a fluid control device under test, which sound data can be correlated with fluid pressure and fluid flow rate test data that are measured by fluid pressure and fluid flow rate transducers.

(13) to provide apparatus and methods to replace large, expensive, and expensive to operate, conventional flow-loop test facilities that currently produce a limited evaluation of the dynamic operation of a fluid control devices under test, by providing test data that are difficult to analyze, lower in accuracy, lower in precision, higher in error, lower in scientific value, and time consuming to generate in comparison to the FEPTS-TRST apparatus and methods.

Further objects and advantages will become apparent from consideration of the following descriptions and drawings.

BRIEF DESCRIPTION OF THE DRAWINGS

The FEPTS-TRST invention, its combinations and connections of components, its principles of operation, and its methods to test and evaluate fluid control devices and systems, will be more fully understood by the description given below with reference to the detailed description of the preferred embodiment and accompanying drawings, in which like reference numerals identify like elements in different figures, and in which related figures and elements have the same number but different alphabetic suffixes.

FIG. 1 shows a perspective view of the FEPTS equipment used to test dynamic performance characteristics of fluid control devices.

FIG. 2 shows an overall schematic block diagram of the FEPTS equipment, generally illustrating a compressor system, a valve control system, and a data acquisition system.

FIG. 20A shows a circular, first-device heat exchanger that controls the temperature of nitrogen in a nitrogen-charged gas-lift valve under test.

FIG. 20B shows a cross-sectional view of the circular first-device heat exchanger of FIG. 20A, with pressure-sealing "O" rings included.

FIG. 20C shows a flexible-tube, second-device heat exchanger into which a temperature transducer is placed to indicate the temperature of the exterior wall of a nitrogen-charged gas-lift valve under test.

FIG. 20D shows a prior art spring clamp that secures the flexible-tube, second-device heat exchanger of FIG. 20C to a gas-lift valve under test to prevent leaking of heat-exchanger fluid.

FIG. 20E shows a gas-lift valve configured with the circular first-device heat exchanger of FIG. 20A, the flexible-tube second-device heat exchanger of FIG. 20C, and the spring clamp of FIG. 20D.

FIG. 20F shows a flexible bladder first-device heat exchanger for a fluid control device under test.

FIG. 20G shows tie straps to secure the flexible bladder first-device heat exchanger of FIG. 20F to a fluid control device.

FIG. 20H shows a split-core first-device heat exchanger to be placed around a fluid control device under test.

FIG. 20I shows a hose clamp for the split-core first-device heat exchanger hoses, shown in FIG. 20H.

FIG. 20J shows a screw clamp to secure the halves of the split-core first-device heat exchanger of FIG. 20H.

DETAILED DESCRIPTION OF THE DRAWINGS

FEPTS-TRST apparatus and methods use HPHFFR energy pulses in the generation of transient, ramp, constant-steady-state, and periodic-steady-state fluid pressure and fluid flow rate test data for temperature-controlled fluid control devices, to establish transient, ramp, and constant-steady-state operating points, transverse lines, regulator lines, and performance curves that characterize the dynamic operation of a tested device, and to demonstrate how sound data for a tested device can be correlated with fluid pressure and fluid flow rate test data. The FEPTS-TRST apparatus and methods are derived, in part, from FEPTS apparatus and methods described in U.S. Pat. No. 6,591,201. In the FEPTS-TRST apparatus, a directional switch array, an explosive regulation assembly, a test chamber assembly, a temperature control assembly, and an audio assembly are integrated with FEPTS equipment, which equipment includes fluid reservoirs, control valves, set valves, a computer-based valve control system, and a computer-based data acquisition system. The FEPTS-TRST apparatus and methods regulate fluid pressure and fluid flow rate, regulate temperature of a fluid control device under test, and provide a variety of means to evaluate the device under test.

Figure 1:
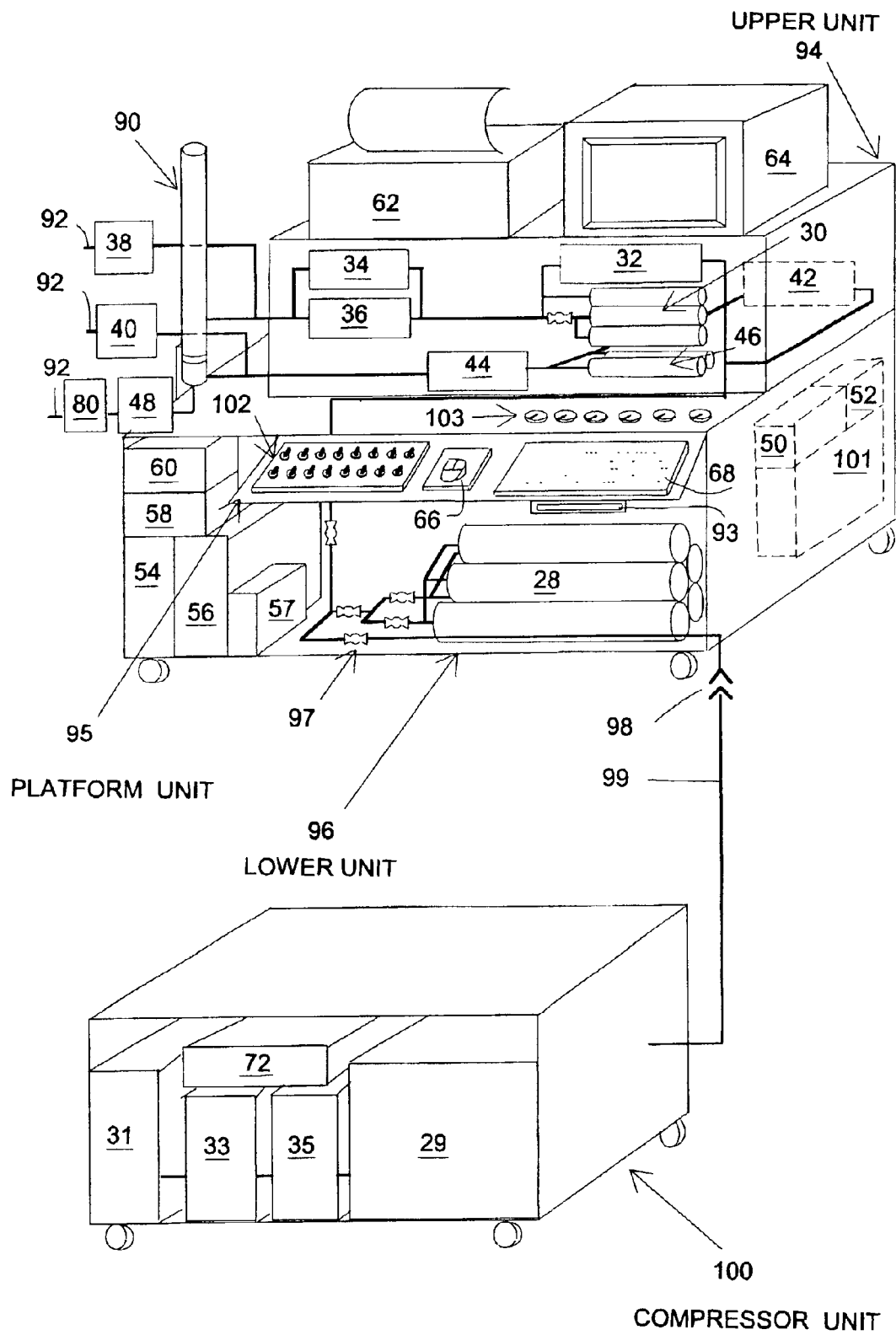
FIG. 1 and FIG. 2 refer to the FEPTS equipment and methods to provide a reference for the preferred embodiment of the FEPTS-TRST apparatus and methods. It should be understood that the FEPTS-TRST does not, in any way, limit the capabilities of the FEPTS. The FEPTS-TRST extends the capabilities of the FEPTS by generating transient, ramp, constant-steady-state, and periodic-steady-state fluid driving functions from short-duration fluid energy pulses to test and to evaluate fluid control devices in a cost effective and efficient manner.
Figure 2:
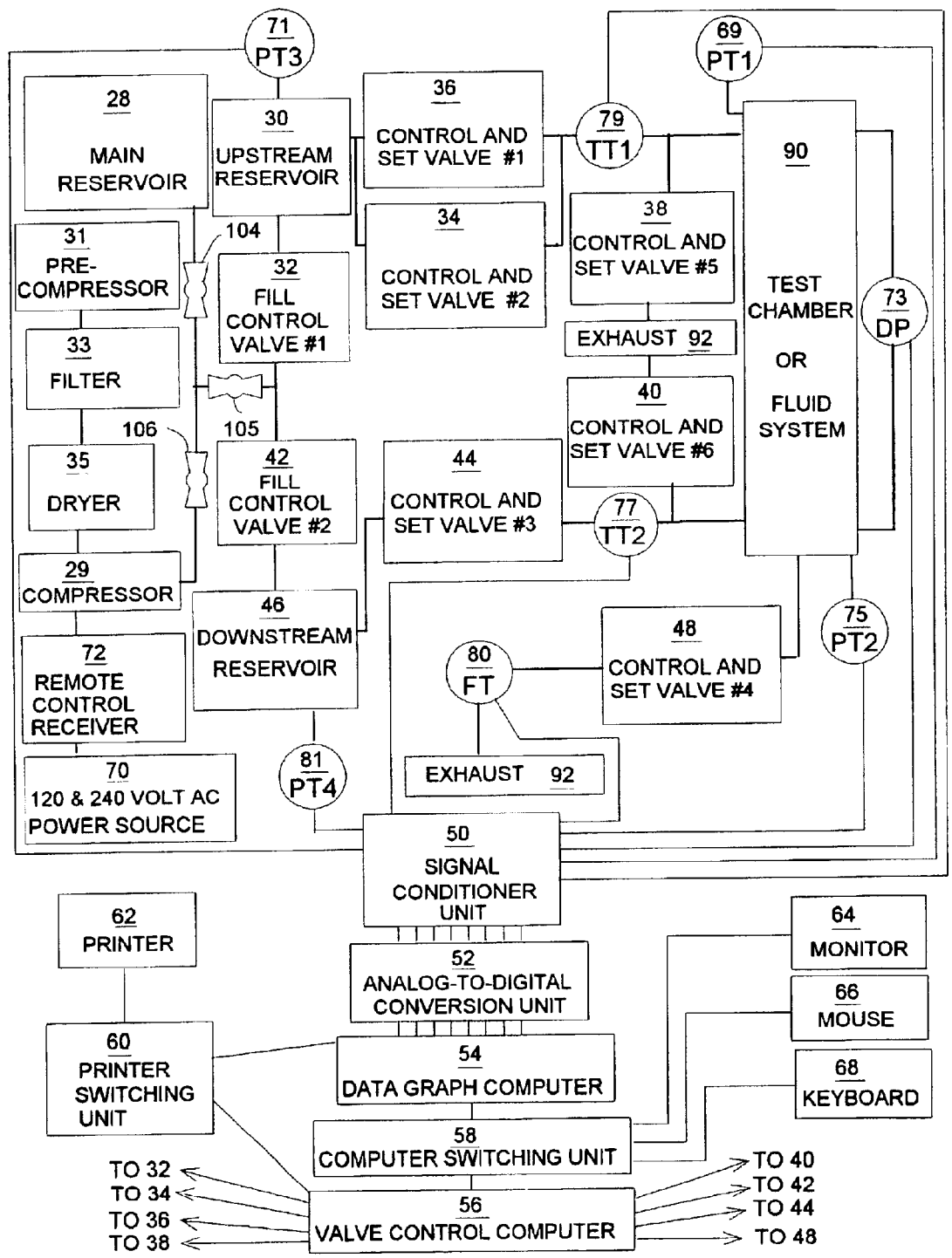

FIG. 1 and FIG. 2 summarize FEPTS apparatus and methods to provide a reference for the FEPTS-TRST apparatus and methods.

FIG. 1 shows a perspective view of the FEPTS equipment, including upper unit 94, platform unit 95, lower unit 96, and compressor unit 100. Upper unit 94 includes upstream reservoir 30; first fill control valve 32; second fill control valve 42; downstream reservoir 46; first-through-sixth control and set valves 34, 36, 38, 40, 44, and 48, respectively; test chamber 90; exhaust pipes to the atmosphere 92; flow rate transducer 80; pressure, differential pressure, and flowing fluid temperature transducers [not shown]; and associated pipes. Computer printer 62 and computer monitor 64 are positioned on top of upper unit 94. Platform unit 95 includes override switches 102 for manual control of fill, control, and set valves; bar switch 93 to shift control between a valve control computer 56 and data graph computer 54; computer mouse 66; and computer keyboard 68. Lower unit 96 includes visual high-pressure analog safety gauges 103 connected to high-pressure pipes [connections not shown]; ball valve assembly 97 for opening and securing main reservoir 28; multiple power supplies 101 for transducers and for electrically operated valves connected to a 120 volt AC electrical power source [not shown]; remote control receiver 57 to activate 120 volt AC power; valve control computer 54; data graph computer 56; computer switching unit 58 connected to bar switch 93 [connection not shown]; signal conditioning unit 50; analog-to-digital converter 52; automatic printer switching unit 60; and high-pressure coupling 98. Compressor unit 100 includes compressor 29; pre-compressor 31; pneumatic filter 33; pneumatic dryer 35; remote control receiver 72 to activate 230 volt AC power; and high-pressure fill line 99 that connects to coupling 98 in the lower unit.

FIG. 2 shows a block diagram of the principal components and connections of the FEPTS equipment. Main reservoir 28 is charged with compressed fluid from compressor 29 through ball valves 104 and 106. Ball valve 105 permits filling of either upstream reservoir 30 or downstream reservoir 46 through first fill control valve 32 or second fill control valve 42, respectively. Pre-compressor 31 provides fluid to compressor 29 through pneumatic filter 33 and pneumatic dryer 35. Pre-compressor 31 and compressor 29 are operated on 120 volt and 240 volt AC power source 70 by remote control receiver 72. Ball valves 104, 105, and 106 ensure the integrity of main reservoir 28 when the equipment is not operating.

Upstream reservoir 30 connects to test chamber 90 by pipes through first control and set valve 36 and second (bypass) control and set valve 34. Upstream piping connects to exhaust 92 through fifth control and set valve 38. Transducer FT 80 measures fluid flow rate. Fluid pressure transducers PT1 69, PT2 75, PT3 71, and PT4 81 acquire fluid pressure data upstream and downstream of test chamber 90. Differential pressure transducer DP 73 acquires confirming pressure difference across test chamber 90. Temperature data are acquired by temperature transducers TT1 79 and TT2 77 for upstream flowing fluid and downstream flowing fluid, respectively, to measure accurately fluid flow rate, which is temperature-dependent.

Transducers 69, 71, 73, 75, 77, 79, 80, and 81 connect to power supplies [not shown] and to signal conditioner unit 50. Transducer signals convey temperature, fluid pressure, and fluid flow rate information to data graph computer 54 through analog-to-digital conversion unit 52. Fill control valves 32 and 42, and control and set valves 34, 36, 38, 40, 44, and 48 connect to valve control computer 56. Voltage-to-voltage signal transformation generates sufficient current to operate the control and set valves.

Printer 62 connects to data graph computer 54 and valve control computer 56 through automatic printer switching unit 60. Monitor 64, mouse 66, and keyboard 68 connect to computer 54 and computer 56, through computer switching unit 58. Switching unit 58 is activated by bar switch 93 [FIG. 1] to shift control between computer 54 and computer 56. During computer start up operations, computer 54 starts first and connects to monitor 64, mouse 66, and keyboard 68. After a delay, when computer 56 has confirmed connections, computer 54 automatically starts and connects to monitor 64, mouse 66, and keyboard 68. Each computer assumes that a monitor, a mouse, and a keyboard are connected. Bar switch 93 permits shifting of control between computers 54 and 56 with the full functionality of monitor 64, mouse 66, and keyboard 68. Shifting computer control between two computers provides advantages over using a single computer. Complex test protocols are designed, checked, and simulated before conducting a high-pressure test. During long tests, control is shifted between computers to observe valve control activity or data acquisition activity. Multiple, identical test protocols are configured quickly to evaluate data acquisition parameters such as sampling time. Troubleshooting of electrical connections is facilitated. Separation is maintained between high direct-current valve control signals and low direct-current data acquisition signals.

The FEPTS equipment is small and compact. One person can perform tests and evaluate the test data.

FEPTS equipment generates different types of fluid energy pulses so that a variety of fluid control devices can be tested. The types of fluid energy pulses generated include short-duration fluid energy pulses with explosive power; long-duration and slowly rising energy pulses without large pressure surges, combinations of energy pulses, and decreasing amplitude, periodic fluid energy pulses. However, FEPTS equipment does not provide driving functions to generate fluid pressure and fluid flow rate test data that are required to construct constant-steady-state performance curves for tested fluid control devices, because of inadequate quantities of upstream fluid, inadequate regulation of upstream reservoir pressure, and inadequate regulation of back-pressure downstream of the device under test. The FEPTS equipment also does not generate periodic-steady-state driving functions.

When a test is conducted with FEPTS equipment, an operator selects an apparatus configuration, a computer-dependent valve control protocol, and a computer-dependent data acquisition protocol. A test can specify an open-to-the-atmosphere, a partly-open-to-the-atmosphere, or a closed-to-the-atmosphere configuration, each of which requires selecting a fluid path with appropriately connected fluid pipes and components; selecting the open state of any fixed set valves in the fluid path; and selecting initial upstream and downstream fluid pressure and fluid flow rate conditions.

A computer-dependent valve control protocol specifies the opening and closing of bang-bang control valves and specifies the increasing or decreasing of the open state of set valves during a test. Variation in timing sequences for the control valves and set valves is unlimited. Time-lines for all bang-bang control valves and set valves are printed either before or after a test is completed. Pulse amplitude is determined by driving pressure and fluid flow rate. Variables that must be selected for each bang-bang control valve are number of pulses, pulse duration, pulse period, and pulse delay. Test time is limited by the amount of fluid energy available and by the computer data-storage capacity.

A computer-dependent, data acquisition protocol requires selecting transducer calibration; test duration, sampling interval; name of test data file; data channels to be activated; a scale for each activated channel; and identification of special test data events; if any, such as data breakaway, data maximum, or data minimum records. Test data and time-dependent or parametric graphs of test data are printed after a test is completed.

With the present FEPTS-TRST invention, the correlation of transient, ramp, constant-steady-state, and periodic-steady-state test data provides a way to establish transient and ramp performance curves as templates for fluid control devices manufactured to the same specifications and, thus, to reduce the need to conduct extensive constant-steady-state tests for each device. Moreover, specific regions of a performance curve can be evaluated and re-evaluated to identify throttling characteristics, possible manufacturing defects, and operating properties or features of newly designed fluid control devices. Neither the FEPTS-TRST methods of acquiring test data, nor the correlation of test data, nor the graphical renderings of test data by transverse lines and scatter graphs, as described herein, should be construed as limiting the presentation of test data or the manner in which such data are acquired.

A detailed description of the drawings of the FEPTS-TRST is intended to cover alternatives, augmentations, and equivalents, as may be included within the spirit and scope of the FEPTS-TRST invention, as defined by the appended claims. The apparatus and methods are described with respect to a preferred embodiment. This description should be construed, not as limiting the scope of the present invention, but as providing illustration of a presently preferred embodiment.

Figure 3:
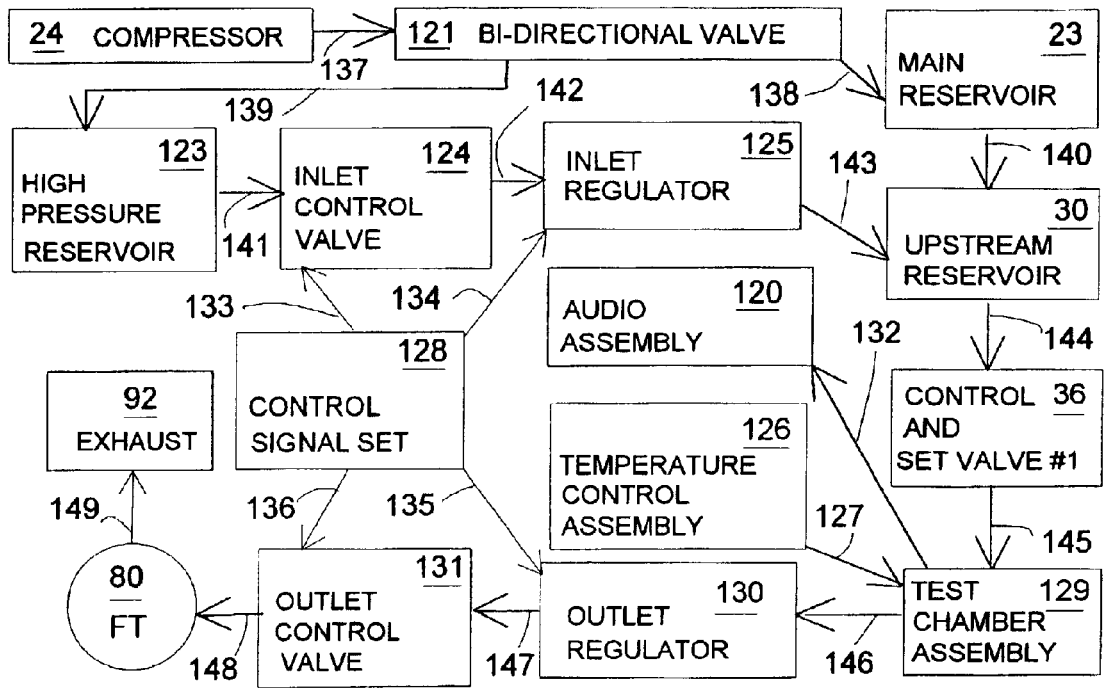
FIG. 3 shows a block diagram of FEPTS-TRST components that are integrated with FEPTS components to regulate upstream reservoir fluid pressure and fluid flow rate, to regulate injection pressure and fluid flow rate, to control production pressure and fluid flow rate, to record and playback sound information about fluid flowing through a fluid control device under test, and to control the temperature of a device under test.

Accordingly, FIG. 3 shows a block diagram of principal components and connections of the FEPTS-TRST apparatus. Compressor 29 connects by pipe 137 to bi-directional valve 121 that connects by pipe 138 to main reservoir 28 and by pipe 139 to high pressure reservoir 123, so that reservoirs 28 and 123 can be recharged by compressor 29. Main reservoir 28 connects to upstream reservoir 30 by pipe 140. High pressure reservoir 123 provides inlet fluid and pressure for upstream reservoir 30 during regulated fluid pressure and fluid flow rate tests. Fluid flows through inlet control valve 124 and inlet regulator 125 through pipes 141, 142, and 143. The block designated control signal set 128 includes inlet control-valve control signal 133 that opens and closes inlet control valve 124, and inlet regulator control signal 134, that operates DC motor 202 [FIG. 5], which motor determines the set point of inlet regulator 125. In the preferred embodiment of the FEPTS-TRST, a high-pressure-to-high-pressure, piston regulator is installed as inlet regulator 125 to regulate inlet fluid pressure and fluid flow rate. In another embodiment of the FEPTS-TRST, inlet fluid pressure and fluid flow rate are regulated by a ball-type set valve, precisely designated hereinafter inlet regulator (set valve) 125. In the preferred embodiment of the FEPTS-TRST, an electro-pneumatic fluid control valve is used as inlet control valve 124; an electromagnetic fluid control valve can also be used. Valve control computer 56 [FIG. 2] generates control signals 133, 134, 135, and 136 in control signal set 128. Inlet control valve 124, inlet regulator 125, inlet control-valve control signal 133, and inlet regulator control signal 134 are combined to form explosive regulation assembly 224 [described in FIG. 6] that recharges upstream reservoir 30 when fluid is depleted explosively from the reservoir through pipe 144 to control and set valve 36 and through pipe 145 to test chamber assembly 129 [FIG. 21F].

When a gas-lift valve is installed in test chamber assembly 129, the assembly connects upstream by pipe 145 to control and set valve 36 and downstream by pipe 146 to outlet regulator 130, which regulator connects by pipe 147 to outlet control valve 131. In the preferred embodiment of the FEPTS-TRST, a set-valve regulator is installed as outlet regulator (set valve) 130 to regulate outlet fluid pressure and fluid flow rate. In another embodiment of the FEPTS-TRST, outlet fluid pressure and fluid flow rate are regulated by a back-pressure regulator, precisely designated hereinafter as outlet regulator (back-pressure) 130. Outlet regulator control signal 135 alters the set point of outlet regulator (set valve) 130. Outlet control-valve control signal 136 alters the state of outlet control valve 131 for bang-bang control. When outlet control valve 131 is in an open state, fluid flows through the valve, passes through pipe 148 to flow transducer FT 80, and leaves at exhaust 92 by pipe 149. The block designated temperature control assembly 126 [described in FIG. 19], connects by insulated heat exchanger piping 127 to a fluid control device [not shown] installed in test chamber assembly 129, and includes a temperature set-point controller, and heat exchangers, which components set and control the temperature of the device under test, if required by a test protocol. The block designated audio assembly 120 [described in FIG. 23], receives audio data on electrical wires 132, and includes an audio-recording computer;

microphones and speakers to monitor injection pressure and production pressure; and a means to record sound tracks of fluid flowing through a fluid control device under test, if audio is required by a test protocol.

The timing sequence for control signals 133, 134, 135, and 136 can be simple or complex. Before a test is initiated, control signals 133, 134, 135, and 136 are off. In the simplest timing sequence, the set point of inlet regulator 125 and the percent-open condition of outlet regulator (set valve) 130 are held constant; inlet regulator control signal 134 and outlet regulator control signal 135 are kept off, and inlet control-valve control signal 133 and outlet control-valve control signal 136 are turned on for a specified time for bang-bang control. In complex timing sequences, the set point of inlet regulator 125, the percent-open condition of outlet regulator 130, and the bang-bang control of inlet control valve 124 and of outlet control valve 131 can be varied automatically by computer control of the on-states and off-states of control signals 133, 134, 135, and 136.

Figure 4:
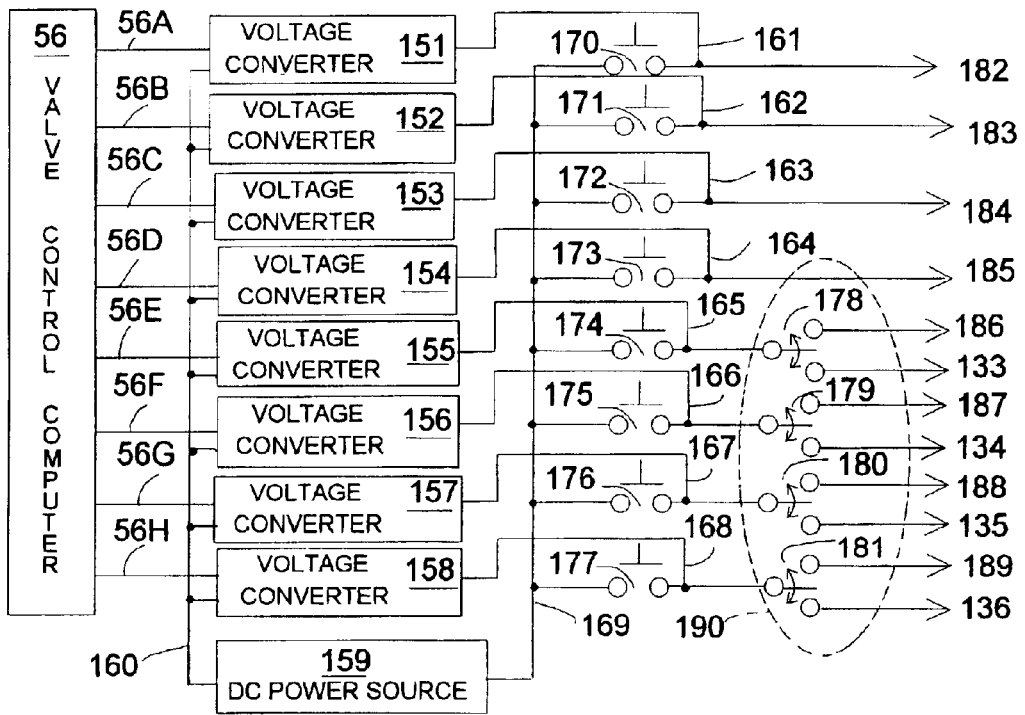
FIG. 4 shows a schematic diagram of the directional switch array with electrical connections and directional switches for directing electrical control signals to integrated control valves, set valves, and regulators.

FIG. 4 shows a schematic diagram of a directional switch array for control signals that control the bang-bang states of control valves, the open states of set valves, and the set-point states of regulators. Control signals 182, 183, 184, 185, 186, 187, 188, and 189 are FEPTS control signals. Control signals 133, 134, 135, and 136 are FEPTS-TRST control signals. Inlet control-valve control signal 133, outlet control-valve control signal 136, inlet regulator control signal 134, and outlet regulator control signal 135 are directed to inlet control valve 124, outlet control valve 131, inlet regulator 125, and outlet regulator 130, respectively [see FIG. 3], by directional switches 178, 179, 180, and 181, respectively. Control signals 133, 134, 135, and 136 are integrated with control signals 182, 183, 184, and 185 to position control valves, set valves and regulators. Directional switches 178 through 181 are shown as switch group 190, that extends the control capabilities of FEPTS equipment to additional control valves, set valves, and regulators in the FEPTS-TRST improvement.

In FIG. 4, valve control computer 56 generates low voltage control signals on electrical wires 56A, 56B, 56C, 56D, 56E, 56F, 56G, and 56H that are connected to voltage-to-voltage converters 151, 152, 153, 154, 155, 156, 157, and 158, respectively. After each computer-generated low voltage control signal is converted to a high current signal, the converted signals are transmitted on electrical wires 161, 162, 163, 164, 165, 166, 167, and 168 and become output signals 182, 183, 184, 185, 186, 187, 188, and 189. Low voltage control signals on electrical wires 56A through 56H are converted to high-voltage, high-current signals by DC power source 159. Power source 159 connects converters 151 through 158 by electrical connections 160 and to momentary-button switches 170, 171, 172, 173, 174, 175, 176, and 177 by electrical connections 169. To control all FEPTS control valves and set valves, directional switches 178, 179, 180, and 181 are positioned if to FEPTS equipment. To control integrated control valves, set valves, and regulators, one or more directional switches 178, 179, 180, and 181 are positioned to FEPTS-TRST equipment, which converts control signals 186, 187, 188, and 189 to control signals 133, 134, 135, and 136, respectively. Momentary-button switches 170 through 177 permit all control valves, set valves, and regulators to be controlled independently of the operation of valve control computer 56.

Figure 5:
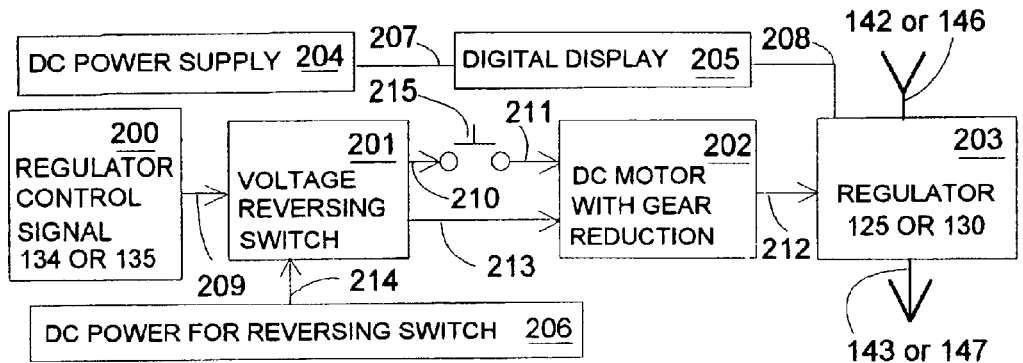
FIG. 5 shows a block diagram of components used to position a set valve or the set point of a high-pressure regulator in order to control the fluid pressure in, and fluid flow into, a target reservoir.

FIG. 5 shows a block diagram of generic components that support inlet regulator 125 and outlet regulator 130. Said generic inlet and outlet components are designated herein by numbers 200 through 215. Either inlet regulator control signal 134 or outlet regulator control signal 135, each re-designated here as regulator control signal 200, is connected to voltage reversing switch 201 by electrical wire 209. Voltage reversing switch 201 is connected to DC power supply 206 by electrical wire 214. Reversing switch 201 sets positive or negative voltage that will alter the direction of motion of DC motor with gear reduction 202. Direct electrical connection 213 provides a path for computer-generated, high-current regulator control signal 200 with polarity that may be reversed depending upon the setting of reversing switch 201. Alternative control is provided by connecting momentary-button switch 215 to reversing switch 201 by electrical wire 210 and to DC motor 202 by electrical wires 211. DC motor 202 connects to the stem of regulator 203 by mechanical connection 212.

Inlet fluid flows through generic regulator 203, which can be designated as inlet regulator 125, from pipe 142 to pipe 143. Outlet fluid flows through generic regulator 203, which can be designated as outlet regulator 130, from pipe 146 to pipe 147. A reduction gear [not shown] generates torque to change the position of the stem of regulator 203. Digital display 205 shows the set point of regulator 203. Digital display 205 connects to a stem-position sensor [not shown] of regulator 203 by electrical wire 208. DC power supply 204 connects to digital display 205 by electrical wire 207.

DC motor with gear reduction 202 is the preferred embodiment to drive the positioning stem of regulator 203 in order to change rapidly a regulator set point condition. A DC motor increases the speed of response of regulator 203 in comparison to a stepping motor. If the response time of regulator 203 is sufficiently fast, the position of the stem of the regulator can be controlled during a test that lasts seconds. Test data show that regulators accompanied by bang-bang control for explosive regulation generate pressure-settling times to constant steady state in one to two seconds. In an embodiment that uses set-valve regulation, mechanical properties of DC motor 202 generate changes in the open-condition of set valve regulator 203 of 20% per second, or more, to achieve a response time of five, seconds or less, for a transition from a full-open state to a full-closed state. This fast response time permits fluid flow rate to be increased or decreased during a test with a limited supply of available test fluid.

In the preferred embodiment of the FEPTS-TRST, fluid pressure and fluid loss in an upstream target reservoir are restored by a piston-type generic regulator 203. The set point state of the regulator is fixed when a test is initiated. This initial set point state can be changed by a computer-generated, high-current regulator control signal 200 or by a signal from momentary-button switch 215 to DC motor with gear reduction 202.

Figure 6:
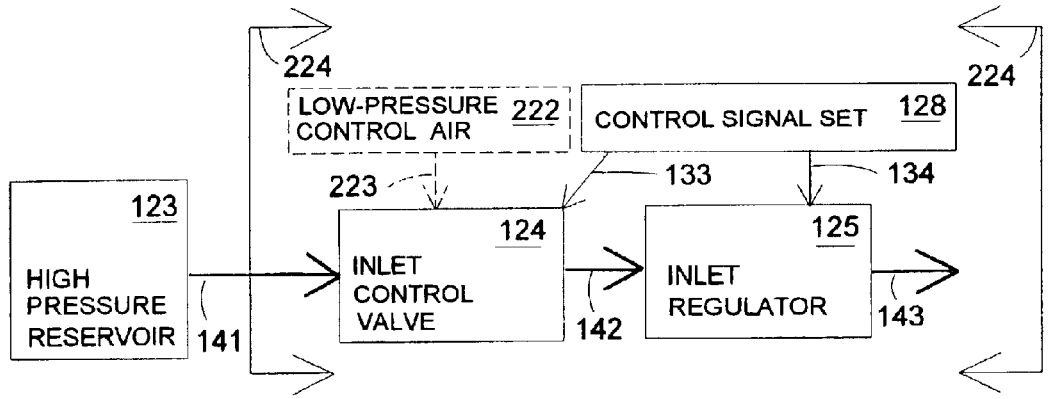
FIG. 6 shows a block diagram of an explosive regulation assembly to regulate upstream reservoir pressure, injection pressure, and fluid flow rate for a fluid control device under test.

FIG. 6 shows a generic block diagram of the components of explosive regulation assembly 224 with high pressure reservoir 123 for inlet regulation of fluid pressure and fluid flow rate. Fluid pressure and fluid flow rate are regulated at pipe 143. High pressure reservoir 123 connects by pipe 141 to inlet control valve 124, the preferred embodiment of which is a ball-type electro-pneumatic valve for obstructionless flow when the valve is open. In another embodiment, an electro-mechanical control valve can be used. Inlet control valve 124 connects by pipe 142 to inlet regulator 125. Fluid pressure regulation is generated when inlet regulator 125, alternatively, inlet regulator (set valve) 125, provides fluid pressure and fluid recovery to upstream reservoir 30 [FIG. 3] through pipe 143 to match the fluid loss at exhaust 92 [FIG. 3]. The regulation of fluid pressure and fluid flow rate is dependent upon the pressure level and the amount of fluid in high pressure reservoir 123, the set point of inlet regulator 125, alternatively, the percent-open condition of inlet regulator (set valve) 125, the percent-open condition of outlet regulator (set valve) 130, alternatively, the set point of outlet regulator (back pressure) 130, the bang-bang states of inlet control valve 124 and of outlet control valve 131, and the dynamic properties of the fluid control device under test.

During inlet regulation, the use of an electro-pneumatic inlet control valve 124 requires low-pressure control air 222 connected by pipe 223 to an air cylinder [not shown] in order to generate torque for the bang-bang positioning of inlet control valve 124. The air cylinder is mechanically coupled to the ball valve handle of inlet control valve 124 so that the valve is normally closed. Inlet control valve 124 is opened when inlet control-valve control signal 133 is turned on to releases low-pressure control air 222 to the coupled air cylinder, which release changes the position of the air cylinder and opens the valve. When inlet control-valve control signal 133 is turned off, control air is redirected in the air cylinder, closing inlet control valve 124. This control of fluid pressure and fluid flow rate is described herein as explosive regulation.

If fluid pressure and fluid flow rate regulation must be altered during a test, valve control computer 56 sends inlet regulator control signal 134 to activate a DC motor that changes the set point of inlet regulator 125, alternatively, inlet regulator (set valve) 125.

The degree of regulation depends upon the fluid pressure and fluid flow rate requirements of a test. A selected change in the set point of inlet regulator 125 during a test depends upon the duration of control signal 134, upon the response time of inlet regulator 125, and upon the percent-open condition of outlet regulator (set valve) 130, alternatively the set point of outlet regulator (back pressure) 130.

Controlled studies of inlet explosive regulation show that altering regulated fluid pressure and fluid flow rate during a constant-steady-state test of a fluid control device provides no advantage in generating test data. On the contrary, because a settling time is needed for each change of the regulator set point, changing regulator settings during a constant-steady-state test will degrade test data. No benefits are derived from changing regulation during a test because any operating point of a fluid control device under test can be pre-set in order to acquire test data.

Figure 7:
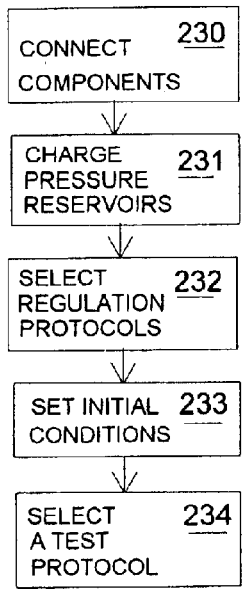
FIG. 7 shows a block diagram of set-up procedures to initiate the regulation of fluid pressure and fluid flow rate by an explosive regulation assembly.

FIG. 7 shows a block diagram of procedures required to connect equipment and to select regulator settings when conducting tests on fluid control devices such as gas-lift valves.

Step 230 establishes a configuration for the test equipment. Control valves, set valves and regulators that are controlled by valve control computer 56 [FIG. 2 and FIG. 4], must be sized, installed, and tested for the type of tests to be conducted. Temperature control of a device installed in test chamber assembly 129 is achieved by a temperature control assembly [FIG. 19] that holds the temperature of-the device constant. Temperature control does not require a computer-generated control signal because a temperature set point is independently specified and controlled by temperature set-point controller 381 [FIG. 19]. Sound recording and playback assembly microphones are installed in test chamber assembly 129 and connected to audio-recording computer 530 [FIG. 23] for the recording of fluid sounds from fluid flowing through a device under test.

Step 231 sets up regulation of fluid pressure and fluid flow rate. Step 231 requires high pressure reservoir 123 to be charged by compressor 29 to a pressure greater than the pressure required or expected in upstream reservoir 30. The amount of fluid in and the pressure of high pressure reservoir 123 restore fluid and fluid pressure lost by upstream reservoir 30 during a regulated test of a fluid control device.

Step 232 selects a control sequence for regulation of fluid pressure and fluid flow rate by inlet control valve 124, inlet regulator 125, outlet regulator (set valve) 130 or outlet regulator (back pressure) 130, outlet control valve 131, and other control and set valves such as control and set valve 36. Under flowing fluid conditions, the set point of outlet regulator (set valve) 130 or outlet regulator (back pressure) 130 establishes back pressure on a fluid control device installed in test chamber assembly 129. Outlet regulator 130 is sized so that the regulation orifice is larger than the largest orifice of the fluid control device under test. This sizing permits a condition of unrestricted flow through the device under test. Upstream of a device under test, the preferred embodiment is a piston-type inlet regulator 125 to regulate fluid pressure and fluid flow rate into upstream reservoir 30. Downstream of a device under test, an outlet regulator (set valve) 130 or outlet regulator (back pressure) 130 regulates the pressure and fluid flow rate to exhaust 92 [FIG. 3]. When a piston-type regulator is used for explosive regulation of upstream reservoir 30 in order to generate constant-steady-state fluid pressure and fluid flow rate conditions for a device under test, the outlet flow rate through outlet regulator (set valve) 130 or outlet regulator (back pressure) 130 will automatically match inlet fluid pressure and fluid flow rate demand within one to two seconds.

Downstream regulation of fluid pressure and fluid flow rate is achieved by either an outlet regulator (set valve) 130 or an outlet regulator (back pressure) 130 and outlet control valve 131. The choice of downstream regulator component depends upon the kinds of tests conducted and the range of back pressures of interest. If an outlet regulator (back pressure) 130 is chosen and the pressure range of outlet regulator (back pressure) 130 is too narrow, several back pressure regulators may be required to complete a tests. Conversely, in the preferred embodiment of the FEPTS-TRST, when a set valve is used as outlet regulator (set valve) 130, the set valve generates a fixed orifice condition over a wide range of back pressures and flow rates.

An alternative embodiment of explosive regulation to generate a constant-steady-state condition for a device under test uses a set valve for inlet fluid pressure and fluid flow rate regulation. In this embodiment, the inlet regulator (set valve) 125 percent-open condition and the outlet regulator (set valve) 130 percent-open condition must establish the same conditions for fluid conductivity. For example, in testing a gas-lift valve at high production pressure and low flow rate to generate a sub-critical operating point, inlet regulator (set valve) 125 has a low-percent open-condition and outlet regulator (set valve) 130 must have a similar low-percent open-condition. To generate a critical operating point at low production pressure and high flow rate, inlet regulator (set valve) 125 has a high-percent open condition and outlet regulator (set valve) 130 must have a similar high-percent open condition.

In the throttling region of a gas-lift valve, where the valve is sensitive to upstream and downstream pressures, the upstream pressure needed to open the valve may be insufficient to generate adequate fluid flow rate, causing the valve to close or to remain closed. The throttling region is characterized by fluid flow rates that are a function of gas-lift valve closing pressure and the differential pressure across the valve. This property of fluid flow rate dependence upon upstream pressure in the throttling region causes a further increase in fluid flow rate sensitivity generated by back pressure on the valve. Generating constant-steady-state fluid pressure and flow rate in the throttling region of a gas-lift valve requires careful adjustment of inlet regulator (set valve) 125. In the preferred embodiment, inlet regulator (regulator) 125 does not require careful adjustment. Gas-lift valves are most sensitive to fluid pressure and fluid flow rate variations at low throttling conditions where low flow rates and low valve-closing pressures prevail. For example, when testing a gas-lift valve, the percent-open condition for a 2.54 centimeter (one inch) ball-type outlet regulator (set valve) 130 can have any value from zero to 100%. One test procedure to generate gas-lift valve performance data uses pre-set percent-open conditions of 3%, 5%, 7%, 9%, 13%, 20%, 30% and 100% for outlet regulator (set valve) 130. The number of percent-open conditions at less than ten-percent open is a function of the set valve size and the gas-lift valve orifice size. A gas-lift valve with a 0.47625 centimeter (0.1875 inch) orifice, with back pressure set by a 2.54 centimeter (one inch) ball-type set valve, shows a high sensitivity to fluid pressure and fluid flow rate when the outlet regulator (set valve) is almost closed. Other sizes of outlet ball-type set valves and gas-lift valve orifices generate a similar range of percent-open conditions to acquire similar performance data. A throttling-type valve requires multiple rotations of the valve stem to achieve the same results as a ball-type valve for outlet regulator (set valve) 130.

Step 233 sets the initial conditions for regulation of fluid pressure and fluid flow rate. When inlet regulator 125 restores fluid pressure and fluid loss in upstream reservoir 30 and back pressure is generated by outlet regulator (set valve) 130, the set point for outlet regulator (set valve) 130 will control the regulation of upstream reservoir 30. As a result, upstream pressure and fluid flow rate regulation by inlet regulator 125 and downstream regulation by outlet regulator (set valve) 130, both under bang-bang control, is the preferred embodiment when configuring the equipment for either constant-steady-state tests or periodic-steady-state tests.

Step 234 selects a valve-control protocol that defines the sequence of events that comprise a test. Protocols include selecting test duration, pulse duration, pulse sequence, direction and amount of change of the set point of inlet regulator 125, direction and amount of change of outlet regulator (set valve) 130, and timing sequences for inlet control valve 124 and outlet control valve 131, and other control valves and/or set valves, such as control and set valve 36 [FIG. 3]. Control and set valve 36 directs fluid flow rate to a gas-lift valve under test. The percent-open condition of control and set valve 36 can be changed to choke fluid flow rate to a gas-lift valve installed in test chamber assembly 129. Choked fluid flow rate testing generates "choked flow" performance curves. When generating non-choked fluid flow rate performance data, control and set valve 36 is set to a full-open state to achieve unrestricted fluid flow rate. Choking flow rate to a gas-lift valve by control and set valve 36 lowers the fluid flow rate through the valve for specific upstream and downstream pressures.

Figure 8:
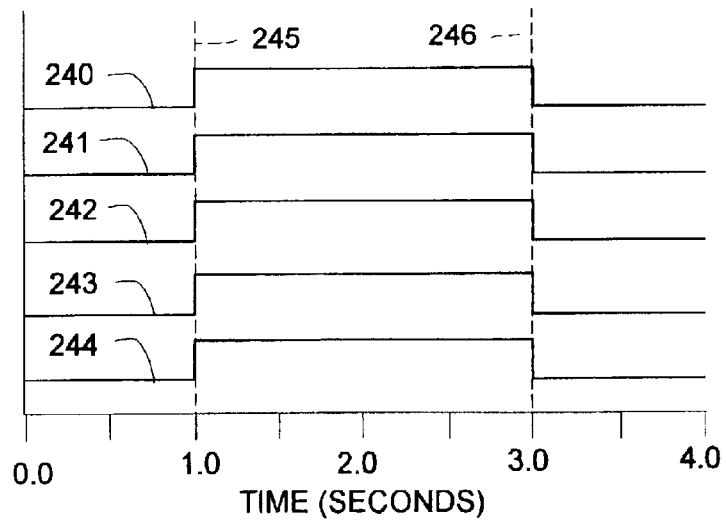
FIG. 8 shows a simplified timing sequence for the simultaneous operation of control valves, set valves, and regulators.

FIG. 8 is an example of a timing diagram for a protocol of a regulated test of a fluid control device that shows the simultaneous activation of one control and set valve 36, two control valves 124 and 131, and two regulators 125 and 130. Five pulses of two seconds duration are initiated simultaneously at time 1.0 seconds, as shown by start line 245, and end simultaneously at time 3.0 seconds, as shown by stop line 246. Time trace 240 shows activation of control and set valve 36. Time trace 241 shows activation of inlet control valve 124. Time trace 242 shows activation of outlet control valve 131. Time trace 243 shows activation of inlet regulator 125. Time trace 244 shows activation of outlet regulator (set valve) 130. During the two-second pulses, each regulator either increases or decreases its set point, and each control valve changes state from a full-closed to a full-open state. When the five pulses end, the regulators stop and the control valves close. In practice, timing signals may be started and stopped multiple times, at different starting and stopping points, over the duration of a test. For example, a test protocol [not shown] that does not alter the settings of inlet regulator 125 or outlet regulator (set valve) 130 from their pre-set initial conditions would show traces 243 and 244 to be flat. In this test protocol, control and set valve 36, inlet control valves 124, and outlet control valve 131, only, would be activated for two seconds.

Figure 9:
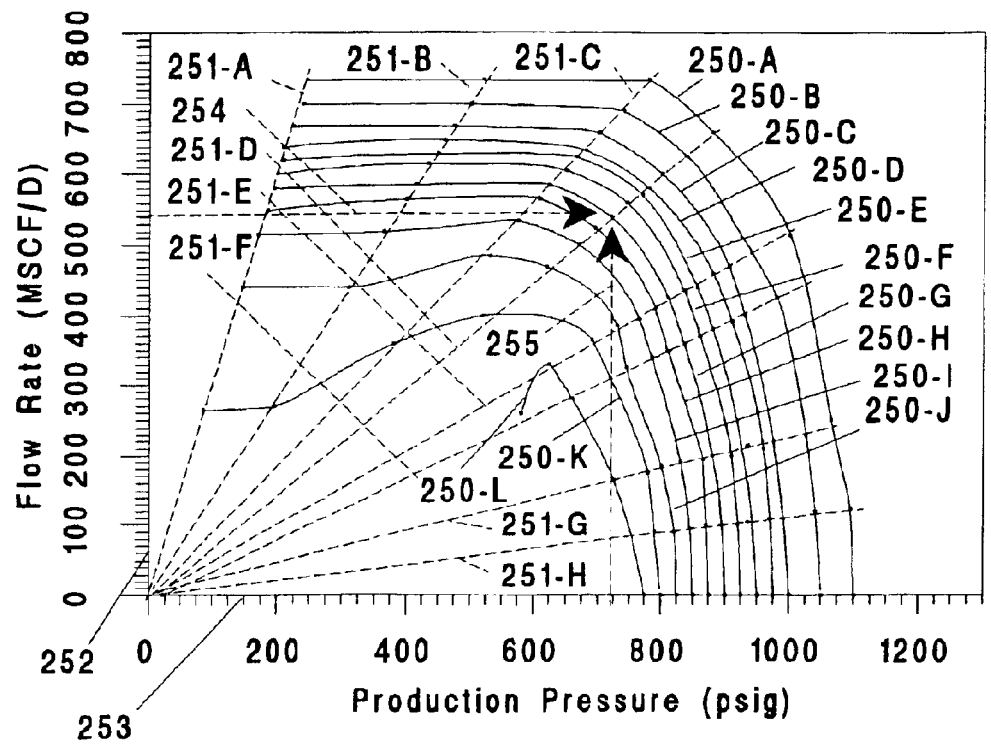
FIG. 9 shows gas-lift valve transient performance curves plotted from operating points on transient transverse lines constructed from fluid pressure and fluid flow rate test data.

FIG. 9 shows transient performance curves for a tested IPO gas-lift valve. Operating points on each transient performance curve are described by transient fluid flow rate on vertical axis 252 that corresponds to transient production pressure on horizontal axis 253, and by a specific transient injection pressure. Each transient performance curve is defined by an alphanumeric designator and a corresponding injection pressure in kPa (psig), as follows: 250-A 7686 (1100); 250-B 7341 (1050); 250-C 6996 (1000); 250-D 6824 (975); 250-E 6651 (950); 250-F 6479 (925); 250-G 6397 (900); 250-H 6134 (875); 250-I 5962 (850); 250-J 5789 (825); 250-K 5617 (800); and, 250-L 5448 (775).

In FIG. 9, each transient performance curve is created from a set of transient transverse lines designated 251-A, 251-B, 251-C, 251-D, 251-E, 251-F, 251-G, and 251-H. Each transient performance curve is obtained by interpolation between operating points on successive transverse lines for each transient injection pressure of interest. Each transient transverse line corresponds to a pre-set constant percent-open condition of outlet regulator (set valve) 130. This pre-set constant percent-open condition translates into a value of constant fluid conductance. In FIG. 9, injection pressure is not regulated. Each transverse line created by the constant setting of outlet regulator (set valve) 130 contains transient production-pressure and fluid flow rate information for a corresponding transient upstream valve injection pressure. This information defines fluid conductance generated by outlet regulator (set valve) 130 in combination with the IPO gas-lift valve under test.

A standard measure of sensitivity of gas lift valves to changes in production pressure is defined by the slope of a performance curve at a specific injection pressure, production pressure, and fluid flow rate. Transient transverse lines, that cross transient performance curves, represent a different measure of sensitivity that is based upon fluid conductance that correlates injection pressure, production pressure, and fluid flow rate. For example, transient transverse line 251-A represents 842.3 SCM/D/MegaPa (3.219 MSCF/D/pound injection pressure) over the full range of decrease of transient injection pressure when outlet regulator (set valve) 130 is pre-set to full-open. The slope of transient transverse line 251-H represents a fluid conductance of 29.41 SCM/D/MegaPa (0.1124 MSCF/D/pound injection pressure) when outlet regulator (set valve) 130 is pre-set to three-percent-open. The operating point on transient transverse line 251-D, or on transient performance curve 250-H, is identified at the convergence of horizontal construction arrow 254 and vertical construction arrow 255. This operating point has conductance of 196.25 SCF/D/MegaPa (0.75 MSCF/D/pound injection pressure) when outlet regulator (set valve) 130 is set to thirteen-percent-open and injection pressure is 6307 kPa (900 psig). All transient transverse lines focus to the origin because flow rate decreases to zero as production pressure decreases to zero, independently of the set point of outlet regulator (set valve) 130.

The distribution of points on each transient transverse line, at a constant operating condition of outlet regulator (set valve) 130, is determined by the first-order rate-of-change of injection pressure and by the convergence of transient fluid flow rate and transient production pressure paths. Fluid flow rate transducer FT 80, which can be a Critical Flow Nozzle, measures fluid flow rate. For example, an increment 690 kPa (100 psia) of decreasing transient injection pressure creates operating points on the 7686 kPa (1100 psig), 6996 kPa (1000 psig), 6307 kPa (900 psig), and 5617 kPa (800 psig) transient performance curves 250-A, 250-C, 25G-G, and 250-K.

The transient performance curves of FIG. 9 illustrate subcritical and critical flow regions for both transient orifice flow and transient throttling flow. The transient sub-critical and critical flow regions on a transient performance graph have the same properties as ramp and constant-steady-state sub-critical and critical flow regions on ramp and constant-steady-state performance graphs. Ramp sub-critical and critical flow regions are based upon linear changes in injection pressure with decreasing production pressure. Constant-steady-state sub-critical and critical flow regions are based upon constant injection pressure with decreasing production pressure. Transient sub-critical orifice flow occurs in a region of increasing flow rate and decreasing production pressure. Transient critical orifice flow occurs in a region of constant flow rate and decreasing production pressure. Transient sub-critical throttling flow follows a pattern similar to transient sub-critical orifice flow rate on a path of increasing flow rate with decreasing production pressure. Transient critical throttling flow rate occurs in a region of decreasing flow rate and decreasing production pressure.

Figure 10:
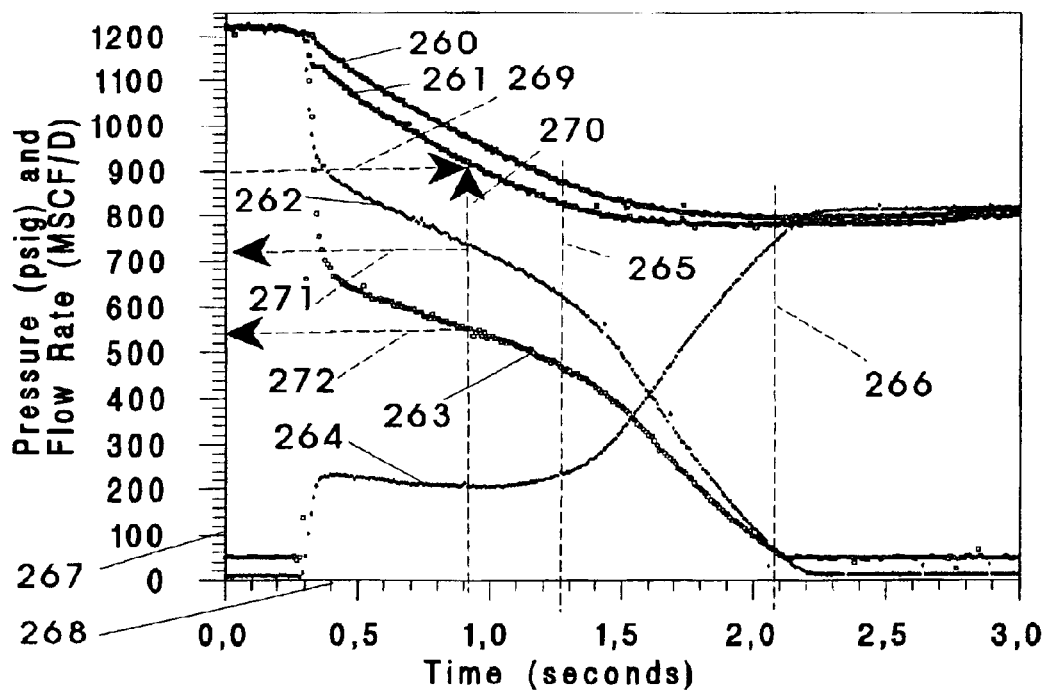
FIG. 10 shows an example of time-dependent, transient fluid pressure and fluid flow rate test data that establish the transient transverse line 251-D in FIG. 9.

FIG. 10 shows time-dependent, transient data for an IPO gas-lift valve under test, in which the paths of upstream reservoir pressure 260, injection pressure 261, production pressure 262, fluid flow rate 263, and differential pressure 264 are dependent upon a pre-set constant thirteen-percent-open condition of outlet regulator (set valve) 130. Injection pressure, production pressure, and fluid flow rate are shown on vertical axis 267. Time is an independent variable on horizontal axis 268. The initial condition of the gas-lift valve is full-open. When the test is started, outlet control valve 131 and control and set valve 36 open simultaneously so that fluid flows through the gas-lift valve [but not through upstream reservoir 30, FIG. 3, which is not recharged during transient tests]. The convergence of construction arrows 269 and 270 identify an injection pressure point at 6307 kPa (900 psig). The intersection of vertical construction arrow 270 with production pressure 262 and fluid flow rate 263 test data identify a production pressure point at 5100 kPa (720 psig) and a fluid low rate at 15.29 MSCF/D (540 MSCF/D) by construction arrows 271 and 272, respectively. These three points in FIG. 10 define the operating point, previously shown in FIG. 9, where horizontal construction arrow 254 and vertical construction arrow 255 converge. This procedure to identify an operating point based upon time-dependent test data in FIG. 10 is used to identify other operating points, such as those on transient transverse line 251-D in FIG. 9. The fluid conductance for line 251-D is 196.25 SCM/D/MegaPa (0.75 MSCF/D/pound injection pressure).

FIG. 10 also shows a time-dependent transition from transient orifice flow to transient throttling flow as production pressure and fluid flow rate decrease. The throttling region is identified by a change in the slope of transient production pressure 262 and a corresponding change in the slope of transient fluid flow rate 263. Construction lines 265 and 266 show the start and the end, respectively, of throttling of the gas-lift valve under test. The paths of production pressure 262 and fluid flow rate 263 show how throttling flow changes as a function of injection pressure decrease and production pressure decrease. It is well known that throttling occurs as differential pressure 264 increases.

Prior art methods to test and evaluate fluid control devices such as gas-lift valves cannot evaluate transient performance because prior art methods are based upon constant-steady-state fluid pressure and fluid flow rate criteria.

Figure 11:
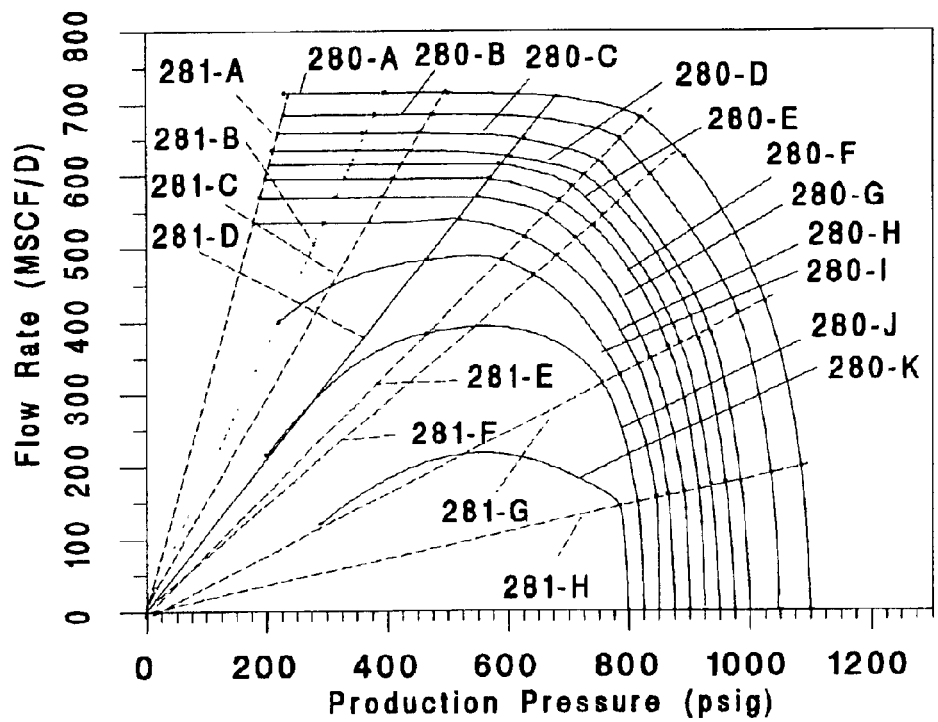
FIG. 11 shows gas-lift valve ramp performance curves plotted from operating points on ramp transverse lines constructed from fluid pressure and fluid flow rate test data.

FIG. 11 shows ramp performance curves for a tested IPO gas-lift valve, which curves are derived from ramp transverse lines and from interpolated ramp data. Each ramp performance curve is defined by an alphanumeric designator and a corresponding injection pressure in kpa (psig), as follows: 280-A 7686 (1100); 280-B 7341 (1050), 280-C 6996 (1000); 280-D 6824 (975); 280-E 6651 (950); 280-F 6479 (925); 280-G 6307 (900); 280-H 6134 (875); 280-I 5962 (850); 280-J 5789 (825); and, 280-K 5617 (800).

In FIG. 11, orifice flow is indicated by ramp performance curves 280-A, 280-B, 280-C, 280-D, 280-E, 280-F, 280-G, and 280-H. Performance curve 280-H is also a transition curve between orifice flow and throttling flow. Throttling flow is indicated by ramp performance curves 280-I, 280-J, and 280-K. Each ramp performance curve is created from operating points on ramp transverse lines 281-A, 281-B, 281-C, 281-D, 281-E, 281-F, 281-G, and 281-H.

Figure 12:
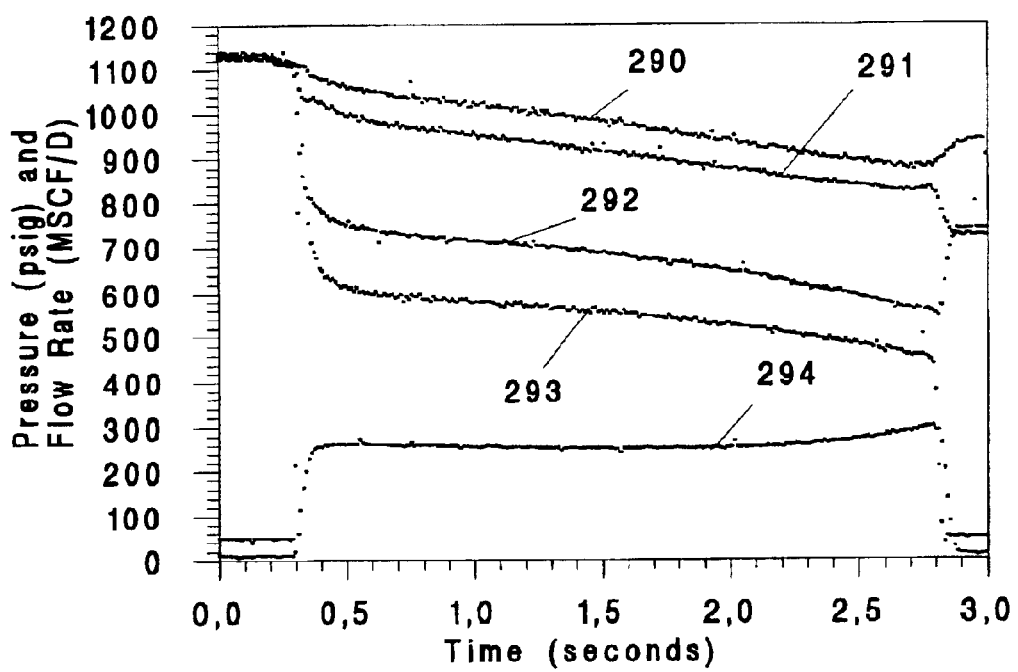
FIG. 12 shows an example of time-dependent, ramp fluid pressure and fluid flow rate test data that establish the ramp transverse line 281-E in FIG. 11

FIG. 12 shows time-dependent, ramp data for an IPO gas-lift valve under test, in which the paths of upstream reservoir pressure 290, injection pressure 291, production pressure 292, fluid flow rate 293, and differential pressure 294 are dependent upon a pre-set constant percent-open condition of outlet regulator (set valve) 130. The initial condition of the gas-lift valve is full-open. When a test is started, inlet control valve 124, outlet control valve 131, and control and set valve 36 open simultaneously so that fluid flows through upstream reservoir 30 and through the gas-lift valve. Inlet regulator (set valve) 125 is pre-set to recharge upstream reservoir 30 with sufficient fluid to generate a decreasing ramp function of fluid pressure and fluid flow rate. The ramp test data in FIG. 12 establish the ramp transverse line 281-E in FIG. 11.

Figure 13:
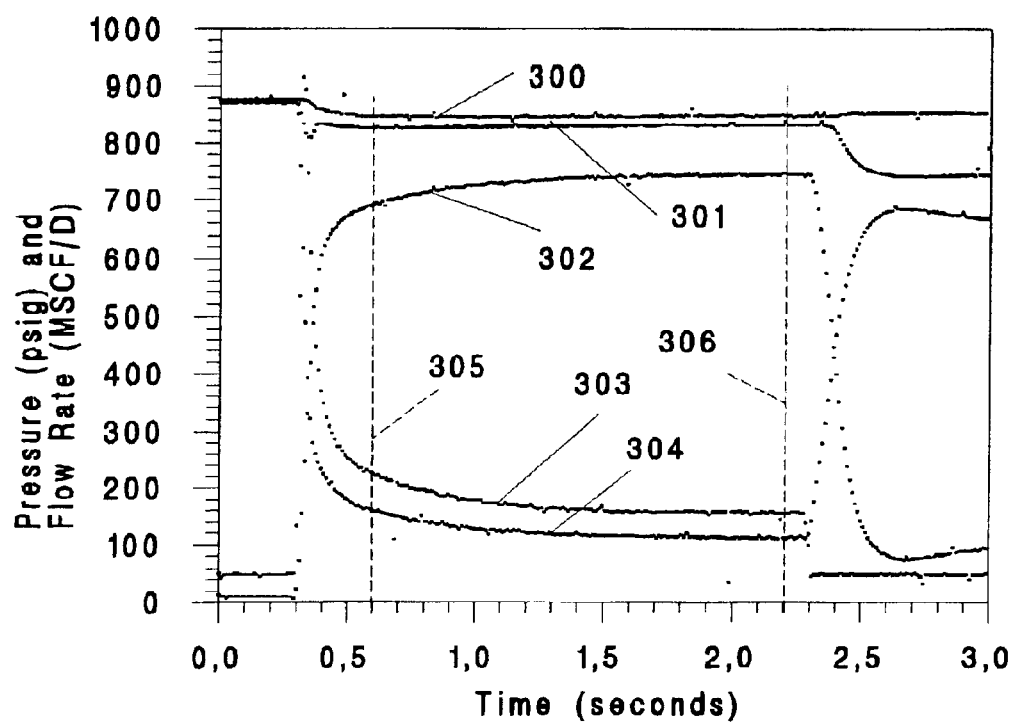
FIG. 13 shows test data acquired by explosive regulation of fluid pressure and fluid flow rate that illustrate a transition time of 1.9 seconds from transient fluid pressure and fluid flow rate conditions to constant-steady-state fluid pressure and fluid flow rate conditions.

FIG. 13 shows time-dependent, constant-steady-state data for an IPO gas-lift valve under test, in which the paths of upstream reservoir pressure 300, injection pressure 301, differential pressure 302, fluid flow rate 303, and production pressure 304 exhibit a time-transition from transient to constant-steady-state fluid pressures and fluid flow rate. Regulation of fluid pressures and fluid flow rate is initiated at time 0.3 seconds. High transients exist from 0.3 to 0.6 seconds for differential pressure 302, fluid flow rate 303, and production pressure 304. The high-transient behavior of production pressure and of fluid flow rate stops at construction line 305, but continues as low-transient behavior leading to constant steady state conditions identified by the long-delay construction line 306. The time-dependent traces clearly show that for a short-duration negative energy pulse, on the order of one second, explosive pressure regulation of upstream reservoir pressure 300 and of injection pressure 301 are necessary, but not sufficient, to establish constantsteady-state production pressure 304 and constant-steady-state flow rate 303. For example, the test data show that upstream reservoir pressure 300 and injection pressure 301 are constant at 5893 kPa (840 psig) and at 5755 kPa (820 psig), respectively, for times greater than 0.6 seconds during a two-second energy pulse that stops at time 2.3 seconds. After time 0.6 seconds fluid flow rate 303 and production pressure 304 continue to decrease along their transient paths, and differential pressure 302 continues to increase along its transient path. At time 2.2 seconds, identified by construction line 306, transient behavior has decreased sufficiently to satisfy a constant-steady-state condition with specified error. These test data show that a criterion for constant-steady-state flow rate can be specified and achieved. In the example explained here, constant-steady-state conditions for fluid flow rate 303 are achieved when the negative rate of change of fluid flow rate 303 is greater than −0.2832 MSCM/D/second (10 MSCF/D/second). A similar criterion can be specified for production pressure 304.

In FIG. 13, test data show that, at some test settings, the capture of injection pressure 301, production pressure 304, and fluid flow rate 303 should be delayed so that the flowing fluid can closely approach or meet-constant-steady-state conditions. The data show that constant-steady-state operating points for gas-lift valves can be accurately identified. The constant-steady-state operating point identified here has injection pressure 301 at 5893 kPa (840 psig), production pressure 304 at 929 kPa (120 psig), and fluid flow rate 303 at 3.68 MSCF/D (130 MSCF/D). This operating point is in the critical-flow throttling region of an IPO gas-lift valve under test.

Regulating the fluid pressures and fluid flow rate to define individual operating points of a gas-lift valve permits these points to be identified and evaluated easily and cost effectively. The kinds of tests conducted with FEPTS-TRST apparatus and methods, and the examination of specific operating points of a gas-lift valve cannot be achieved by conventional flow-loop testing. In conventional flow-loop testing, to reach the operating point defined above, the entire performance curve for 5893 kPa (840 psig) injection pressure must be followed from its starting pressure until a production pressure of 929 kPa (120 psig) is reached. The generation of the constant-steady-state conditions with short-duration energy pulses by FEPTS-TRST apparatus and methods allows targeted evaluations of a particular region of a constant-steady-state performance graph, a capability not present in prior art.

Figure 14:
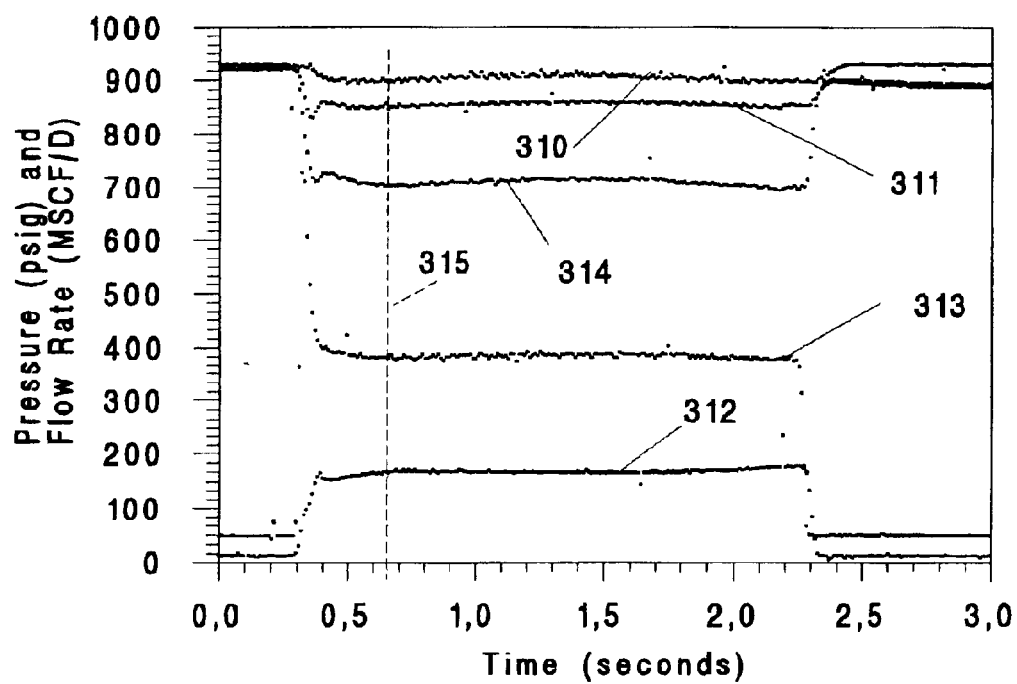
FIG. 14 shows test data acquired by explosive regulation of fluid pressure and fluid flow rate that illustrate a preferred transition time of 0.4 seconds from transient fluid pressure and fluid flow rate conditions to constant-steady-state fluid pressure and fluid flow rate conditions.

FIG. 14 shows time-dependent, constant-steady-state data for an IPO gas-lift valve under test, in which the paths of upstream reservoir pressure 310, injection pressure 311, differential pressure 312, fluid flow rate 313, and production pressure 314 exhibit a very short time-transition from transient to constant-steady-state fluid pressures and fluid flow rate. Large transients do not occur along the fluid pressure and fluid flow rate paths. Explosive regulation is initiated at 0.3 seconds. From 0.3 seconds to 0.65 seconds the transients generated by explosive regulation decay to zero. Construction line 315 shows the operating point to be defined by injection pressure 311 at 5962 kPa (850 psig), production pressure 314 at 4928 kPa (700 psig), and fluid flow rate 313 at (400 MSCF/D). This operating point is located in the sub-critical flow region of the IPO gas-lift valve under test. The operating point is in a transition region from orifice to throttling flow.

FIG. 13 and FIG. 14 illustrate that fluid pressures and fluid flow rates may not follow the same path to constant steady state under explosive regulation. A review of constant-steady-state fluid pressures and fluid flow rates generated by FEPTS-TRST equipment show that constant steady state is reached more quickly and transient behavior is reduced significantly in sub-critical regions of orifice and throttling flow.

Figure 15:
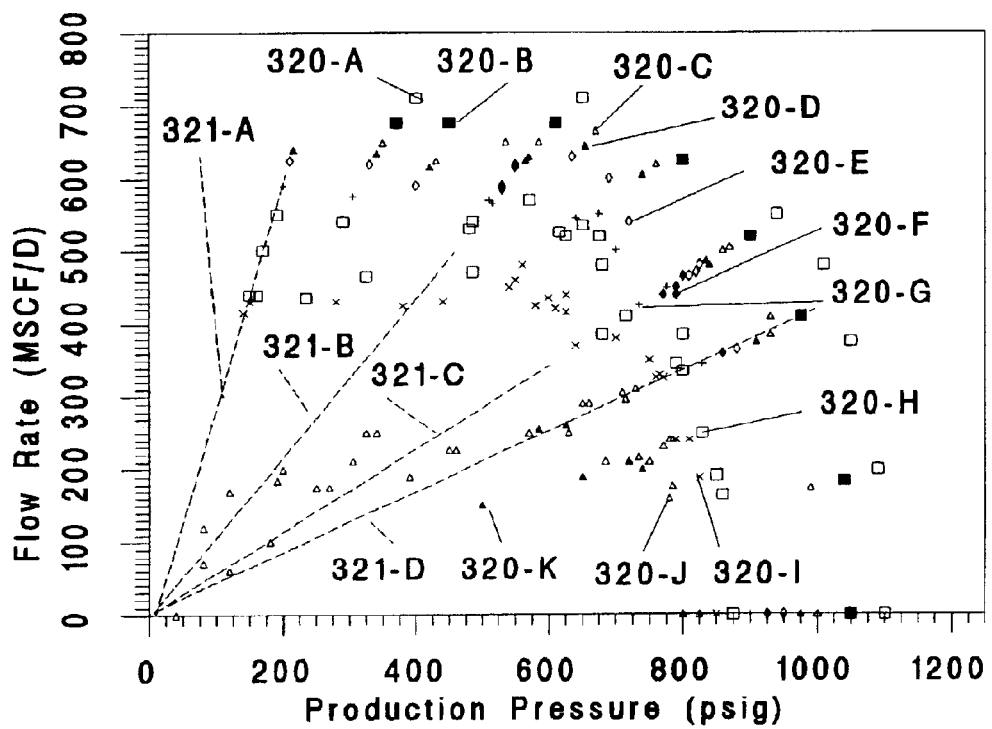
FIG. 15 shows a scatter graph of gas-lift valve operating points acquired from tests with multiple, short-duration energy pulses, in which constant-steady-state conditions are generated by explosive regulation of fluid pressure and fluid flow rate and in which the temperature of the gas-lift valve under test varies from 28.9 to 36.7 degrees Celsius (84 to 98 degrees Fahrenheit).

FIG. 15 is a scatter graph of constant-steady-state operating points of an IPO gas-lift valve tested without control of the temperature of the valve. Test data represent valve temperatures from 28.9 to 36.7 degrees Celsius (84 to 98 degrees Fahrenheit), The scatter graph shows constant-steady-state operating points generated by different pre set conditions of outlet regulator (set valve) 130. Each operating point is defined by a specific level of injection pressure. A different graphic symbol is used for each level of injection pressure. Alphanumeric designators that correspond to a level of injection pressure are listed in kPa (psig), as follows: 320-A 7686 (1100); 320-B 7341 (1050); 320-C 6996 (1000); 320-D 6824 (975); 320-E 6651 (950); 320-F 6479 (925); 320-G 6307 (900); 320-H 6134 (875); 320-I 5962 (850); 320-J 5789 (825); and, 320-K 5617 (800).

FIG. 15 shows that constant-steady-state operating points can be identified with constant-steady-state transverse lines. Four constant-steady-state transverse lines 321-A, 321-B, 321-C, and 321-D are shown. Inspection of the scatter-graph shows that each symbol-set of operating points takes the form of a performance curve. The data in FIG. 15 demonstrate that a constant-steady-state operating point of a gas-lift valve can be examined without having to create a complete performance curve.

Figure 16:
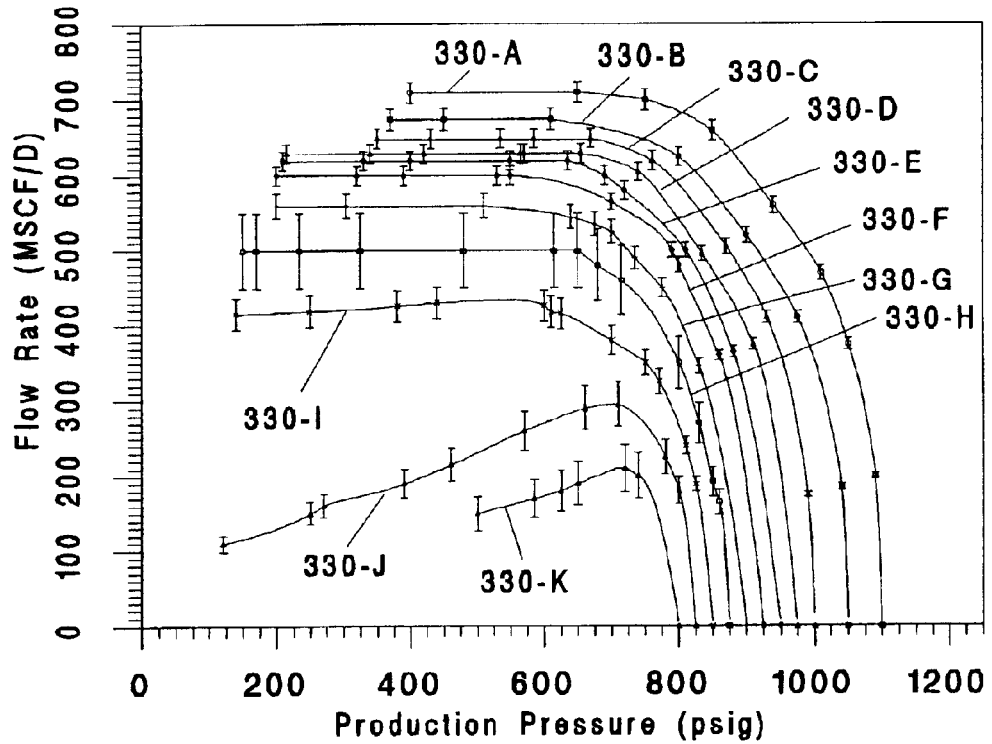
FIG. 16 shows averaged performance curves derived from the scatter graph of FIG. 15, which curves include error bars showing temperature variation in the gas-lift valve under test.

FIG. 16 shows constant-steady-state performance curves derived from data in FIG. 15. Error bars reflect the absence of temperature control of the tested nitrogen-charged gas-lift valve. Each constant-steady-state performance curve is identified by an alphanumeric designator, an injection pressure in kPa (psig), and an error-bar percentage of the fluid flow rate coordinate axis, as follows: 330-A 7686 (1100) ±2%; 330-B 7341 (1050) ±2%; 330-C 6996 (1000) ±2%; 330-D 6824 (975) ±2%; 330-E 6651 (950) ±2%; 330-F 6479 (925) ±2%; 330-G 6307 (900) ±3%; 330-H 6134 (875) ±10%; 330-I 5962 (850) ±45%; 330-J 5789 (825) ±15%; 330-K 5617 (800) ±15%.

Figure 22:
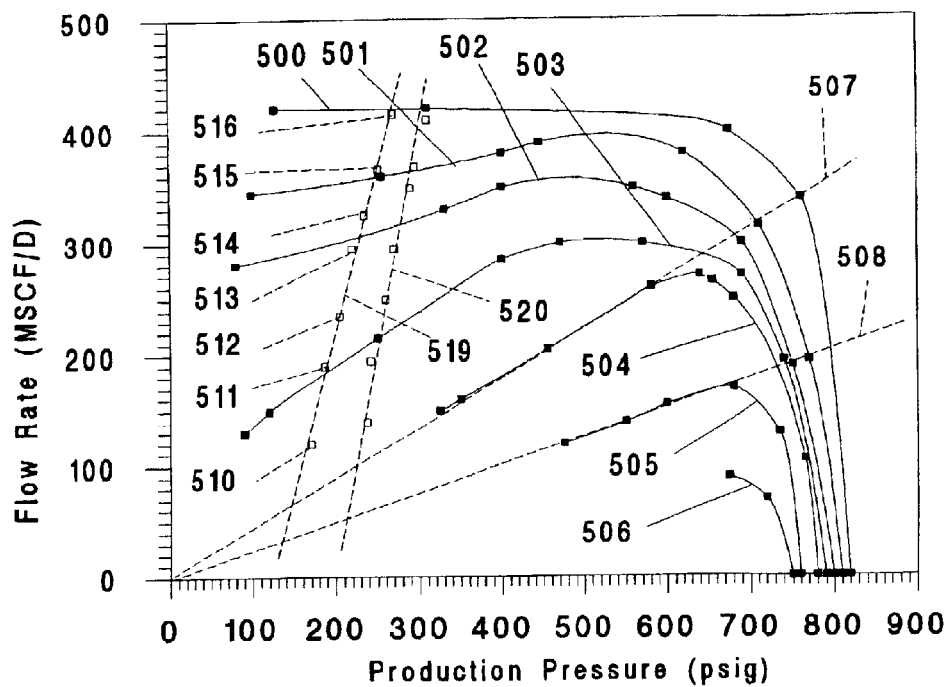
FIG. 22 shows constant-steady-state test data and performance curves for a gas-lift valve operating in the throttling region at a temperature of 15.55±0.287 degrees Celsius (60±0.5 degrees Fahrenheit).

The performance curves of FIG. 16 show that the operation of the gas-lift valve under test can be accurately described at specific temperatures as well as over a range of temperatures. Thus, even when the temperature of the gas-lift valve under test is not controlled, temperature-induced errors of ±2% in the orifice region and ±15% in the throttling region represent smaller errors than industry-accepted standard errors, which are reported as ±5% for data in the orifice flow region and ±30% for data in the throttling flow regions. When temperature is controlled as shown in FIG. 22, errors are limited to the accuracy and the calibration of transducers.

In FIG. 16, orifice flow is shown by constant-steady-state performance curves 330-A, 330-B, 330-C, 330-D, 330-E, 330-F, 330-G, and 330-H. Performance curve 330-H is also a transition curve between orifice flow and throttling flow. Throttling flow is shown by constant-steady-state performance curves 330-I, 330-J and 330-K.

Figure 17:
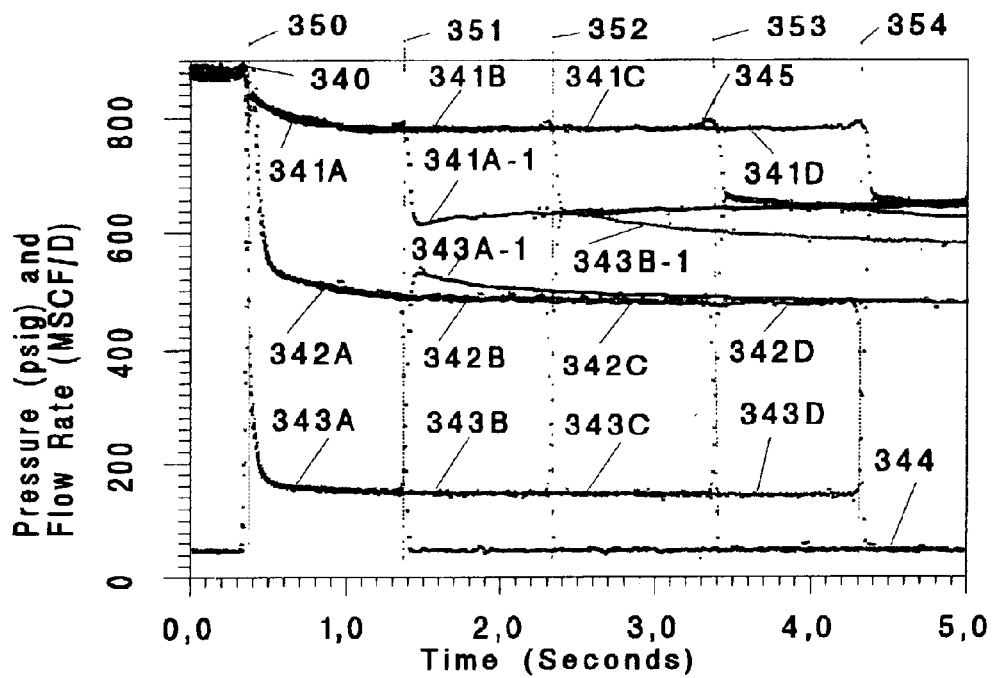
FIG. 17 shows superposed, constant-steady-state test data for a gas-lift valve held at a temperature of 15.55±0.287 degrees Celsius (60±0.5 degrees Fahrenheit), which data are acquired by explosive regulation of fluid pressure and fluid flow rate during four five-second tests, using energy pulses of one, two, three, and four seconds, respectively.

FIG. 17 shows a composite graph of four, five-second tests of a nitrogen-charged gas-lift valve held at a temperature of 15.55 degrees Celsius (60 degrees Fahrenheit). Fluid pressure and fluid flow rate paths are generated by four energy pulses of one-, two-, three-, and four-seconds. These data are acquired with inlet regulator 125 operated under explosive regulation. Energy pulse start times are shown by start time line 350 and the duration of each pulse is shown by end time lines 351, 352, 353, and 354 for one-, two-, three-, and four-seconds, respectively. Each test is initiated at an injection pressure 340, before regulation, between 6100 kPa (870 psig) and 6238 kPa (890 psig). The set point of inlet regulator 125 is 5548 kPa (790 psig). Superposed injection pressures 341A, 341B, 341C, and 341D are shown for energy pulses of one-, two-, three-, and four-seconds, respectively. Injection pressure 341A-1 shows injection pressure 341A after a one-second pulse is terminated. Superposed fluid flow rates 342A, 342B, 342C, and 342D correspond to energy pulses of one-, two-, three-, and four-seconds, respectively. Superposed production pressures 343A, 343B, 343C, and 343D correspond to energy pulses of one-, two-, three-, and four-seconds, respectively. Production pressure 343A-1 shows production pressure 343A at the end of a one-second energy pulse. Production pressure 343B-1 shows production pressure 343B at the end of a two-second energy pulse. Base fluid flow rate 344 for fluid flow rates 342A through 342D reflects the absolute pressure reference 0.0 kPa (0.0 psia) for a Critical Flow Nozzle, which nozzle is fluid flow rate transducer FT 80.

The resolution of FEPTS-TRST apparatus and methods is demonstrated by superposing injection pressure, production pressure, and fluid flow rate data. These data show a transition from transient to constant-steady-state conditions within one second after the initiation of an energy pulse. Regulators 125 and 130 [FIG. 3] under explosive control by inlet control valve 124 and outlet control valve 131 quickly generate precise fluid pressure and fluid flow rate regulation that cannot be achieved by conventional regulators operating without explosive control.

The sensitivity of the FEPTS-TRST apparatus to minute changes in fluid pressure is demonstrated by test data anomaly 345, a small transient of injection pressure that occurs when an energy pulse is terminated. Each anomaly is a measure of fluid inertia as fluid flow is abruptly stopped by closing outlet control valve 131. When outlet valve 131 is closed, a small pressure wave is reflected through the gas-lift valve under test to a closed control and set valve 36. This reflected transient is measured by injection pressure transducer 487 [FIG. 21F].

Figure 18:
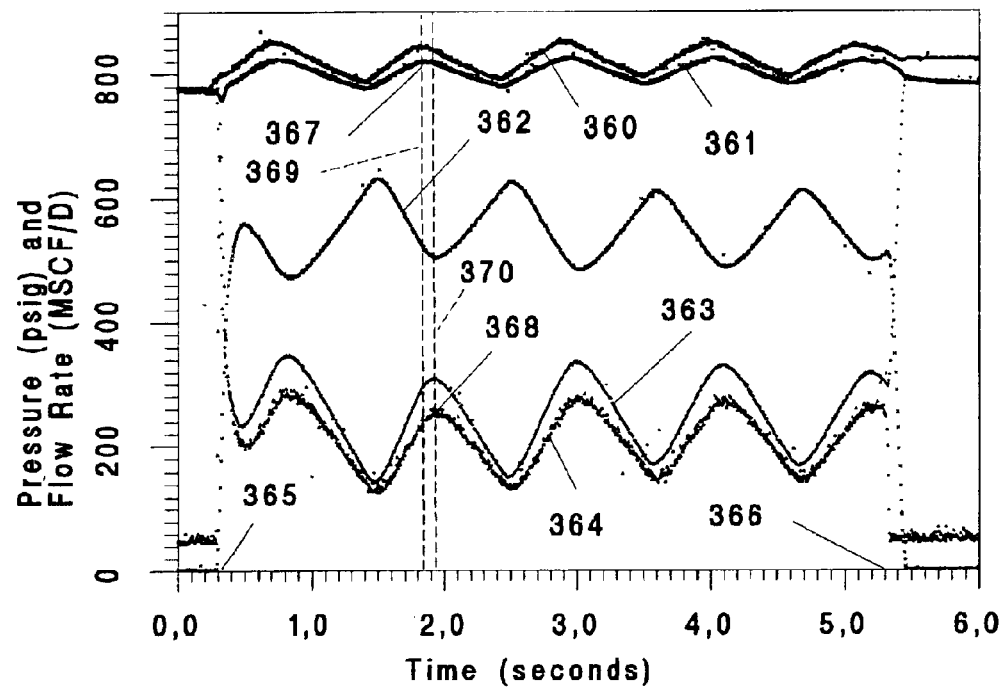
FIG. 18 shows periodic-steady-state fluid pressure and fluid flow rate data that demonstrate how a gas-lift valve responds to regulated increasing and decreasing fluid pressure and fluid flow rate.

FIG. 18 shows time-dependent, periodic-steady-state data for an IPO gas-lift valve under test, in which the paths of upstream reservoir pressure 360, injection pressure 361, differential pressure 362, production pressure 363, and fluid flow rate 364 are generated by periodic explosive regulation that starts at time 365 and ends at time 366. The spectral component, which is a sinusoidal function, is generated by periodic explosive regulation at a frequency of 0.9 hertz (period of 1.1 seconds) and can be read, for example, from periodic peak of injection pressure 367 to a neighboring peak of injection pressure. The spectral frequency can also be determined from upstream reservoir pressure, production pressure, differential pressure, or fluid flow rate. Line 369 intersects injection pressure 361 at periodic peak of injection pressure 367. Line 370 intersects fluid flow rate 364 at periodic peak of fluid flow rate 368. The time delay of 0.1 seconds between periodic peak of injection pressure 367 and periodic peak of fluid flow rate 368 represents the delay of fluid as fluid flows through the device under test. This delay is a function of the filtering properties of the fluid control device under test.

Analysis of these test data shows that the gas-lift valve in test chamber assembly 129 can be identified as a time-invariant linear system over the range of fluid pressures and fluid flow rates presented. The single spectral function, induced by the FEPTS-TRST equipment as an oscillating injection pressure, establishes a distortionless output fluid flow rate, which is referenced to a time delay called phase delay. Phase delay is defined as the actual time delay between input and output at the frequency of a single spectral component. The FEPTS-TRST equipment, which generates periodic-steady-state fluid pressure and fluid flow rate driving functions, permits the discovery and analysis of the phase-delay properties of a time-invariant, linear fluid control device, approximated here by a gas-lift valve that is operated dynamically at a low-frequency, periodic-steady-state injection pressure spectral component. Conventional flow-loop testing cannot provide this important information.

Figure 19:
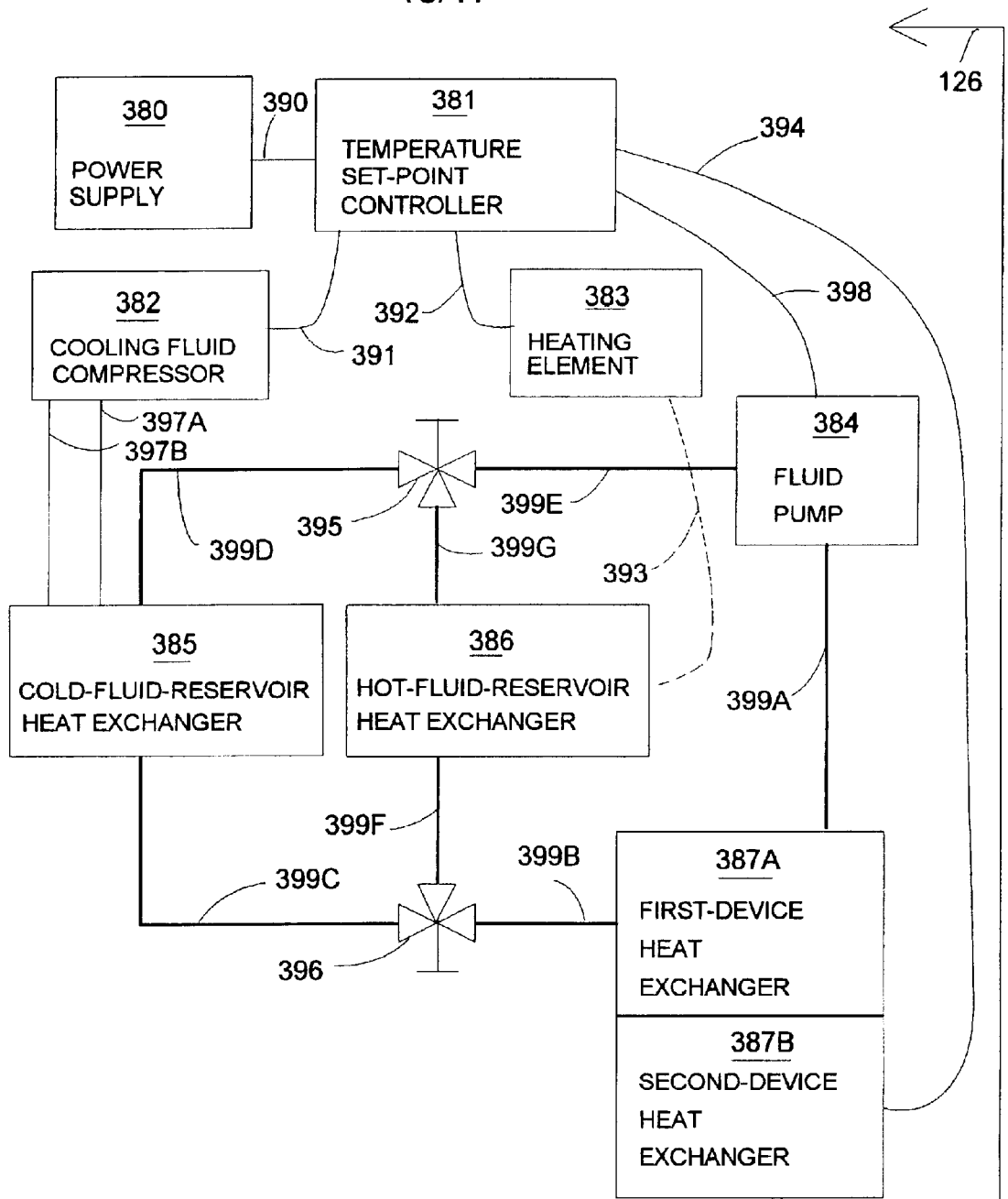
FIG. 19 shows a block diagram of a temperature control assembly that controls the temperature of a fluid control device under test, so that fluid pressure and fluid flow rate data can be compared consistently for devices that exhibit temperature sensitivity, such as gas-lift valves that contain a bellows charged with nitrogen gas.

FIG. 19 shows a temperature control assembly 126 that controls the temperature of a fluid control device under test. Operation of temperature control assembly 126 is described with reference to a gas-lift valve installed in test chamber 129 [FIG. 21F]. The transfer of hot temperature or cold temperature to the gas-lift valve under test is accomplished by the circulation of heat-exchanger fluid in a closed and insulated portion of temperature control assembly 126, comprising cold-fluid-reservoir heat exchanger 385; hot-fluid-reservoir heat exchanger 386, pipes 399A, 399B, 399C, 399D, 399E, 399F, and 399G; outlet bi-directional valve 395; inlet bi-directional valve 396; fluid pump 384; first-device heat exchanger 387A; second-device heat exchanger 387B; heat-exchanger fluids; and a temperature transducer 484 [FIG. 21 F]. Temperature set-point controller 381 connects to power supply 380, cooling fluid compressor 382, and heating element 383 by electrical wires 390, 391, and 392, respectively.

During cooling, outlet bi-directional valve 395 and inlet bi-directional valve 396 select pipe 399C, cold-fluid-reservoir heat exchanger 385, and pipe 399D to complete the fluid circuit. Cooling fluid compressor 382 circulates freon cooling fluid through discharge pipe 397A, cooling freon coils [not shown], and return pipe 397B. Freon in cooling freon coils that are located in cold-fluid-reservoir heat exchanger 385 transfers freon temperature to fluid in the reservoir of heat exchanger 385. Thereafter, the temperature of fluid in cold-fluid-reservoir heat exchanger 385 is transferred by insulated fluid pump 384 and pipes to first-device heat exchanger 387A, then to a gas-lift valve installed in test chamber 129. The temperature of the gas-lift valve is transferred to heat-exchanger fluid in second-device heat exchanger 387B and to temperature transducer 484 [FIG. 21F], which sends a temperature signal to temperature set-point controller 381.

During heating, outlet bi-directional valve 395 and inlet bi-directional valve 396 select pipe 399F, hot-fluid-reservoir heat exchanger 386, and pipe 399G to complete the fluid circuit. Heating element 383 transfers heat 393 to fluid in hot-fluid-reservoir heat exchanger 386. Thereafter, the temperature of fluid in the reservoir of heat exchanger 386 transfers by insulated fluid pump 384 and pipes to first-device heat exchanger 387A, then to a gas-lift valve installed in test chamber 129. The temperature of the gas-lift valve is transferred to heat-exchanger fluid in second-device heat exchanger 387B and to temperature transducer 484 [FIG. 21F], which sends a temperature signal to temperature set-point controller 381.

The gas-lift valve in test chamber assembly 129 is coupled to first- and second-device heat exchangers 387A and 387B, respectively. The temperature of cold or hot circulating fluid in first-device heat exchanger 387A transfers to a non-circulating heat-exchanger fluid in second-device heat exchanger 387B. Non-circulating heat-exchanger fluid in second-device heat exchanger 387B transfers the temperature of the gas-lift valve housing to temperature transducer 484 [FIG. 21F], which is placed into second-device heat exchanger 387B. Temperature transducer 484 sends a temperature signal to temperature set-point controller 381 by wires 394. Temperature set-point controller 381 activates cooling fluid compressor 382 or heating element 383, depending upon the heating or cooling requirement of a test protocol.

Because of the variations in physical configuration of fluid control devices for which temperature control is needed, different types of first-device heat exchangers are required. A circular first-device heat exchanger 400, as shown in FIG. 20A, FIG. 20B, and FIG. 20E, places circulating heat-exchanger fluid in direct contact with a device under test. A flexible bladder first-device heat exchanger 420, as shown in FIG. 20F, does not permit heat-exchanger fluid to contact a device under test. A split-core first-device heat exchanger, shown in FIG. 20H, does not permit heat-exchanger fluid to contact a device under test.

Each type of first-device heat exchanger is preferred for different kinds of fluid control devices. A circular first-device heat exchanger is the preferred embodiment for gas-lift valves because a high rate of heat transfer is achieved by heat-exchanger fluid in contact with the gas-lift valve housing. Independently of the type of first-device heat exchanger selected, the temperature of a fluid control device is acquired by a temperature transducer, that in the preferred embodiment, is placed into a second-device heat exchanger, with said second-device heat exchanger insulated from said first-device heat exchanger. A flexible tube second-device heat exchanger for gas-lift valves shown in FIG. 20C, FIG. 20D, and FIG. 20E is the preferred embodiment for testing gas-lift valves because a high heat transfer rate is achieved by non-circulating heat-exchanger fluid in contact with the valve and with a temperature transducer placed into the non-circulating fluid. For some applications, the second-device heat exchanger is not installed and a temperature transducer is attached directly to the fluid control device under test. In either case, a temperature transducer communicates with the temperature set-point controller 381 to control the temperature of the fluid control device under test.

FIG. 20A shows circular first-device heat exchanger 400, with upper hole 401 for a gas-lift valve, upper "O" ring groove 402, fluid inlet port 403, fluid outlet port 404, lower hole 405 for a gas-lift valve, lower "O" ring groove 406, and inner wall 407. When a gas-lift valve is installed within heat exchanger 400, circulating fluid 408 enters, circulates around the gas-lift valve, and exits as circulating fluid 409. "O" rings fit grooves 402 and 406 to create a leak-proof seal for the circulating heat-exchanger fluid.

FIG. 20B shows a cross section of circular first-device heat exchanger 400 and a portion 411 of an installed, nitrogen-charged gas-lift valve. Upper "O" ring 402A and lower "O" ring 406A seal around the installed gas-lift valve at upper hole 401 and lower hole 405, respectively. Inner wall 407 provides clearance for fluid 408 entering heat exchanger 400 through inlet port 403 and leaving as fluid 409 by outlet port 404. Interior void 410 between a gas-lift valve and inner wall 407 permits heat-exchanger fluid to be in contact with the valve in order to transfer fluid temperature to the valve and to the nitrogen gas in the valve bellows [not shown].

FIG. 20C shows a flexible tube second-device heat exchanger 412 with wall 413 and interior void 414. After a gas-lift valve is installed in circular first-device heat exchanger 400, flexible tube second-device heat exchanger 412 is placed over the end of the. Heat-exchanger fluid and temperature transducer 484 [FIG. 21F] are placed in space 497 [FIG. 21F] between an installed gas-lift valve and wall 413. Flexible tube second-device heat exchanger 412 is sealed against the housing of an installed gas-lift valve by flexible tube clamp 415 [FIG. 20D]. The components of test chamber assembly 129 [FIG. 21F] are positioned vertically so that non-circulating heat-exchanger fluid in flexible tube second-device heat exchanger 412 will not leak.

FIG. 20D shows flexible tube clamp 415 [prior art] as a means to secure flexible tube second-device heat exchanger 412 [FIG. 20C] to a gas-lift valve, in order to create a leak-proof seal against the housing of the installed valve.

FIG. 20E shows a partial configuration of a circular first-device heat exchanger 400, with portion 416 of a gas-lift valve protruding from the heat exchanger. Heat-exchanger fluid flows into circular first-device heat exchanger 400 through inlet pipe 403A and leaves by outlet pipe 404A. Flexible tube second-device heat exchanger 412 fits over gas-lift-valve end 417 and is secured on valve portion 416 by flexible tube clamp 415. The diameter of gas-lift-valve end 417 is less than the diameter of interior void 414 of flexible tube second-device heat exchanger 412 thereby permitting heat-exchanger fluid and a temperature transducer 484 [FIG. 21F] to be placed into the space 497 created between interior void 414 and gas-lift-valve end 417. If the end diameter of a gas-lift valve is not smaller than the diameter of interior void 414 of second-device heat exchanger 412, a large diameter tube can be selected and clamped to the gas-lift valve end to become a reservoir for non-circulating heat-exchanger fluid and temperature transducer 484.

FIG. 20F shows flexible bladder first-device heat exchanger 420, that wraps around a fluid control device in order to control the temperature of the device under test by heat transfer through the wall of the bladder. Heat exchanger 420 is fabricated by sealing soft material, such as plastic or rubber, to contain circulating heat-exchanger fluid under low pressure. Fluid inlet port 421 and fluid outlet port 422 are connected to the tubing of temperature control assembly 126 [described in FIG. 19]. The temperature of entering fluid 408 is transferred to the wall of heat exchanger 420, and then to the fluid control device in contact with the heat exchanger; the fluid leaves heat exchanger 420 as exit fluid 409. Flexible bladder first-device heat exchanger 420 and connecting heat exchanger pipes are insulated to assist in the control of the temperature of the device under test.

FIG. 20G shows first and second tie straps 423A and 423B, respectively, as a means to hold flexible bladder first-device heat exchanger 420 in contact with a fluid control device under test.

FIG. 20H shows a split-core first-device heat exchanger that fits around a fluid control device. The split-core first-device heat exchanger does not permit heat-exchanger fluid to contact the device under test. Split-core first half 424 and a split-core second half 427 are fabricated with first circular cutout 426 and second circular cutout 430, respectively, to conform to a circular dimension of the device under test. Entering fluid 408 enters split-core first half 424 at first inlet fitting 424A, flows through first and second drilled holes 425A and 425B to first outlet fitting 424B, and leaves as fluid 408A, which enters first flexible tube 429A, which is connected to first outlet fitting 424B and to second inlet fitting 424C. Entering fluid 408A leaves first flexible tube 429A as fluid 408B, enters second inlet fitting 424C, passes through third and fourth drilled holes 425C and 425D, and leaves second outlet fitting 424D as fluid 408C. Second flexible tube 429B is connected to split-core first half 424 at second outlet fitting 424D and to split-core second half 427 by third inlet fitting 427A. Fluid 408C enters second flexible tube 429B, leaves as fluid 408D, enters third inlet fitting 427A, flows through fifth and sixth drilled holes 428D and 428C to third outlet fitting 427B, and leaves as fluid 408E. Third flexible tube 429C connects to third outlet fitting 427B and fourth inlet fitting 427C. Fluid 408E enters third flexible tube 429C, leaves as fluid 408F, enters fourth inlet fitting 427C, passes through seventh and eighth drilled holes 428B and 428A, passes through fourth outlet fitting 427D, and leaves split-core second half 427 as exiting fluid 409. First inlet fitting 424A and fourth outlet fitting 427D connect to pipes 399A and 399B of temperature control assembly 126 [FIG. 19].

FIG. 20I shows spring clamp 431 [prior art] as a means to create fluid-tight connections for both ends of each of the flexible tubes 429A, 429B, and 429C [FIG. 20H] to fittings in split-core first-device heat exchanger halves 424 and 427, and for the connections to heat exchanger pipes.

FIG. 20J shows clamp 432, with screw 433, and handle 434, as means to secure first half 424 and half 427 of a split-core first-device heat exchanger [FIG. 20H] around a fluid control device, such as a 3.83 cm (1.5 inch) gas-lift valve. At least one screw clamp is required to secure a split-core first-device heat exchanger around a fluid control device.

Figure 21A:
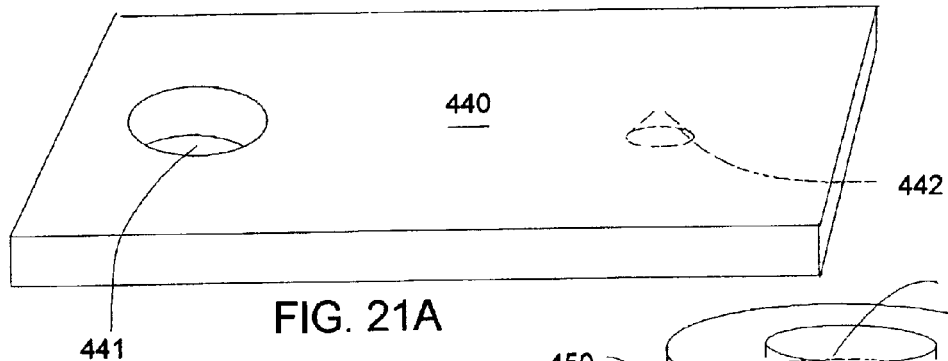
FIG. 21A shows an upper retaining plate of the test chamber assembly of FIG. 21F that restrains vertical and horizontal movement of an installed gas-lift valve.
Figure 21C:
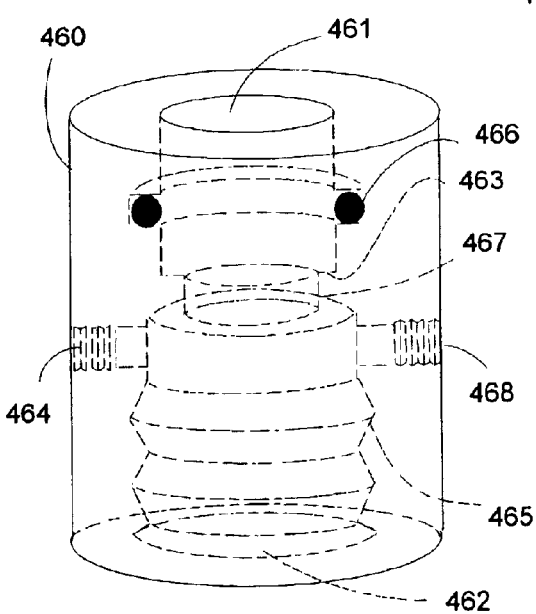
FIG. 21C shows a lower test chamber unit of the test chamber assembly of FIG. 21F.
Figure 21B:
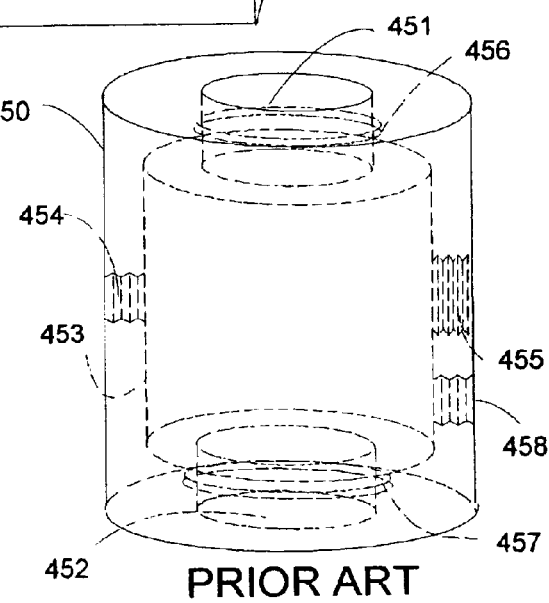
FIG. 21B shows an upper test chamber unit of the test chamber assembly of FIG. 21F.
Figure 21D:
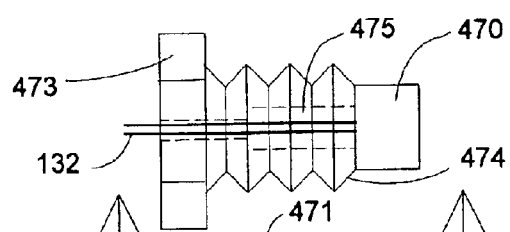
FIG. 21D shows a microphone that operates in a HPHFFR environment to record the sound of fluid flowing through a fluid control device under test.
Figure 21E:
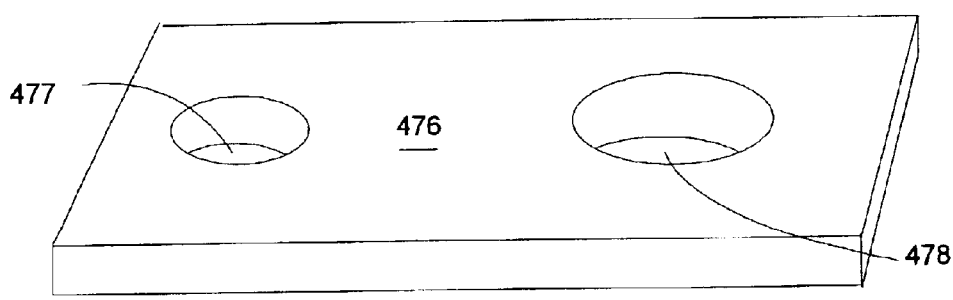
FIG. 21E shows a lower retaining plate of the test chamber assembly of FIG. 21F that restrains vertical and horizontal movement of an installed gas-lift valve.
Figure 21F:
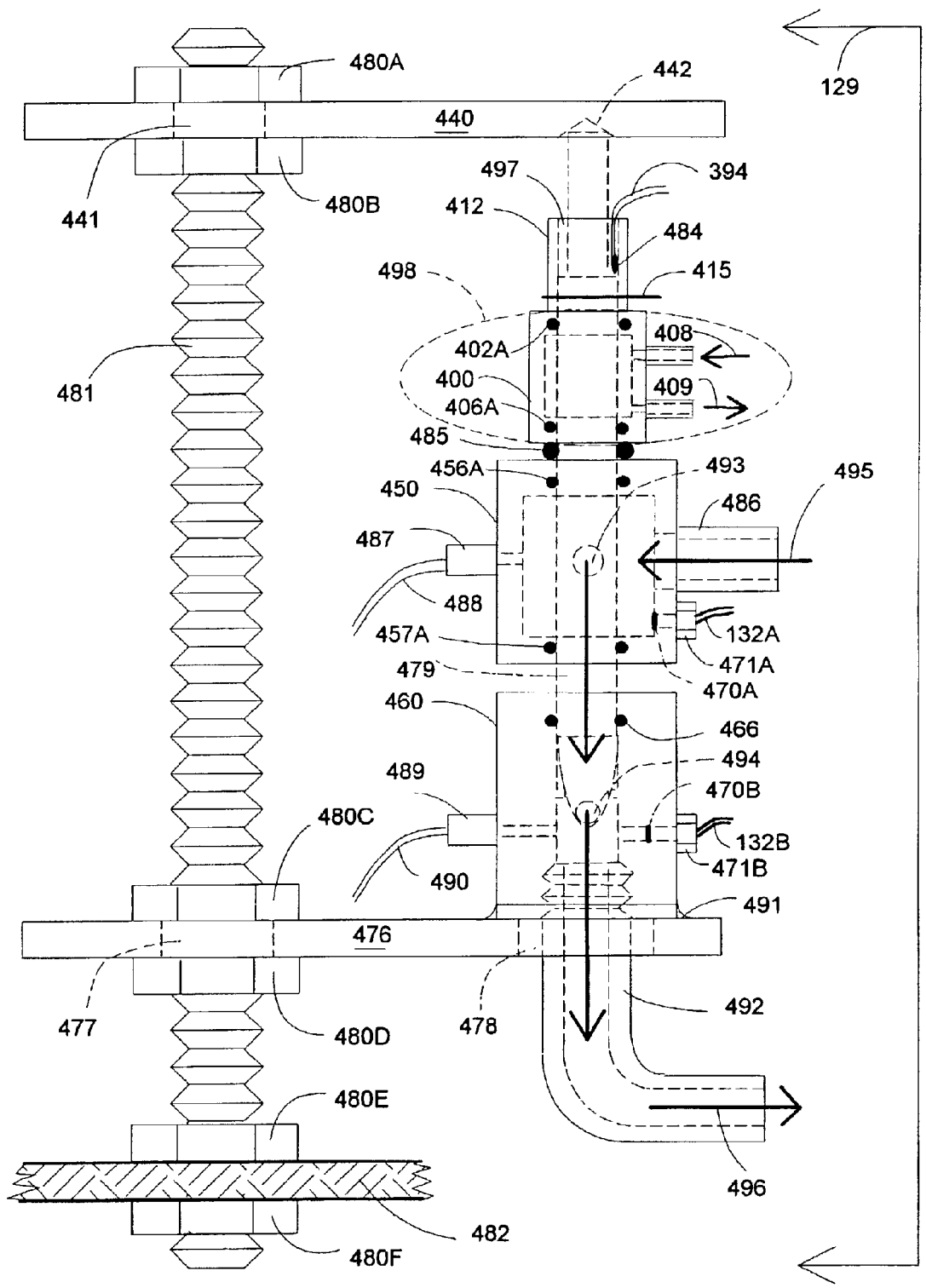
FIG. 21F shows the preferred embodiment of the test chamber assembly, with gas-lift valve installed, which assembly permits control of the temperature of a valve during fluid pressure and fluid flow rate tests.

FIG. 21A shows upper holding plate 440, with hole 441 and recess 442, a component of test chamber assembly 129 described in FIG. 21F. Upper plate 440 is held in place by nuts 480A and 480B and by threaded bar 481 [FIG. 21F]. Upper plate 440 prevents an installed gas-lift valve from moving vertically upward. Recess 442 prevents the upper end of an installed gas-lift valve from moving horizontally.

FIG. 21B shows upper test chamber unit 450, with upper hole 451, lower hole 452, inner wall 453, port 454 for injection pressure transducer 487 [FIG. 21F], port 455 for inlet pipe for test fluid [not shown], port 458 for injection microphone unit 471A [FIG. 21D], upper "O" ring groove 456, and lower "O" ring groove 457. Test fluid enters test chamber unit 450 at port 455 and surrounds installed gas-lift valve 479 [FIG. 21F]. "O" rings [not shown] in grooves 456 and 457 create a pressure-tight seal between test chamber unit 450 and the gas-lift valve housing. Port 458 is placed in test chamber unit 450 so that injection microphone unit 471A will capture sound waves from fluid entering upper test chamber unit 450 and flowing through the gas-lift valve under test.

FIG. 21C shows a partial-section view of lower test chamber unit 460, with upper hole 461 to receive a gas-lift valve, port 464 for production pressure transducer 489 [FIG. 21F], port 469 for production microphone unit 471B [FIG. 21D], lower hole 462 for exhaust of fluid passing through the valve, and threads 465 to connect exit pipe 492 [FIG. 21F]. "O" ring 466 forms a pressure-tight seal between test chamber unit 460 and the lower body of the gas-lift valve with valve outlet port 494 [FIG. 21F] so that test fluid will pass through the valve and exit through lower hole 462. Port 468 is placed in test chamber unit 460 so that production microphone unit 471B will capture sound waves from fluid passing through an installed gas-lift valve. Stop 463 prevents the gas-lift valve from moving through test chamber unit 460. The diameter of connecting passage 467 is sufficiently large to pass all test fluid flowing through an installed gas-lift valve. Exit pipe 492 [FIG. 21F] is attached to unit 460 at threads 465.

FIG. 21D shows generic microphone unit 471, comprising a condenser microphone 470, wires 132 [FIG. 3], microphone fitting 473, microphone threads 474, and a drilled hole 475 for an epoxy-resin pressure seal. Generic microphone unit 471 is fabricated by drilling hole 475 into a pipe fitting to create microphone fitting 473 with threads 474. After installing wires 132 and condenser microphone 470, epoxy-resin is placed into drilled hole 475 to create a pressure-tight seal against high pressures. One generic microphone unit 471, designated injection fluid microphone unit 471A uses condenser microphone 470A and wires 132A [all in FIG. 21F] and screws into port 458 [FIG. 21B]. One generic microphone unit 471, designated production fluid microphone unit 471B uses condenser microphone 470B and wires 132B [all in FIG. 21F] and screws into port 468 [FIG. 21C].

FIG. 21E shows lower holding plate 476 for test chamber assembly 129. Lower plate 476 has hole 477 for threaded bar 481. Plate 476 is secured by nuts 480C and 480D [FIG. 21F] and prevents an installed gas-lift valve from moving vertically downward. Hole 478 provides access to test chamber unit 460 [FIG. 21C]. Test chamber unit 460 is secured to plate 476 by a weld or other means to prevent horizontal motion of unit 460.

FIG. 21F shows test chamber assembly 129, with an installed gas-lift valve 479. Gas-lift valve 479 is inserted into lower test chamber unit 460. Upper test chamber unit 450 is placed over gas-lift valve 479. "O" ring insulator 485 is placed over gas-lift valve 479, followed by circular first-device heat exchanger 400. Flexible tube second-device heat exchanger 412 is placed over valve 479 and secured by flexible tube clamp 415. Test chamber unit 460 is fixed to lower plate 476 by weld 491, or other means. Threaded bar 481 is secured to test frame 482 by nuts 480E and 480F. Lower plate 476 is placed onto bar 481 through hole 477. Nuts 480C and 480D hold lower plate 476. Upper plate 440 is placed onto bar 481 through hole 441 and held in place by nuts 480A and 480B. Upper end of gas-lift valve 479 is placed into recess 442. Nuts 480A and 480B are tightened to secure gas-lift valve 479 and the components of the test chamber assembly. "O" rings 402A and 406A provide pressure-tight seals for circulating first-device heat exchanger fluid. "O" rings 466, 456A, and 457A provide pressure-tight seals for test fluid. "O" ring 485 insulates circular first-device heat exchanger 400 from upper test chamber unit 450. Heat-exchanger fluid 408 enters exchanger 400 and leaves as heat-exchanger fluid 409. Test fluid 495 enters upper test chamber unit 450 at inlet pipe 486, enters gas-lift valve inlet port 493, passes through gas-lift valve 479, leaves at gas-lift valve exit port 494, and leaves lower test chamber unit 460 at exit pipe 492 as test fluid 496.

In FIG. 21F, flexible tube second-device heat-exchanger fluid and temperature transducer 484 are placed into void 497. Temperature transducer 484 is connected by electrical wires 394 to temperature set-point controller 381 [FIG. 19]. Injection pressure and production pressure are monitored by pressure transducers 487 and 489, respectively, which are connected by electrical wires 488 and 490, respectively, to signal conditioner unit 50 [FIG. 2]. The preferred embodiment to control the temperature of gas-lift valve 479 is circular first-device heat exchanger 400 shown in closed contour 498. If either a flexible bladder first-device heat exchanger 420 or a split-core first-device heat exchanger [FIG. 20H] is chosen, then the first-device heat exchanger that is selected will occupy the position of closed contour 498.

Injection fluid microphone unit 471A with condenser microphone 470A is screwed into upper test chamber unit 450 at port 458 [FIG. 21C]. Production fluid microphone unit 471B with condenser microphone 470B is screwed into lower test chamber unit 460 at port 468 [FIG. 21C]. Wires 132A and 132B are connected to volume control 534 [FIG. 23].

FIG. 22 shows high-resolution, constant-steady-state operating points and performance curves for a nitrogen-charged gas-lift valve held at a temperature of 15.55±0.278 degrees Celsius (60±0.5 degrees Fahrenheit), while the valve is operating in the throttling region, in which region the valve is very sensitive to injection and production pressures. The constant-steady-state test data in FIG. 22 are referred to in the three procedures for creating the performance curves.

Procedure (1) is governed by changing the percent-open condition of outlet regulator (set valve) 130 and holding constant the set point of inlet regulator 125 [FIG. 3] to maintain constant injection pressure. Back pressure on the gas-lift valve under test changes over a large range of production pressure as the percent-open condition of outlet regulator (set valve) 130 is changed from full closed to fill open. This procedure creates a single performance curve for each constant-steady-state injection pressure. By the connecting of each operating point to the origin of coordinates, this procedure yields multiple transverse lines, each of which identifies a single level of fluid conductivity at the selected operating point.

Procedure (2) is governed by holding constant the percent-open condition of outlet regulator (set valve) 130 and changing the set point of inlet regulator 125 [FIG. 3]. Back pressure on the gas-lift valve under test changes over a range of production pressure as the set point of inlet regulator is changed to provide injection pressures. This procedure yields a single transverse line that identifies a single level of fluid conductivity for the connected operating points. The range of production pressure is large or small, depending upon the constant percent-open condition of outlet regulator (set valve) 130. When the percent-open condition of outlet regulator (set valve) 130 is small, the range of production pressures is large. When the percent-open condition of outlet regulator (set valve) 130 is large, the range of production pressures is small.

Procedure (3) is governed by holding constant the set point of outlet regulator (back pressure) 130 and changing the set point of inlet regulator 125 [FIG. 3]. Back pressure on the gas-lift valve under test changes over a small range of production pressure for each selected set point of outlet regulator (back pressure) 130 while the injection pressure is changed by inlet regulator 125. In FIG. 22, two sets of operating points illustrate this procedure. A first regulator line 519 is constructed for the set of operating points 511 through 516. A second regulator line 520 is constructed for the second set of operating points [not numbered]. Each set of operating points corresponds to a different set point for outlet regulator (back pressure) 130. First- and second-regulator lines 519 and 520 are offset from the origin of coordinates. Procedure (3) yields multiple transverse lines by the connecting of each operating point to the origin of coordinates.

In FIG. 22, the test data are acquired from energy pulses of two-seconds duration, by which time a constant-steady-state fluid flow rate is achieved. The pre-set opening pressure of the gas-lift valve, 5755 kPa (820 psig), is confirmed in a separate test with valve temperature held constant at 15.55±0.278 degrees Celsius (60±0.5 degrees Fahrenheit). The throttling region of operation of the gas-lift valve occurs at injection pressures below the pre-set valve-opening pressure of the valve. The pre-set opening pressure of the valve is confirmed by performance curve 500, which is a transition curve between throttling flow and orifice flow. Each performance curve is interpolated among operating points described by specific injection pressures. The performance curves are identified by injection pressures in kPa (psig), as follows: 500 5755 (820); 501 5686 (810); 502 5617 (800); 503 5548 (790); 504 5479 (780); 505, 5341 (760); and, 506 5272 (750). A first-transverse line 507 and a second-transverse line 508 are yielded by Procedure (2).

Individual, constant-steady-state operating points on performance curves 500 through 506 are obtained by regulating injection pressure, with production pressure generated by the percent-open condition of outlet regulator (set valve) 130. First- and second-transverse lines 507 and 508, respectively, show fluid conductivity over a large range of production pressures.

The operating points connected by first-regulator line 519 and second-regulator line 520 show a small range of production pressures generated by outlet regulator (back pressure) 130. Operating points 510 through 516, shown on first-regulator line 519, are identified with specific injection pressures in kPa (psig), as follows: 510 5479 (780); 511 5548 (790); 512, 5596 (797); 513 5617 (800); 514 5631 (802); 515 5665 (807); and, 516 5721 (815). Operating points on second-regulator line 520 are similarly identified but not numbered in FIG. 22.

In FIG. 22, constant-steady-state first- and second-regulator lines 519 and 520 demonstrate variable states of fluid conductivity, as distinguished from first- and second-transverse lines 507 and 508, which demonstrate constant states of fluid conductivity. The variable states of conductivity associated with first-regulator line 519 are generated, for example, by connecting each operating point 510 through 516 to the origin of coordinates of the graph. The conductivity at each operating point is defined by the slope of the transverse line from the operating point to the origin of coordinates.

The variations in operating points 510 through 516 with respect to performance curves 500 through 506 are small with respect to first-regulator line 519 sensitivity of 0.754 SCM/D/kPa (2.88 MSCF/D/# production pressure) and second-regulator line 520 sensitivity of 0.921 SCM/D/kPa (3.52 MSCF/D/# production pressure).

With the FEPTS-TRST invention, the high-resolution constant-steady-state performance curves are generally separated by 170 kPa (10 psig) or less injection pressure. With conventional flow-loop testing, low-resolution data, commonly based upon 274 kPa (25 psig) changes in injection pressure, must be used to separate throttling region performance curves. With the FEPTS-TRST invention, the temperature of the fluid control device under test is precisely known. Flow-loop test data are acquired under the assumption that the temperature of the gas-lift valve under test is the same as the temperature of the flowing fluid, an assumption that is generally false. With the FEPTS-TRST invention, an individual operating point can be selected and performance curves in the neighborhood of the point can be created and evaluated. Flow-loop testing does not have this capability.

Figure 23:
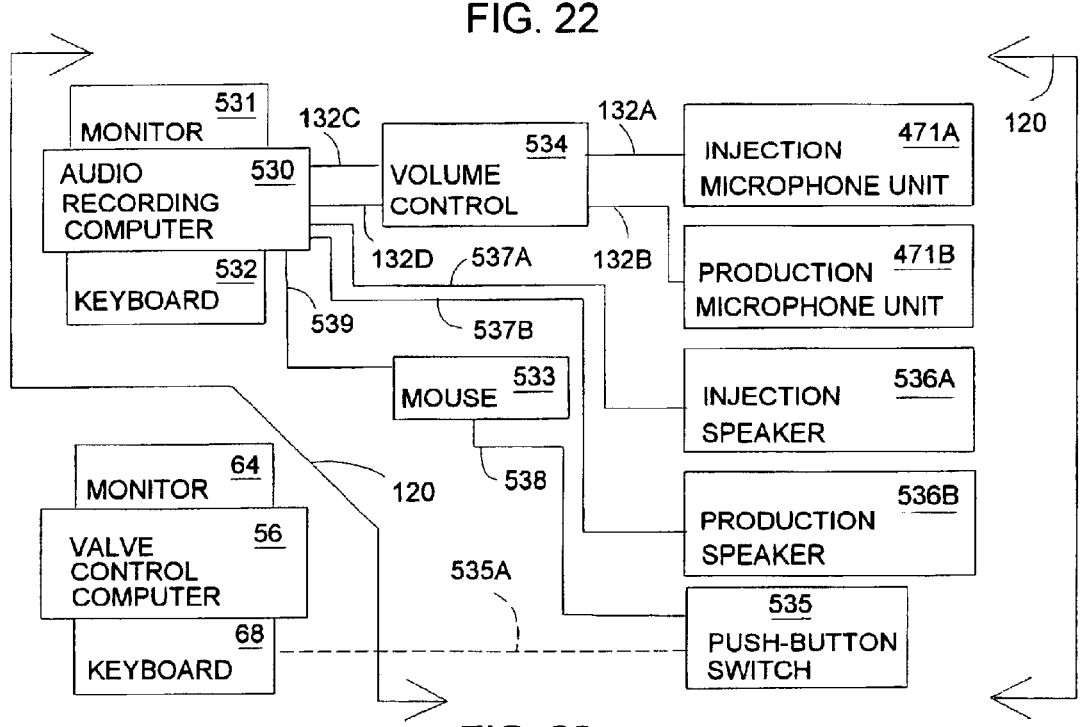
FIG. 23 shows a block diagram of an audio assembly that records injection fluid sound and production fluid sound for frequency analysis, playback, and comparison to injection pressure, production pressure, and fluid flow rate test data.

FIG. 23 shows audio assembly 120 that records and plays back sound created by fluid flowing through a fluid control device under test. Operation of audio assembly 120 is described with reference to a gas-lift valve installed in test chamber 129 [FIG. 21F]. Injection microphone unit 471A screws into upper test chamber unit 450 at port 458 [FIG. 21F] and connects to volume control 534 by wires 132A. Production microphone unit 471B screws into lower test chamber unit 460 at port 468 [FIG. 21F] and connects to volume control 534 by wires 132B. Volume control 534 adjusts sound amplitude by independent amplifiers [not shown] for each microphone 471A and 471B. Volume control 534 connects to audio-recording computer 530 by wires 132C and 132D, which provide a path for audio signals from microphones 471A and 471B, respectively. Audio-recording computer 530, which may be either AC powered or battery powered, includes monitor 531, keyboard 532, mouse 533, and a two channel sound recording and playback capability [not shown]. Injection speaker 536A and production speaker 536B are connected to computer 530 by wires 537A and 537B, respectively, to playback stereophonic sound on independent channels. Speakers 536A and 536B may be in a stereo-headphone device.

Conventional mouse 533 is connected to computer 530 by wires 539, or mouse 533 may use a wireless connection if computer 530 is configured to connect a wireless mouse. Mouse 533 includes an internal switch [not shown] that activates control of computer 530 when the internal switch is closed. Push-button switch 535 is connected in parallel with mouse 530 internal switch so that push-button switch 535 is normally open, and when closed, activates control of computer 530. A computer-software program can be started in computer 530 by push-button switch 535 in precisely the same way mouse 533 would start a computer-software program in computer 530.

With the audio assembly connected to acquire amplitude, frequency, and time sound data for a fluid control device under test, push-button switch 535 initiates the test protocol. When pre-test conditions are completed, monitor 64, which is attached to valve control computer 56, indicates that one keystroke on keyboard 68 is required to start the test. Push-button switch 535 is used to make starting keystroke 535A, which starts the test sequence in computer 56 and simultaneously starts a software program in audio-recording computer 530 to sample and record sounds acquired by injection microphone unit 471A and production microphone unit 471B. After the test is completed, the software program in computer 530 can correlate the sound data with fluid-pressure and fluid-flow-rate test data and can analyze the sampled sound data using Digital Signal Processing [DSP] methods.

DSP computer software programs are available from many sources to record, analyze, and play back digital-sound recordings. Common DSP techniques include sampling sounds to generate sampled, time-dependent sound signals and to produce graphs of the frequency content of the sampled signals. Analytical methods to identify frequency content of signals include Fast Fourier Transform [FFT] methods and Discrete Fourier Transform [DFT] methods. A variety of frequency filtering windows are used with FFT and DFT methods to identify individual frequencies, define the amplitude of individual frequencies, and generate a frequency spectrum of the sounds analyzed.

Two-dimensional and three-dimensional [3D] sound signatures for a fluid control device under test are based, in part, upon the following:

(1) Sound is reproduced on speakers on each of two sound channels;

(2) Time-dependent graphs are constructed for each sound signal on each of two sound channels; and, (3) Frequency spectra are constructed for each sound signal on each of two sound channels.

The form and content of the sound signatures depend upon the test protocol selected. Each fluid control device can-have many sound signatures, each of which corresponds to a particular FEPTS-TRST test protocol. Examples of sound signatures with multiple amplitude, frequency, and time characteristics, that can be correlated to time-dependent fluid-pressure and fluid-flow-rate test data, are provided in FIG. 24, FIG. 25A, and FIG. 25B.

Figure 24:
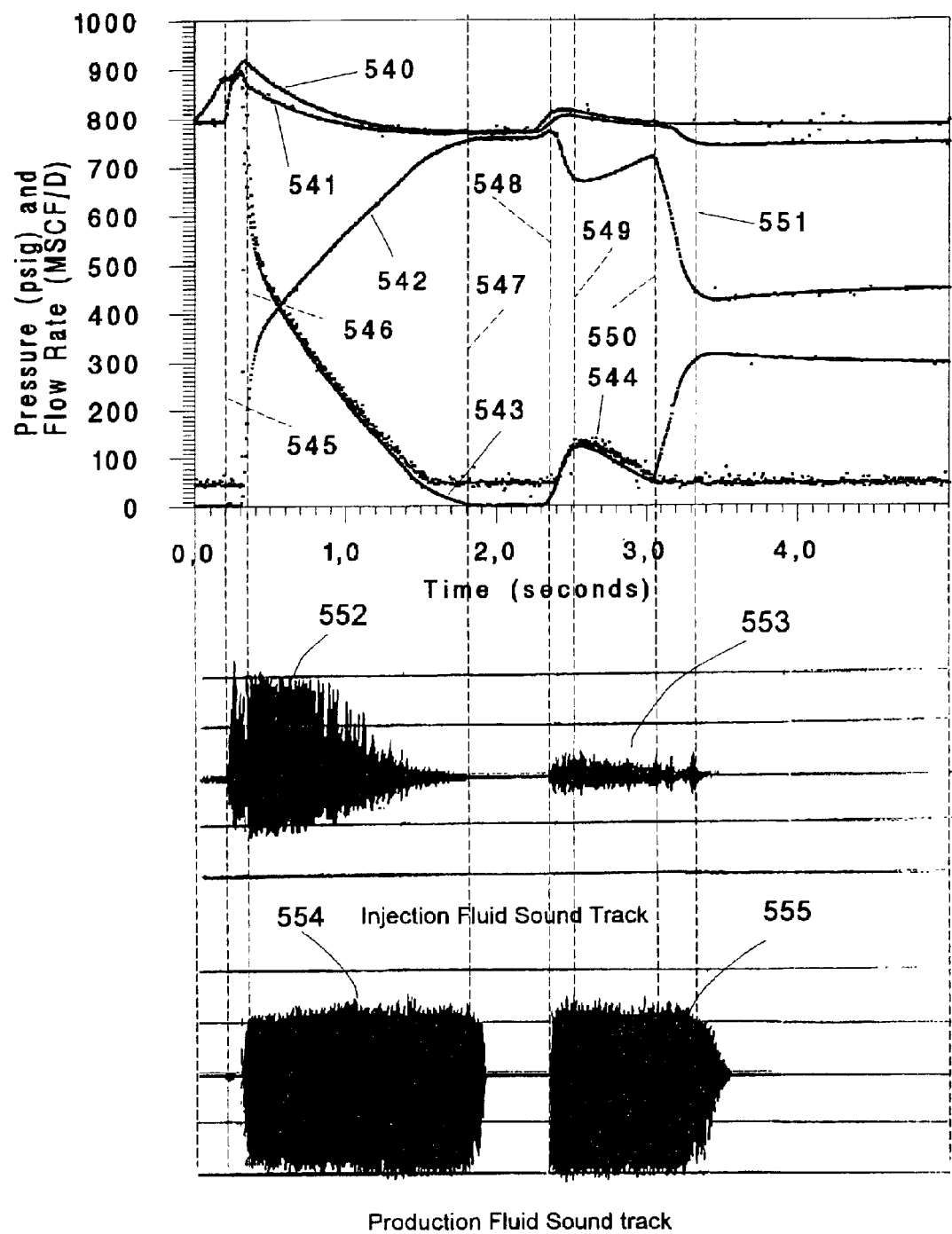
FIG. 24 shows an example of gas-lift valve fluid pressure and fluid flow rate test data that illustrate dynamic operating characteristics of the valve in the throttling region where the valve closes as a result of decreasing injection pressure, subsequently opens as injection pressure and fluid flow rate increase, and then closes again.

FIG. 24 shows time-dependent transient data for an IPO gas-lift valve under test, in which the paths of upstream reservoir pressure 540, injection pressure 541, differential pressure 542, production pressure 543, and fluid flow rate 544 are dependent upon two energy pulses generated by brief recharges of upstream reservoir 30 during a five second test. Recording of the sounds of fluid flow through the gas-lift valve are shown by an injection fluid sound track, derived from injection microphone unit 471A, and a production fluid sound track, derived from production microphone unit 471B [FIG. 23]. Injection and production fluid sounds are correlated with fluid pressure and fluid flow rate test data by construction lines that match the timing of sound events to the timing of fluid pressure and fluid flow rate events. At the start of the test, the valve is initially closed. A 0.35-second recharge of upstream reservoir 30 is initiated at time zero. At 0.2 seconds, noted by construction line 545, control and set valve 36 opens and outlet control valve 131 opens simultaneously, to permit fluid flow. Sound data and fluid pressure and fluid flow rate data show that the gas-lift valve starts to open at 0.30 seconds. Construction line 546 indicates the time the gas-lift valve achieves a full open state. Without strong fluid drive and adequate upstream reservoir pressure, the gas-lift valve quickly enters the throttling region and closes at 1.8 seconds as shown by construction line 547. When injection pressure is increased as shown by construction line 548, the gas-lift valve opens again. Construction line 549 indicates that the gas-lift valve has reached a relative-maximum open state under reduced injection pressure conditions Construction line 550 indicates the simultaneous closure of control and set valve 36 and outlet control valve 131. At the time indicated by construction line 549, the gas-lift valve begins to close because there is insufficient injection pressure to keep the valve open. Construction line 551 indicates the equilibrium pressure established when the test chamber assembly 129 is closed by control and set valve 36 and outlet control valve 131.

Sound data provided by the injection fluid sound track has two parts, first injection audio section 552 and second injection audio section 553. Sound data provided by the production fluid sound track also has two parts, first production audio section 554 and second production audio section 555. First and second injection audio sections 552 and 553 show considerable diversity and are easily correlated with fluid pressure and fluid flow rate test data that describe the gas-lift valve dynamic behavior. First and second production audio sections 553 and 554 show much less diversity. The lack of diversity in the production fluid sound track is a characteristic dynamic property of all tested gas-lift valves. Altering the placement of production microphone unit 471B, interchanging microphones 471A and 471B, and conducting low pressure and high pressure tests does not change this characteristic dynamic property. Thus, easily evaluated gas-lift valve sound information can be obtained only from the injection fluid sound track.

Figure 25A:
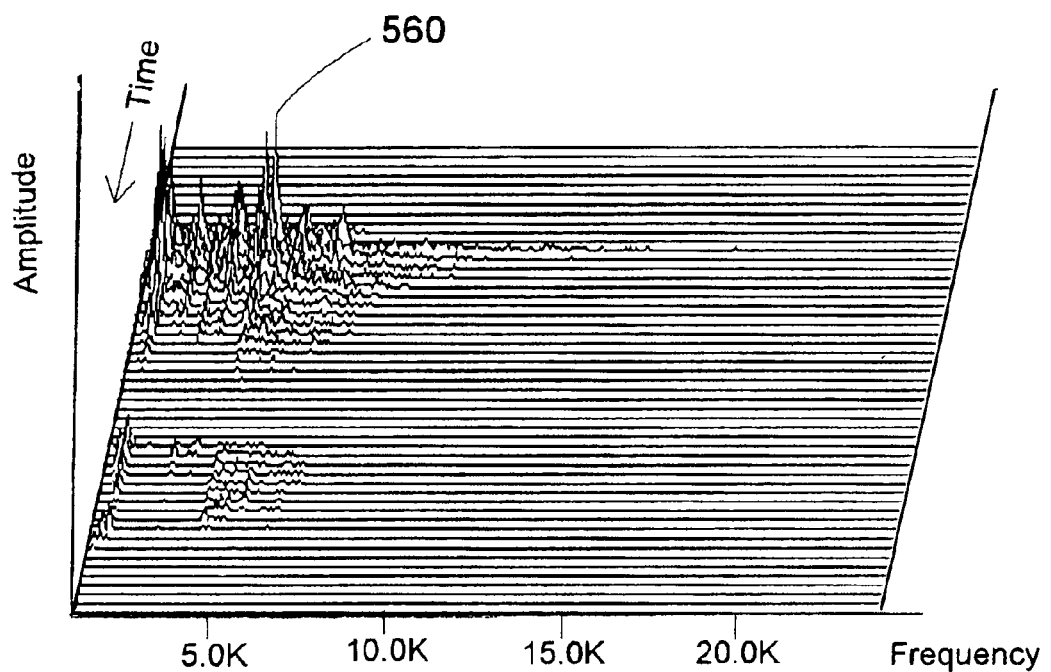
FIG. 25A shows a three-dimensional time-amplitude-frequency graph of the time-dependent injection fluid sound of FIG. 24.

FIG. 25A shows injection fluid sound frequency distribution and amplitude of frequency as a function of test time for the injection fluid sound track of FIG. 24. The time and frequency dependence of sound data are illustrated by the Injection Fluid 3D Time-Frequency graph, which is constructed from sampling the sound signal at 44,100 hertz and applying a 4096 point Fast Fourier Transform with a Hanning filter window. FIG. 25A clearly shows a sound frequency distribution concentrated below 5,000 hertz. High amplitude frequencies, such as the injection fluid dual-peak-amplitude frequencies 560, are a distinguishing sound signature characteristic of the tested gas-lift valve.

Figure 25B:
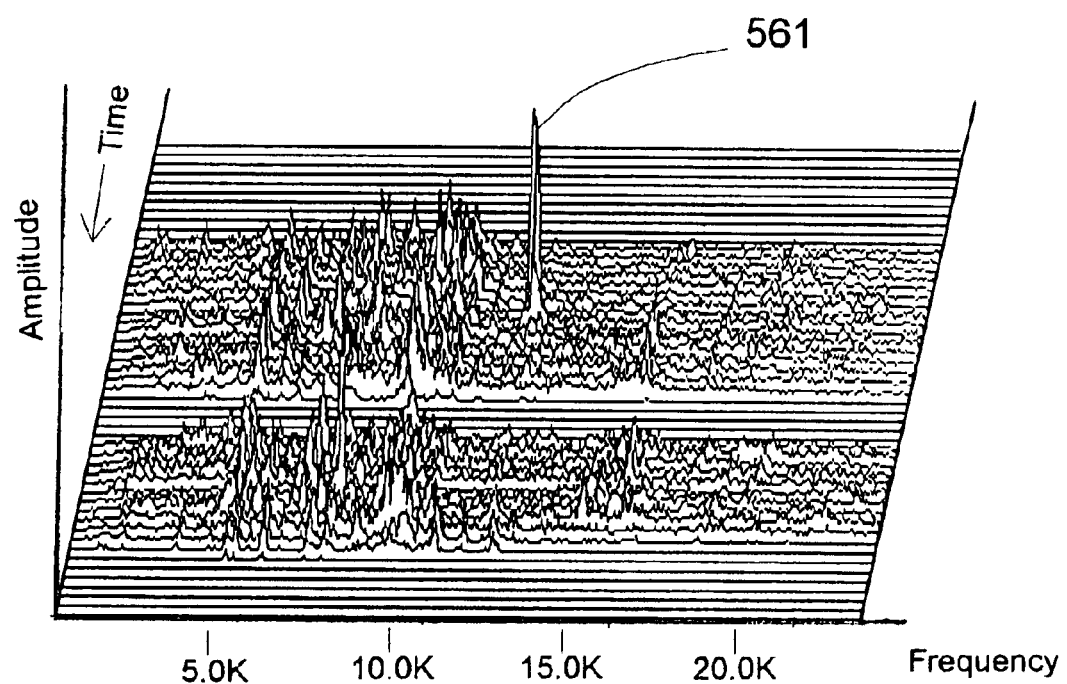
FIG. 25B shows a three-dimensional time-amplitude-frequency graph of the time-dependent production fluid sound of FIG. 24.

FIG. 25B shows production fluid sound frequency distribution and amplitude of frequency as a function of test time for the production fluid sound track of FIG. 24. The time and frequency dependence of sound data are illustrated by the Production Fluid 3D Time-Frequency graph, which is constructed from sampling the sound signal at 44,100 hertz and applying a 4096 point Fast Fourier Transform with a Hanning filter window. FIG. 25B clearly shows a sound frequency distribution concentrated above 5,000 hertz. A high amplitude frequency, such as the production fluid peak-amplitude frequency 561, is also a distinguishing sound signature characteristic of the tested gas-lift valve.

The use of time-frequency analysis and spectral analysis with two-dimensional and three-dimensional graphic representations of sound data from fluid control devices under test presents many new opportunities to improve the design, manufacturing, and operation of fluid control devices by applying the rich body of scientific knowledge available through Digital Signal Processing techniques.

The FEPTS-TRST invention provides the following kinds of information.

(1) Fluid flow rates in constant-steady-state performance graphs are generally lower than fluid flow rates in ramp performance graphs, which in turn are lower than fluid flow rates in transient performance graphs for the same gas-lift valve.

(2) Transient, ramp, and constant-steady-state performance graphs have similar properties showing sub-critical orifice flow and critical throttling flow operating regions, as well as transitions from sub-critical flow to critical flow.

(3) If a fluid control device is operating according to its manufacturer's specifications, either its transient performance graph or its ramp performance graph can be used as a template to characterize the constant-steady-state dynamic operation of the device.

(4) A single transient or ramp transverse line, acquired in minimal test time and strategically located on the performance graph, is sufficient to characterize the operating properties of a fluid control device to validate its dynamic operation.

(5) A complete set of transient transverse lines used to create all transient performance curves on a graph requires less than thirty seconds of test time. By contrast, a single constant-steady-state performance curve requires at least an equivalent test time.

(6) Transient performance curves require less time and less fluid energy to produce than ramp or constant-steady-state performance curves.

(7) Transient operating points on a performance curve can be evaluated repeatedly without explosive fluid pressure and fluid flow rate regulation.

(8) Ramp or constant-steady-state operating points on a performance curve can be evaluated repeatedly with explosive fluid pressure and fluid flow rate regulation.

(9) Transient, ramp, and constant-steady-state test data are reproducible with specified error ranges for fluid pressures and fluid flow rate.

(10) Test data used to produce accurate and precise transient, ramp, and constant-steady-state performance curves are acquired with the same fluid energy pulse test equipment, thereby eliminating the need to compare the accuracy, precision, sensitivity, and error of different HPH-FFR test systems.

(11) Periodic-steady-state fluid pressures and fluid flow rates are generated by the frequency of bang-bang, explosive regulation of fluid pressures and fluid flow rate.

(12) Periodic fluid pressure and fluid flow rate test data demonstrate the filtering properties of a fluid control device under test, including frequency response and group velocity for a single spectral function.

(13) Acquisition of test data for temperature-sensitive fluid control devices uses fluid energy pulse test equipment that accurately controls the temperature of the device during a test, replacing prior art that does not use temperature-control equipment and thus requires test data to be correlated with data from temperature tables.

(14) Prior art for testing gas-lift valves by flow-loop testing assumes that the temperature of the flowing fluid represents the temperature of the gas-lift valve, an assumption that can be shown to be inaccurate.

(15) During a test, temperature of a fluid control device is controlled by a series of heat exchangers to ensure that the temperature of said device is maintained at a set point in the range of 10 to 65.5 degrees Celsius (50 to 150 degrees Fahrenheit), or more.

(16) During a test of a fluid control device, sound tracks of test data can be recorded on two channels, so that one channel records injection fluid sound and the other channel records production fluid sound of fluid flowing through said device.

(17) When a test of a fluid control device is completed, injection fluid and production fluid sound data can be reproduced and correlated with time-dependent fluid pressures and fluid flow that generated the sound responses.

(18) When a test is completed, a Fast Fourier Transform or Discrete Fourier Transform of injection fluid sound data and of production fluid sound data generate distinct frequency responses for the sound of fluid flowing through the fluid control device under test, which frequencies can be evaluated by spectral analysis using Digital Signal Processing methods.

(19) The correlation of sound test data with fluid pressure and fluid flow rate time-dependent test data demonstrates that sound information that describes the dynamic operation of a fluid control device, such as a gas-lift valve, is contained in the injection fluid sound data which shows more diversity than the production fluid sound data.

(20) Sound signatures derived from tests of fluid control devices provide a means of distinguishing one device from another, because sound signatures include time-dependent frequency content that identifies the dynamic operating characteristics of a fluid control device.

(21) Analysis of the frequency content of the sound of fluid flowing through a fluid control device under test provides new ways to evaluate fluid devices by joint-time-frequency analysis, spectral analysis, power spectral density graphs, and spectragrams that invoke color-visual interpretations of frequency data with two-dimensional and three-dimensional graphs.

(22) Time-dependent sound data; time-dependent fluid pressure and fluid flow rate data; operating point data, transverse line data, performance curve data; and sound frequency response data are combined to construct audio-visual representations of fluid energy pulse test data for the evaluation of the dynamic modes of operation of a tested fluid control device.

(23) Operating characteristics of newly designed, manufactured, re-manufactured, repaired, or used fluid control devices are verified by comparing test data acquired with fluid energy pulse test equipment.

(24) Temperature sensitivity of a fluid control device is determined by testing said device at various controlled temperatures during transient, ramp, or constant-steady-state tests.

(25) Precisely controlled periodic fluid driving functions are used to operate a fluid control device with periodic consistency to verify the repetitive operations of opening and closing characteristics of the device.

(26) Transverse lines and fluid conductance derived from high-pressure fluid energy pulse data provide a means to evaluate how upstream and downstream pressures and flow rates co-vary under changing fluid pressure and fluid flow rate conditions, thereby coupling the CIPT and CPPT for gas-lift valves, which coupling is not possible with conventional flow loop testing.

(27) Bang-bang control of a fluid regulator permits the regulator to respond quickly to a demand to restore fluid pressure and fluid in a target reservoir by utilizing the kinetic energy in a fluid energy pulse to over-drive the regulator's operation.

(28) Constant-steady-state fluid pressures and fluid flow rate are acquired under HPHFFR conditions in less than two seconds by using fluid energy pulse test equipment.

I claim:

1. In an apparatus to test fluid control devices, which apparatus comprises one or more computers, means for supplying fluid to fluid reservoirs, means for storing fluid energy in the fluid reservoirs, means for connecting fluid reservoirs, control valves, set valves, and a test chamber, means for generating high-pressure, high-fluid-flow-rate energy pulses, means for activating electrical signals to position electro-pneumatic and electro-magnetic control valves and to position set valves that meter fluid flow through said fluid control devices, means for activating timing sequences for the control valves and set valves that vary fluid pressure and the rate of fluid flow, means for generating fluid-pressure, fluid-flow-rate, and fluid-temperature test data, means for acquiring fluid-pressure, fluid-flow-rate, and fluid-temperature test data, and means for constructing graphs of said test data, improvements comprising:

(a) means for generating transient, ramp, constant-steady-state, and periodic-steady-state test data, means for describing transient, ramp, and constant-steady-state operating points, means for constructing transient, ramp, and constant-steady-state transverse lines and regulator lines, means for measuring fluid conductance; means for creating transient, ramp, and constant-steady-state performance curves, means for correlating transient, ramp, and constant-steady-state performance curves, and means for evaluating said transient, ramp, and constant-steady-state test data, operating points, transverse lines, regulator lines, fluid conductance, and performance curves, and periodic-steady-state test data;

(b) means, by a directional switch array, for directing electrical signals that position the open and closed states of electro-pneumatic and electromagnetic control valves, the open states of set valves, and the set-point states of regulators, all of which are integrated into said apparatus;

(c) means, by an explosive regulation assembly, for generating positive and negative fluid energy pulses and for regulating the fluid flow to and from a fluid control device under test, which assembly comprises pipes, electro-pneumatic and electromagnetic control valves, set valves, regulators, and fluid reservoirs, with means for selecting the open and closed states of control valves, the open states of set valves and the set-point states of regulators, and with means for defining a condition of constant-steady-state fluid pressure and fluid flow rate;

(d) means, by a test chamber assembly, for testing a fluid control device, which assembly comprises a fluid-tight upper test chamber unit and a fluid-tight lower test chamber unit, with said units placed in fluid communication with the fluid control device to be tested, means to connect said upper and lower test chamber units, means for installing a pressure transducer in each test chamber unit, means for preventing the test chamber assembly from moving horizontally and vertically, means, as applicable, for installing heat exchangers from a temperature control assembly around or on said fluid control device, and means, as applicable, for installing a sound transducer from an audio assembly in each of the test chamber units;

(e) means, by a temperature control assembly, for controlling the temperature of a fluid control device under test, and for determining the temperature sensitivity of fluid control devices, which assembly comprises a temperature set-point controller, heating element and cooling fluid compressor, heat exchangers with temperature-transporting fluids, fluid reservoirs, a fluid pump, pipes, valves, and temperature transducers; and (f) means, by an audio assembly, for recording, for playing back, and for analyzing sound from fluid flowing through a fluid control device under test, which assembly comprises a computer with means to acquire sound data at the same time that fluid-pressure and fluid-flow-rate data are acquired, and with means to conduct Digital Signal Processing analyses of the sound data, and a multiple-channel sound system with one sound transducer and one speaker for each channel, with one sound transducer for one channel upstream of the fluid control device and a second sound transducer for a second channel downstream of said device, and with one sound amplifier connected to each sound transducer and to the computer.

2. The improvement of claim 1, wherein the directional switch array for electrical control signals that position control valves, set valves, and regulators further comprises:

(a) a set of single-input-multi-output electrical switches paired with a set of normally open single-input-single-output push-button electrical switches; and, (b) an electrical circuit for each pair of switches providing for an electrical signal from a computer to be sent to the input terminal of a voltage converter from which the output electrical signal is sent to the input terminal of a single-input-multi-output electrical switch, and for an electrical signal from an electrical power source to be sent to the input terminal of a push-button switch with the output terminal of the push-button switch connected to the input terminal of the single-input-multi-output electrical switch, whereby directing electrical control signals to additional control valves, set valves, and regulators extends the number of configurations of the apparatus, expands the range and complexity of test protocols for said apparatus, and enhances the capability of said apparatus to control fluid pressure and fluid flow rate with explosive fluid energy pulses.

3. The improvement of claim 2, wherein directed control signals position electro-pneumatic control valves and electromagnetic control valves to a fully closed or a fully open state in a bang-bang manner, position set valves to various open states, and position pressure and flow-rate regulators to various set-point states.

4. The improvement of claim 3, wherein the open states of set valves and the set-point states of regulators are positioned either automatically by computer or manually by switch, with said open states and set-point states positioned either as constant states or as time-varying states, and, when time-varying, the open states and set-point states increase or decrease from an initial state.

5. The improvement of claim 1, wherein the explosive regulation assembly further comprises means by switch- or computer-activated control signals to synchronize or to vary in time, duration, and frequency the positions of an upstream control valve and regulator or set valve to regulate explosively fluid pressure and rate of fluid flow by one or more positive energy pulses, either from a single fluid reservoir to a fluid control device under test, or from a second-fluid reservoir into a first-fluid reservoir to a fluid control device under test, and the positions of a downstream control valve and regulator or set valve to exhaust fluid explosively by one or more negative energy pulses into another reservoir or into the atmosphere.

6. The improvement of claim 5, wherein the explosive regulation assembly further comprises:
  (a) means by a second fluid reservoir with a specified volume connected to a first fluid reservoir with a specified volume to hold fluid to be delivered to a fluid control device under test, with the volume of the second fluid reservoir greater than the volume of the first fluid reservoir, with the second fluid reservoir charged to a higher pressure than the first fluid reservoir, and with the second fluid reservoir in fluid communication with the first fluid reservoir through pipes and through either a control valve and a regulator or a control valve and a set valve;
  (b) means to specify the magnitude of a fluid energy pulse by the pressure in the first or second fluid reservoir;
  (c) means to regulate explosively fluid pressure and rate of fluid flow to the fluid control device by the controlled opening and closing, in a bang-bang manner, of one or more control valves; and,
  (d) means to deliver fluid energy pulses of the same magnitude or of increasing or decreasing magnitude by holding constant or by varying the set-point state of a regulator or the open state of a set valve.

7. The improvement of claim 1, wherein the means to measure fluid conductance associated with a fluid control device under test comprises various open states of set valves and various set-point states of regulators, combined with the fluid-resistance properties of the fluid control device, which fluid conductance is defined by the ratio of fluid flow rate with respect to downstream fluid pressure for a specific upstream fluid pressure, with a constant fluid conductance defined by the ratio of a constant change in fluid flow rate with respect to a constant change in downstream fluid pressure for a continuum of upstream fluid pressures, and exhibited by the slope of a transverse line that focuses to the origin of coordinates of a graph of fluid flow rate with respect to fluid pressure,
  whereby the level of fluid conductance derived from a specific open state of a downstream set valve for a transient, a ramp, and a constant-steady-state test of a fluid control device will show successively decreasing values from transient to ramp to constant steady-state operating conditions at the same value of upstream fluid pressure.

8. The improvement of claim 1, wherein, on successive constant-steady-state tests of a fluid control device, computer-activated timing sequences position control valves, set valves, and regulators to increase the duration of positive and negative fluid energy pulses from an initial short duration in the first test to a longer duration in each successive test, so that fluid pressure and fluid flow rate in a test with long-duration fluid energy pulses will approach or reach constant-steady-state conditions, and so that long-duration test data can be correlated with short-duration test data to define precisely constant-steady-state conditions.

9. The improvement of claim 1, wherein a temperature control assembly for holding constant the temperature of a fluid control device under test, and for determining the temperature sensitivity of fluid control devices, further comprises a temperature set-point controller to hold constant or to vary the temperature of the circulating heat-exchanger fluid of a first-device heat exchanger; a cooling fluid compressor and a cold-fluid reservoir heat exchanger, a heating element and a hot-fluid reservoir heat exchanger, a fluid pump, pipes, and valves to select either cold or hot circulating heat-exchanger fluid that is not affected by the temperature of test fluid flowing through a fluid control device, with said heat-exchanger fluid circulated in a closed piping system to a first-device heat exchanger in thermal communication with the fluid control device to transfer the temperature of the circulating heat-exchanger fluid to the device; and, either a second-device heat exchanger with non-circulating heat exchanger fluid in thermal communication with the fluid control device to transfer the temperature of said device by a temperature transducer placed in said non-circulating fluid to a temperature set-point controller, or, alternatively, a temperature transducer in direct contact or in indirect contact with the fluid control device to transfer the temperature of said device to the temperature set-point controller,
  whereby holding constant the temperature of a temperature-sensitive area of a fluid control device under test ensures that test data generated at various fluid pressures and fluid flow rates are generated at a specific temperature, and varying the temperature of a fluid control device determines the operating characteristics of said device at different temperatures.

10. In the improvement of claim 1, a method to generate temperature-controlled, time-dependent transient fluid pressure and fluid flow rate data from transient tests of a fluid control device, comprising the steps:
  (a) placing a first-device heat exchanger and either a second-device heat exchanger or a temperature transducer around or on a fluid control device and installing said device in the upper and lower test chamber units;
  (b) setting the temperature set point for the first-device heat exchanger;
  (c) selecting the initial condition of a target pressure in the fluid reservoir upstream of the fluid control device;
  (d) pressurizing the test chamber assembly, and associated pipes, control valves, set valves, regulators, and reservoir, so that the pressure is set to the target pressure of the upstream fluid reservoir, and so that the fluid control device is placed in a fully open state to allow fluid to communicate through said device;

(e) setting the initial open state of a set valve or the initial set-point state of a regulator, downstream of the fluid control device, to generate back pressure on said device;

(f) selecting timing sequences for control valves, set valves, and regulators to supply fluid from the fluid reservoir to the fluid control device, and to exhaust fluid by one or more negative energy pulses from the pressurized system to another reservoir or to the atmosphere, with the negative energy pulses defined by duration and delay;

(g) exhausting fluid explosively by one or more negative energy pulses to generate transient fluid-pressure and fluid-flow-rate test data; and, (h) repeating step (c) through step (h), with the same or a new initial condition, the same or new initial states, and the same or new timing sequences, until all transient test data of interest have been acquired.

11. In the improvement of claim 10, a method to create transient performance curves for a fluid control device from transient test data, comprising the steps:

(a) choosing an array of transient fluid-pressure and fluid-flow-rate test data derived from holding constant one value of either the open state of a downstream set valve or the set-point state of a downstream regulator;

(b) selecting a set of transient upstream pressure points from the test data, which pressure points are based upon an increment of transient upstream pressure;

(c) identifying the transient downstream fluid pressure and fluid flow rate for each upstream pressure point;

(d) plotting each of the transient operating points on a graph of transient flow rate with respect to transient pressure, with each transient operating point described by an upstream fluid pressure and the corresponding downstream fluid pressure and fluid flow rate;

(e) connecting the transient operating points to construct, either a first transient transverse line that focuses to the origin of coordinates and represents a constant transient fluid conductance, or a first transient regulator line;

(f) repeating step (a) through step (f), choosing an array of test data derived from holding constant a different selected value of either the open state of the downstream set valve or the set-point state of the downstream regulator, until a sufficient number of either transient transverse lines or transient regulator lines have been constructed to cover the range of transient fluid flow rates with respect to transient fluid pressures of interest;

(g) connecting the transient operating points with the same value of upstream pressure on either the transient transverse lines or the transient regulator lines, by interpolation or other technique, to create a first transient performance curve for the tested fluid control device; and, (h) repeating step (g) until all transient operating points at all transient upstream fluid pressures of interest have been connected to create a graph comprising multiple transient performance curves for the tested fluid control device.

12. In the improvement of claim 1, a method to generate temperature-controlled, time-dependent ramp fluid pressure and fluid flow rate data from ramp tests of a fluid control device, comprising the steps:

(a) placing a first-device heat exchanger and either a second-device heat exchanger or a temperature transducer around or on a fluid control device and installing said device in the upper and lower test chamber units;

(b) setting the temperature set point for the first-device heat exchanger;

(c) selecting the initial conditions of a target pressure in a first fluid reservoir and in a second fluid reservoir, with said second fluid reservoir to be charged to a higher pressure than said first fluid reservoir;

(d) setting the initial open state of an upstream set-valve that is in fluid communication with the second fluid reservoir, so that fluid pressure and fluid flow rate will increase or decrease linearly during a test;

(e) pressurizing the test chamber assembly, and associated pipes, control valves, set valves, regulators, and reservoirs, so that the pressure is set to the target pressure of the first fluid reservoir, and so that the fluid control device is placed in an open state to allow fluid to communicate through said device;

(f) setting the initial open state of a set valve or the initial set-point state of a regulator, downstream of the fluid control device, to generate back pressure on said device;

(g) selecting timing sequences for control valves, set valves, and regulators to regulate fluid by one or more positive energy pulses from the second fluid reservoir into the first fluid reservoir in order to regulate fluid to the fluid control device, and to exhaust fluid by one or more negative energy pulses from the pressurized system to another reservoir or to the atmosphere, with the positive energy pulses defined by magnitude, duration, and delay, and with the negative energy pulses defined by duration and delay;

(h) regulating fluid explosively by one or more positive energy pulses and one or more negative energy pulses to generate ramp fluid-pressure and fluid-flow-rate test data; and, (i) repeating step (c) through step (i), with the same or new initial conditions, the same or new initial states, and the same or new timing sequences, until all ramp test data of interest have been acquired.

13. In the improvement of claim 12, a method to create ramp performance curves for a fluid control device from ramp test data, comprising the steps:

(a) choosing an array of ramp fluid-pressure and fluid-flow-rate test data derived from holding constant one value of either the open state of a downstream set valve or the set-point state of a downstream regulator;

(b) selecting a set of ramp upstream pressure points from the test data, which pressure points are based upon an increment of ramp upstream pressure;

(c) identifying the ramp downstream fluid pressure and fluid flow rate for each upstream pressure point;

(d) plotting each of the ramp operating points on a graph of ramp flow rate with respect to ramp pressure, with each ramp operating point described by an upstream fluid pressure and the corresponding downstream fluid pressure and fluid flow rate;

(e) connecting the ramp operating points to construct, either a first ramp transverse line that focuses to the origin of coordinates and represents a constant ramp fluid conductance, or a first ramp regulator line;

(f) repeating step (a) through step (f), choosing an array of test data derived from holding constant a different selected value of either the open state of the downstream set valve or the set-point state of the downstream regulator, until a sufficient number of either ramp transverse lines or ramp regulator lines have been constructed to cover the range of ramp fluid flow rates with respect to ramp fluid pressures of interest;

(g) connecting the ramp operating points with the same value of upstream pressure on either the ramp transverse lines or the ramp regulator lines, by interpolation or other technique, to create a first ramp performance curve for the tested fluid control device; and, (h) repeating step (g) until all ramp operating points at all ramp upstream fluid pressures of interest have been connected to create a graph comprising multiple ramp performance curves for the tested fluid control device.

14. In the improvement of claim 1, a method to generate temperature-controlled, time-dependent constant-steady-state fluid pressure and fluid flow rate data from constant-steady-state tests of a fluid control device, comprising the steps:

(a) placing a first-device heat exchanger and either a second-device heat exchanger or a temperature transducer around or on a fluid control device and installing said device in the upper and lower test chamber units;

(b) setting the temperature set point for the first-device heat exchanger;

(c) selecting the initial conditions of a target constant-steady-state pressure in a first fluid reservoir and pressure in a second fluid reservoir, with the second fluid reservoir to be charged to a higher pressure than the first fluid reservoir;

(d) setting the initial set-point state of an upstream regulator to regulate constant-steady-state fluid pressure and fluid flow to the fluid control device;

(e) pressurizing the test chamber assembly, and associated pipes, control valves, set valves, regulators, and reservoirs, so that the pressure is set to the target constant-steady-state pressure of the first fluid reservoir, and so that the fluid control device is placed in an open state to allow fluid to communicate through said device;

(f) setting the initial open state of a set valve or the initial set-point state of a regulator, downstream of the fluid control device, to generate back pressure on said device;

(g) selecting timing sequences for control valves, set valves, and regulators to regulate fluid by one or more positive energy pulses from the second fluid reservoir into the first fluid reservoir in order to regulate fluid to the fluid control device, and to exhaust fluid by one or more negative energy pulses from the pressurized system to another reservoir or to the atmosphere, with the positive energy pulses defined by magnitude, duration, and delay, and with the negative energy pulses defined by duration and delay;

(h) regulating fluid explosively by one or more positive energy pulses and one or more negative energy pulses to generate constant-steady-state fluid-pressure and fluid-flow-rate test data; and, (i) repeating step (c) through step (i), with the same or new initial conditions, the same or new initial states, and the same or new timing sequences, either to hold constant the regulated pressure upstream of the fluid control device under test and change the open state of the downstream set valve or the set-point state of the downstream regulator, or to change the regulated pressure upstream of the fluid control device and hold constant a new open state of the downstream set valve or a new set-point state of the downstream regulator, until all constant-steady-state test data of interest have been acquired.

15. In the improvement of claim 14, a method to create constant-steady-state performance curves for a fluid control device from constant-steady-state test data, derived from either different set-point- states of the upstream regulator, or different open states of the downstream set valve, or different set-point states of the downstream regulator, said method comprising a first procedure with steps (a) through (e), or a second procedure with steps (f) through (m), or a third procedure with steps (n) through (u):

First Procedure (a) choosing an array of test data acquired at a regulated upstream pressure derived from holding constant a value of the set-point state of the upstream regulator and a value of either the open state of the downstream set valve or the set-point state of the downstream regulator;

(b) plotting one constant-steady-state operating point on a graph of constant-steady-state flow rate with respect to constant-steady-state pressure, with said operating point described by regulated upstream pressure, downstream pressure, and fluid flow rate;

(c) repeating step (a) and step (b), choosing an array of test data with the same upstream pressure and a different value either of the open state of the downstream set valve or of the set-point state of the downstream regulator, until a sufficient number of constant-steady-state operating points have been plotted to define a constant-steady-state performance curve at the same regulated upstream pressure;

(d) connecting the constant-steady-state operating points, by interpolation or other technique, to create a first constant-steady-state performance curve for the tested fluid control device; and, (e) repeating step (a) through step (e), selecting different regulated upstream pressures to create all constant steady-state performance curves of interest; or Second Procedure (f) choosing an array of test data derived from holding constant a value of the open state of the downstream set valve and a regulated upstream pressure derived from a constant value of the set-point state of the upstream regulator;

(g) plotting one constant-steady-state operating point on a graph of constant-steady-state flow rate with respect to constant-steady-state pressure, with said operating point described by regulated upstream pressure, downstream pressure, and fluid flow rate;

(h) repeating step (f) and step (g), choosing an array of test data with the same value of the open state of the downstream set valve and a different upstream pressure, until a sufficient number of constant-steady-state operating points have been plotted to construct one constant-steady-state transverse line at the same open state of the downstream set valve;

(i) connecting the constant-steady-state operating points to construct one constant-steady-state transverse line that focuses to the origin of coordinates and represents a constant, constant-steady-state fluid conductance;

(j) repeating step (f) through step (j), selecting different values of the open state of the downstream set valve to construct all constant-steady-state transverse lines of interest;

(k) connecting all constant-steady-state operating points with the same regulated upstream pressure on the constant-steady-state transverse lines, by interpolation or other technique, to create a first constant-steady-state performance curve;

(l) connecting all constant-steady-state operating points with a different regulated upstream pressure on the constant-steady-state transverse lines to create a different constant-steady-state performance curve; and, (m) repeating step (l), selecting different regulated upstream pressures to create all constant-steady-state performance curves of interest; or Third Procedure (n) choosing an array of test data derived from holding constant a value of the set-point state of the downstream regulator and a regulated upstream pressure derived from a constant value of the set-point state of the upstream regulator;

(o) plotting one constant-steady-state operating point on a graph of constant-steady-state flow rate with respect to constant-steady-state pressure, with said operating point described by regulated upstream pressure, regulated downstream pressure, and fluid flow rate;

(p) repeating step (n) and step (o), choosing an array of test data with the same value of the set-point state of the downstream regulator and a different upstream pressure, until a sufficient number of constant-steady-state operating points have been plotted to construct one constant-steady-state regulator line at the same set-point state of the downstream regulator;

(q) connecting the constant-steady-state operating points to construct one constant-steady-state regulator line;

(r) repeating step (n) through step (r), selecting different values of the set-point state of the downstream regulator to construct all constant-steady-state regulator lines of interest;

(s) connecting all constant-steady-state operating points with the same regulated upstream pressure on the constant-steady-state regulator lines, by interpolation or other technique, to create a first constant-steady-state performance curve;

(t) connecting all constant-steady-state operating points with a different regulated upstream pressure on the constant-steady-state regulator lines to create a different constant-steady-state performance curve; and, (u) repeating step (t), selecting different regulated upstream pressures to create all constant-steady-state performance curves of interest.

16. In the improvement of claim 14, a method to define error criteria for constant-steady-state fluid pressure and fluid flow rate test data, comprising the steps:

(a) defining error bounds on the rate-of-change of upstream pressure, of downstream pressure, and of fluid flow rate as a limiting value of pressure per unit time and as a limiting value of fluid flow rate per unit time, with said limiting values further defined at the time at which the rate-of-change is zero or near zero in order to define constant-steady-state conditions;

(b) defining error bounds on the magnitude of fluid pressure and fluid flow rate as a percentage of upstream fluid pressure, of downstream fluid pressure, and of fluid flow rate, with said percentages further defined as ranges of variation of pressure and of flow rate about nominal values of pressure and flow rate; and, (c) capturing fluid-pressure and fluid-flow-rate test data when said data enter the limiting rate-of-change error bounds, or the magnitude error bounds, or both types of error bounds.

17. In the improvement of claim 14, a method to reproduce the fluid pressure and fluid flow rate test data used to describe a specific constant-steady-state operating point repeatedly and independently of any other constant-steady-state operating point by the precise repetition of step (a) through step (h).

18. In the improvement of claim 1, a method to generate time-dependent constant-steady-state fluid-pressure and fluid-flow-rate data from constant-steady-state tests of a fluid control device, comprising the steps:

(a) placing a high-pressure fluid reservoir in fluid communication with a control valve and a regulator that are upstream of a fluid control device installed in a test chamber assembly;

(b) selecting the initial condition of a target constant-steady-state fluid pressure;

(c) setting the initial set-point state of said upstream regulator to regulate constant-steady-state fluid pressure and fluid flow to the fluid control device;

(d) setting the initial open state of a set valve or the initial set-point state of a regulator, downstream of the fluid control device, to generate back pressure on said device;

(e) selecting timing sequences for the upstream and the downstream control valves, the upstream regulator, and either the downstream set valve or the downstream regulator to regulate fluid by one or more positive energy pulses from the high-pressure fluid reservoir to the fluid control device, and to exhaust fluid by one or more negative energy pulses from the fluid control device to another reservoir or to the atmosphere, with the positive energy pulses defined by magnitude, duration, delay, and frequency, and with the negative energy pulses defined by duration, delay, and frequency;

(f) regulating fluid explosively by one or more positive energy pulses and one or more negative energy pulses to generate constant-steady-state fluid-pressure and fluid-flow-rate test data; and, (g) repeating step (b) through step (g), with the same or a new initial condition, the same or new initial states, and the same or new timing sequences, either to hold constant the regulated pressure upstream of the fluid control device under test and change the open state of the downstream set valve or the set-point state of the downstream regulator, or to change the regulated pressure upstream of the fluid control device and hold constant a new open state of the downstream set valve or a new set-point state of the downstream regulator, until all constant-steady-state test data of interest have been acquired.

19. In the improvement of claim 1, a method to generate temperature-controlled, time-dependent periodic-steady-state fluid pressure and fluid flow rate data from periodic-steady-state tests of a fluid control device, comprising the steps:

(a) placing a first-device heat exchanger and either a second-device heat exchanger or a temperature transducer around or on a fluid control device and installing said device in the upper and lower test chamber units;

(b) setting the temperature set point for the first-device heat exchanger;

(c) selecting the initial condition of the target average pressure for a first fluid reservoir about which the periodic-steady-state upstream fluid pressure will vary;

(d) selecting the initial condition of pressure in a second fluid reservoir, with said second fluid reservoir to be charged to a higher pressure than said first fluid reservoir;

(e) setting the initial set-point state of an upstream regulator, so that the target average fluid pressure will be the average of the variations in the periodic-steady-state fluid pressure;

(f) pressurizing the test chamber assembly, and associated pipes, control valves, set valves, regulators, and reservoirs, so that the pressure is set to the target average fluid pressure of the first fluid reservoir;

(g) setting the initial open state of a set valve or the initial set-point state of a regulator, downstream of the fluid control device;

(h) selecting periodic timing sequences for control valves, set valves, and regulators to regulate fluid by periodic positive energy pulses from the second fluid reservoir into the first fluid reservoir in order to regulate fluid to the fluid control device, and to exhaust fluid by periodic negative energy pulses from the pressurized system to another reservoir or to the atmosphere, with the positive energy pulses defined by magnitude, duration, delay, duty cycle, and frequency; and with the negative energy pulses defined by duration, delay, duty cycle, and frequency, (i) regulating fluid explosively by positive energy pulses and negative energy pulses to generate periodic fluid-pressure and fluid-flow-rate test data; and, (j) repeating step (c) through step (j), with the same or new initial conditions, the same or new initial states, and the same or new timing sequences, until all periodic-steady-state tests of interest are completed.

20. In the improvement of claim 19, a method to identify phase-delay and other frequency-dependent filtering properties of a fluid control device from periodic-steady-state fluid pressure and fluid flow rate test data, comprising the steps:

(a) plotting on a graph with respect to time the upstream pressure, downstream pressure, and fluid flow rate at a specific periodic-steady-state pulse frequency;

(b) measuring the time difference either between upstream fluid pressure and fluid flow rate or between upstream fluid pressure and downstream fluid pressure at appropriate periodic points, such as maximum or minimum points, on said graph;

(c) identifying said time difference as the phase-delay of the tested fluid control device at the selected pulse frequency;

(d) measuring the amplitude responses of the upstream pressure, downstream pressure, and fluid flow rate at the selected pulse frequency;

(e) identifying changes in the amplitude responses as the frequency-dependent filtering properties of the tested fluid control device at the selected pulse frequency; and, (f) repeating step (a) through step (f), selecting a new pulse frequency, until all periodic-steady-state pulse frequencies of interest have been evaluated.

21. The improvement of claim 1, wherein the rate of fluid flow through a fluid control device is reduced by increments from a maximum unrestricted rate by a choking means placed upstream of the fluid control device, in order to identify changes in performance characteristics of the fluid control device resulting from changes in the rate of fluid flow through said device during transient, ramp, constant-steady-state, or periodic-steady-state tests.

22. The improvement of claim 1, wherein the audio assembly further comprises means to acquire upstream and downstream sound amplitude and sound frequency data from fluid flowing through a fluid control device by sound transducers, so that the sound data can be correlated with upstream and downstream fluid-pressure and fluid-flow-rate data acquired by transducers and sensors during transient, ramp, constant-steady-state, and periodic-steady-state tests of the fluid control device.

23. The improvement of claim 1, wherein the audio assembly further comprises a computer-based means to activate one or more computers, so that the sampling of sound is initiated at the same time that the sampling of fluid pressure and fluid flow rate is initiated during a transient, ramp, constant-steady-state, or periodic-steady-state test of a fluid control device.

24. The improvement of claim 23, wherein a means to activate two or more computers at the same time further comprises a computer mouse with an internal switch connected in parallel with an external switch, so that, when a mouse-pointer is positioned to a software activity on one computer monitor, a single keyboard stroke with the external switch activates the computers.

25. The improvement of claim 1, wherein the test chamber assembly further comprises means for configuring the test chamber units and associated pipes and fittings to the proportions required to conduct transient, ramp, constant-steady-state, and periodic-steady-state tests of various fluid control devices with inlet and outlet ports for metering fluid, including gas-lift valves, differential pressure valves, pilot valves, single- and double-check valves, orifice valves, sub-surface safety valves, sub-sea gas-lift kill valves, pressure regulators, and flow-rate regulators.

26. The improvement of claim 1, wherein the test chamber assembly further comprises means for configuring the test chamber units and associated pipes and fittings to the proportions required to accept temperature-control means to conduct temperature-controlled transient, ramp, constant-steady-state, and periodic-steady-state tests of a fluid control device, and to the proportions required to conduct said tests when temperature-control means are not in use during said tests.

27. The improvement of claim 1, wherein the test chamber assembly for testing fluid control devices further comprises:

(a) an upper test chamber unit that is connected by at least one upstream fluid conduit to fluid-drive-generating components of said apparatus, (b) a lower test chamber unit that is connected by at least one downstream fluid conduit to fluid-exhaust components of said apparatus;

(c) said upper test chamber unit placed in fluid-tight communication with a fluid control device to be tested at an upstream fluid inlet of said device, and said lower test chamber unit placed in fluid-tight communication with said device at a downstream fluid outlet of said device;

(d) said upper and lower test chamber units configured, when applicable, to expose a temperature-sensitive area of a fluid control device to be tested, so that temperature-control means can be placed around or on the temperature-sensitive area of said device;

(e) means to secure and to hold together the upper and lower test chamber units and the fluid control device so that said units maintain fluid-tight integrity with said device when the test chamber assembly is pressurized;

(f) a first fitting means that is placed in fluid communication with the upper test chamber unit so that said means is open in order to receive a first pressure transducer;

(g) a second fitting means that is placed in fluid communication with the lower test chamber unit so that said means is open in order to receive a second pressure transducer;

(h) a third fitting means that is placed in fluid communication with the upper test chamber unit so that said means is either open in order to receive a first sound transducer or closed when an audio assembly is not in use; and, (i) a fourth fitting means that is placed in fluid communication with the lower test chamber unit so that said means is either open in order to receive a second sound transducer or closed when said sound transducer is not in use or when an audio assembly is not in use, whereby separating the test chamber assembly into an upper test chamber unit and a lower test chamber unit exposes a temperature-sensitive area of a fluid control device under test so that temperature-controlling means hold constant the temperature of said device, permits measuring of upstream and downstream fluid pressures by pressure transducers, isolates upstream fluid-flow sound from downstream fluid-flow sound, and, when said fluid control device is of circular design, allows fluid-tight connections by O-ring gaskets.

28. In the improvement of claim 1, a method to acquire sound amplitude, sound frequency, and sound time data from fluid flowing through a fluid control device during a transient, ramp, constant-steady-state, or periodic-steady-state test, comprising the steps:

(a) installing one or more sound transducers upstream and downstream of the fluid control device installed in the upper and lower test chamber units of the test chamber assembly;

(b) connecting a sound channel to each sound transducer and to a sound amplifier;

(c) connecting each sound amplifier to a sound channel of a computer;

(d) calibrating the amplitude response of each sound transducer on each sound channel of the computer at various amplitudes over a range of sound frequencies; and, (e) initiating the acquisition of sound data when initiating the acquisition of fluid-pressure and fluid-flow-rate test data.

29. In the improvement of claim 28, a method to create an audio-visual representation of sound, fluid-pressure, and fluid-flow-rate responses of a tested fluid control device, comprising the steps:

(a) plotting the upstream sound amplitude data on a graph of sound amplitude with respect to time;

(b) plotting the downstream sound amplitude data on a graph of sound amplitude with respect to time;

(c) plotting the fluid-pressure and fluid-flow-rate data on a graph of fluid pressure and fluid flow rate with respect to time;

(d) correlating the sound-amplitude graphs and the pressure-and-flow-rate graph; and, (e) coordinating, as applicable, the correlated graphs with sound recorded during the test.

30. In the improvement of claim 28, a method to create three-dimensional sound signatures for a fluid control device from sound amplitude, sound frequency, and sound time data, using Digital Signal Processing techniques, comprising the steps:

(a) selecting the point size of a Fast Fourier Transform or a Discrete Fourier Transform;

(b) selecting a filtering window for the Fast Fourier Transform or the Discrete Fourier Transform;

(c) applying the point size and filtering window to the upstream sound data and to the downstream sound data;

(d) constructing graphs of amplitude, frequency, and time, by spectral analysis techniques, to create an upstream three-dimensional sound signature and a downstream three-dimensional sound signature for the fluid control device; and, (e) coordinating, as applicable, the three-dimensional sound signatures with sound recorded during the test.

* * * * *